US012643915B2

(12) United States Patent
Sreekumar et al.

(10) Patent No.: US 12,643,915 B2
(45) Date of Patent: Jun. 2, 2026

(54) OLEFIN POLYMERIZATION CATALYSTS BEARING A 6-AMINO-N-ARYL AZAINDOLE LIGAND

(71) Applicant: DOW GLOBAL TECHNOLOGIES LLC, Midland, MI (US)

(72) Inventors: Sanil Sreekumar, Newton, CT (US); Brad C. Bailey, Midland, MI (US); Arvind Jaganathan, Indianapolis, IN (US); James J. Henkelis, Indianapolis, IN (US); Matthew D. Christianson, Midland, MI (US); Sukrit Mukhopadhyay, Midland, MI (US); James A. Walker, Midland, MI (US); Jordan C. Reddel, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 452 days.

(21) Appl. No.: 18/032,039

(22) PCT Filed: Oct. 13, 2021

(86) PCT No.: PCT/US2021/054751

§ 371 (c)(1),
(2) Date: Apr. 14, 2023

(87) PCT Pub. No.: WO2022/081685

PCT Pub. Date: Apr. 21, 2022

(65) Prior Publication Data

US 2023/0382929 A1 Nov. 30, 2023

Related U.S. Application Data

(60) Provisional application No. 63/091,975, filed on Oct. 15, 2020.

(51) Int. Cl.
*C07F 7/00* (2006.01)
*C08F 4/76* (2006.01)
*C08F 210/16* (2006.01)

(52) U.S. Cl.
CPC .................. *C07F 7/00* (2013.01); *C08F 4/76* (2013.01); *C08F 210/16* (2013.01)

(58) Field of Classification Search
CPC ...... C07F 7/00; C07F 7/28; C08F 4/76; C08F 210/14
See application file for complete search history.

(56) References Cited

U.S. PATENT DOCUMENTS

| | | | |
|---|---|---|---|
| 3,709,853 A | 1/1973 | Karapinka | |
| 4,003,712 A | 1/1977 | Miller | |
| 4,011,382 A | 3/1977 | Levine et al. | |
| 4,302,566 A | 11/1981 | Karol et al. | |
| 4,543,399 A | 9/1985 | Jenkins, III et al. | |
| 4,613,484 A | 9/1986 | Ayres et al. | |
| 4,882,400 A | 11/1989 | Dumain et al. | |
| 5,064,802 A | 11/1991 | Stevens et al. | |
| 5,153,157 A | 10/1992 | Hlatkey et al. | |
| 5,296,433 A | 3/1994 | Siedle et al. | |
| 5,321,106 A | 6/1994 | LaPointe | |
| 5,350,723 A | 9/1994 | Neithamer et al. | |
| 5,352,749 A | 10/1994 | DeChellis et al. | |
| 5,425,872 A | 6/1995 | Devore et al. | |
| 5,541,270 A | 7/1996 | Chinh et al. | |
| 5,625,087 A | 4/1997 | Devore et al. | |
| 5,646,083 A * | 7/1997 | van Beek | C07F 17/00 556/53 |
| 5,721,185 A | 2/1998 | LaPointe et al. | |
| 5,783,512 A | 7/1998 | Jacobsen et al. | |
| 5,883,204 A | 3/1999 | Spencer et al. | |
| 5,919,983 A | 7/1999 | Rosen et al. | |
| 6,103,657 A | 8/2000 | Murray | |
| 6,515,155 B1 | 2/2003 | Klosin et al. | |
| 6,696,379 B1 | 2/2004 | Carnahan et al. | |
| 7,163,907 B1 | 1/2007 | Canich et al. | |
| 10,919,995 B2 * | 2/2021 | Bailey | C07F 7/00 |
| 10,968,289 B2 * | 4/2021 | Bailey | C08F 210/16 |
| 2013/0253155 A1 * | 9/2013 | Luo | C08F 110/02 526/170 |

FOREIGN PATENT DOCUMENTS

| | | |
|---|---|---|
| BE | 839380 A | 10/1976 |
| EP | 0530908 A1 | 9/1992 |
| EP | 0802202 A | 5/1994 |
| EP | 3020736 A1 | 7/2014 |
| EP | 3034547 A1 | 12/2014 |

OTHER PUBLICATIONS

Becke, A. D. J., "Density-functional thermochemisty. III. The role of exact exchange," Chem. Phys., vol. 98, No. 7, pp. 5648-5652 (1993).
International Search Report and Written Opinion issued by the European Patent Office as International Searching Authority for International Patent Application No. PCT/US2021/054751 dated Jan. 31, 2022 (11 total pages).
Lee, C. et al., "Development of the Colle-Salvetti correlation-energy formula into a functional of the electron density," Phys. Rev. B., vol. 37, No. 2, pp. 785-789 (1988).
Miehlich, B. et al., "Results Obtained With the Correlation Energy Density Functionals of Becke and Lee, Yang and Par," Chem. Phys. Lett., vol. 157, No. 3, pp. 200-206 (1989).
Japanese Office Action dated Aug. 5, 2025, pertaining to JP Patent Application No. 2023-521354, 6 pgs.

(Continued)

*Primary Examiner* — Pancham Bakshi
(74) *Attorney, Agent, or Firm* — Dinsmore & Shohl LLP

(57) ABSTRACT

Embodiments are directed to a metal-ligand complex of formula (I). In addition, a polymerization process includes polymerizing at least one olefin in the presence of a catalyst system comprising the metal-ligand complex and at least one activator to produce an olefinic polymer.

15 Claims, 1 Drawing Sheet

(56) References Cited

OTHER PUBLICATIONS

Chinese Office Action dated Sep. 19, 2025, pertaining to CN Patent Application No. 202180070012.X, 8 pgs.
Chinese Office Action dated Apr. 22, 2025, pertaining to CN Patent Application No. 202180070012.X, 10 pgs.
Brazilian Office Action dated Dec. 9, 2025, pertaining to BR Patent Application No. BR112023006974.2, 8 pgs.
Chinese Office Action dated Jan. 7, 2026, pertaining to CN Patent Application No. 202180070012.X, 8 pgs.
Singapore Written Opinion and Search Report dated Jan. 7, 2026, pertaining to SG Patent Application No. 11202302596X, 10 pgs.

* cited by examiner

Table 1. Polymerization Data

| Metal-Ligand Complex | M | $R^3$ | T (°C) | Loading (µmol) | Yield (g) | Efficiency (g/g)[1] | Mw (g/mol) | PDI | Tm (°C) | $[C_8]$ (mol%) |
|---|---|---|---|---|---|---|---|---|---|---|
| 1 | Hf | Mesityl | 150 | 0.1 | 0.6 | 33,615 | 55,777 | 6.9 | 126.4 | ND |
| 2 | Zr | Mesityl | 150 | 0.1 | 0.2 | 21,924 | ND | ND | ND | ND |
| 3 | Hf | 4-fluoro | 150 | 1.6 | 0.8 | 2241 | 112,685 | 4.5 | 119.6 | 2.9 |
| 4 | Zr | 4-fluoro | 150 | 2.0 | 2.3 | 12,606 | 74,948 | 5.7 | 120.4 | 2.2 |
| 5 | Hf | Neopentyl | 150 | 0.1 | 0.8 | 44,820 | 244,316 | 5.9 | 125.9 | 5.6 |
| 6 | Zr | Neopentyl | 150 | ND[2] | ND | ND | ND | ND | ND | ND |
| 7 | Hf | Mesityl | 120 | 0.3 | 1.9 | 35,483 | 138,018 | 2.9 | ND | 13.9 |
| 8 | Zr | Mesityl | 120 | 2 | 0.4 | 2192 | 659,182 | 8.2 | 131 | ND |
| 9 | Hf | Mesityl | 120 | 0.1 | 0.4 | 22,410 | 151,709 | 3.4 | 70.4 | 8.8 |
| 10 | Zr | Mesityl | 120 | 1.5 | 0.8 | 5846 | 816,979 | 6.5 | 131 | 2 |
| 11 | Hf | Mesityl | 120 | 0.5 | 1.8 | 20,169 | 145,926 | 2.5 | 59.4 | 12.9 |
| 12 | Zr | Mesityl | 120 | 2 | 0.7 | 3,837 | 260,993 | 9.4 | 126 | 9.4 |
| 13 | Hf | 2,6-diisopropyl | 120 | 0.5 | 34.2 | 383,215 | 255,111 | 3.5 | 71.7 | 7.8 |
| 13 | Hf | 2,6-diisopropyl | 150 | 0.4 | 23.8 | 333,352 | 230,899 | 4 | 106 | 15.8 |
| 14 | Zr | 2,6-diisopropyl | 120 | 1.0 | 0.5 | 5,481 | 130,166 | 5.8 | 109.4 | 6.5 |
| 15 | Hf | 2,6-diisopropyl | 150 | 1.0 | 18.7 | 104,768 | 143,075 | 3.7 | 95.7 | 9.2 |
| 16 | Hf | 2,6-dimethyl | 120 | 1.0 | 6.9 | 38,658 | 277,051 | 4.0 | 58.4 | 9.8 |
| 17 | Hf | 2,6-diisopropyl | 150 | 1.5 | 17.0 | 63,496 | 101,601 | 3.6 | 124 | 6.0 |
| 18 | Hf | 2,6-diisopropyl | 120 | 0.5 | 7.5 | 84,038 | 120,410 | 2.9 | 111 | 7.8 |
| 19 | Hf | 2,6-dimethyl | 120 | 1.0 | 0.7 | 3922 | ND | ND | ND | ND |
| 20 | Hf | 2,6-diisopropyl | 150 | 4.0 | 2.3 | 3221 | 125,173 | 3.8 | ND | 9.5 |
| 21 | Hf | 2,6-diisopropyl | 120 | 1.5 | 0.3 | 1121 | ND | ND | ND | ND |
| 22 | Hf | 2,6-diisopropyl | 120 | 5.0 | 1.9 | 2129 | 162,755 | 14.7 | 103.1 | 9.5 |

OLEFIN POLYMERIZATION CATALYSTS BEARING A 6-AMINO-N-ARYL AZAINDOLE LIGAND

CROSS REFERENCES TO RELATED APPLICATIONS

This application is a national-stage application under 35 U.S.C. § 371 of International Application No. PCT/US2021/054751, filed Oct. 13, 2021, which International Application claims benefit of priority to U.S. Provisional Application No. 63/091,975, filed Oct. 15, 2020.

TECHNICAL FIELD

Embodiments of the present disclosure generally relate to olefin polymerization catalyst systems and processes and, more specifically to metal-ligand complex catalyst systems for olefin polymerization and to polymerization processes using catalyst systems comprising the metal-ligand complex catalyst systems.

BACKGROUND

Olefin-based polymers, such as ethylene-based polymers and/or propylene-based polymers, are produced via various catalyst systems. Selection of such catalyst systems used in the polymerization process of the olefin based polymers is an important factor contributing to the characteristics and properties of such olefin based polymers.

Ethylene-based polymers and propylene-based polymers are manufactured for a wide variety of articles. The polymerization process to form ethylene-based polymers can be varied in a number of respects to produce a wide variety of resultant polyethylene resins having different physical properties that render the various resins suitable for use in different applications.

The chemical industry strives to develop catalyst systems that include metal-ligand complexes with improved selectivity between comonomer and ethylene under olefin polymerization reaction temperatures, pressures, and other controllable conditions. Desirable catalyst systems may be capable of polymerization reactions that provide new compositions of matter (e.g., new polyolefin compositions), improve reaction yields, provide alternative substrate selectivities (e.g., provide a new relative selectivity for a monomer and co-monomer in making a polyolefin copolymer), improve process safety, or a combination thereof.

SUMMARY

There is a continuous need for new catalysts and processes for polymerizing olefins. According to aspects, a metal-ligand complex of formula (I) is provided.

(I)

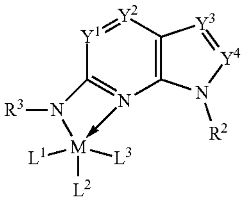

M is a metal chosen from titanium, hafnium, and zirconium, the metal having a formal oxidation state of +4. $Y^1$, $Y^2$, $Y^3$, and $Y^4$ are independently $C(R^1)$, N, or $N(R^1)$, where each $R^1$ is H, halogen, $(C_1\text{-}C_{40})$hydrocarbyl, $(C_1\text{-}C_{40})$heterohydrocarbyl, $Si(R^C)_3$, $P(R^P)_2$, $N(R^N)_2$, $OR^C$, $SR^C$, $NO_2$, CN, $CF_3$, $R^CS(O)$—, $R^CS(O)_2$—, $(R^C)_2C{=}N$—, $R^CC(O)O$—, $R^COC(O)$—, $R^CC(O)N(R)$—, or $(R^C)_2NC(O)$—, and where optionally any two or more le are joined as a ring having from 5 to 16 atoms excluding all hydrogen atoms. $R^2$ is H, $(C_1\text{-}C_{40})$hydrocarbyl, $(C_1\text{-}C_{40})$heterohydrocarbyl, $Si(R^C)_3$, $P(R^P)_2$, $N(R^N)_2$, $OR^C$, $SR^C$, $NO_2$, CN, $CF_3$, $R^CS(O)$—, $R^CS(O)_2$—, $(R^C)_2C{=}N$—, $R^CC(O)O$—, $R^COC(O)$—, $R^CC(O)N(R)$—, or $(R^C)_2NC(O)$— where optionally $R^2$ is joined with one or more groups $R^1$ as a ring having from 5 to 16 atoms excluding all hydrogen atoms. $R^3$ is $(C_1\text{-}C_{40})$hydrocarbyl or $(C_1\text{-}C_{40})$heterohydrocarbyl. $L^1$ is independently $(C_1\text{-}C_{40})$hydrocarbyl, $(C_1\text{-}C_{40})$heterohydrocarbyl, or a ligand of formula (II) complexed to the metal M at (*).

(II)

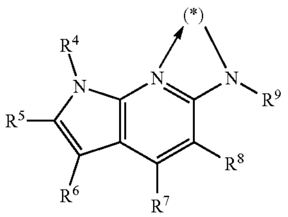

$L^2$ and $L^3$ are independently halogen, $(C_1\text{-}C_{40})$hydrocarbyl, or $(C_1\text{-}C_{40})$heterohydrocarbyl. $R^4$, $R^5$, $R^6$, $R^7$, $R^8$, and $R^9$ are independently H, halogen, $(C_1\text{-}C_{40})$hydrocarbyl, $(C_1\text{-}C_{40})$heterohydrocarbyl, $Si(R^C)_3$, $P(R^P)_2$, $N(R^N)_2$, $OR^C$, $SR^C$, $NO_2$, CN, $CF_3$, $R^CS(O)$—, $R^CS(O)_2$—, $(R^C)_2C{=}N$—, $R^CC(O)O$—, $R^COC(O)$—, $R^CC(O)N(R)$—, or $(R^C)_2NC(O)$—. Each $R^C$ in the metal-ligand complex is independently $(C_1\text{-}C_{30})$hydrocarbyl. Each $R^P$ in the metal-ligand complex is independently $(C_1\text{-}C_{30})$hydrocarbyl. Each $R^N$ in the metal-ligand complex is independently $(C_1\text{-}C_{30})$hydrocarbyl.

According to aspects, a polymerization process includes polymerizing at least one olefin in the presence of a catalyst system comprising the metal-ligand complex and at least one activator to produce an olefinic polymer.

Additional features and advantages of the described embodiments will be set forth in the detailed description that follows. The additional features and advantages of the described embodiments will be, in part, readily apparent to those skilled in the art from that description or recognized by practicing the described embodiments, including the detailed description that follows as well as the drawings and the claims.

BRIEF DESCRIPTION OF THE DRAWING

The FIGURE shows Table 1, which summarizes the polymerization data obtained when using metal-ligand complexes in accordance with embodiments described herein.

DETAILED DESCRIPTION

According to aspects, a metal-ligand complex of formula (I) is provided.

(I)

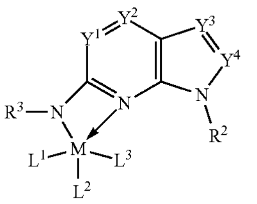

M is a metal chosen from titanium, hafnium, and zirconium, the metal having a formal oxidation state of +4.

In embodiments, $Y^1$, $Y^2$, $Y^3$, and $Y^4$ may be independently $C(R^1)$, N, or $N(R^1)$, where each $R^1$ may be H, halogen, $(C_1\text{-}C_{40})$hydrocarbyl, $(C_1\text{-}C_{40})$heterohydrocarbyl, $Si(R^C)_3$, $P(R^P)_2$, $N(R^N)_2$, $OR^C$, $SR^C$, $NO_2$, CN, $CF_3$, $R^CS(O)$—, $R^CS(O)_2$—, $(R^C)_2C{=}N$—, $R^CC(O)O$—, $R^COC(O)$—, $R^CC(O)N(R)$—, or $(R^C)_2NC(O)$—, and where optionally any two or more $R^1$ may be joined as a ring having from 5 to 16 atoms excluding all hydrogen atoms. Each $R^C$ in the metal-ligand complex may independently be $(C_1\text{-}C_{30})$hydrocarbyl. Each $R^P$ in the metal-ligand complex may independently be $(C_1\text{-}C_{30})$hydrocarbyl. Each $R^N$ in the metal-ligand complex may independently be $(C_1\text{-}C_{30})$hydrocarbyl.

In embodiments, $Y^1$, $Y^2$, and $Y^3$ may all be C(H). In embodiments, $Y^1$, $Y^2$, $Y^3$, and $Y^4$ may all be C(H). In embodiments, $Y^1$ and $Y^2$ may be C(H); $Y^3$ may be N; and $Y^4$ may be $C(R^1)$. In embodiments, $Y^1$, $Y^2$, and $Y^3$ may be C(H) and $Y^4$ may be N. In embodiments, $Y^1$ and $Y^2$ may be C(H) and $Y^3$ and $Y^4$ may be N. In embodiments, $Y^1$ and $Y^2$ may be C(H) and $Y^3$ and $Y^4$ may be $C(R^1)$.

$R^2$ of formula (I) may be H, $(C_1\text{-}C_{40})$hydrocarbyl, $(C_1\text{-}C_{40})$heterohydrocarbyl, $Si(R^C)_3$, $P(R^P)_2$, $N(R^N)_2$, $OR^C$, $SR^C$, $NO_2$, CN, $CF_3$, $R^CS(O)$—, $R^CS(O)_2$—, $(R^C)_2C{=}N$—, $R^CC(O)O$—, $R^COC(O)$—, $R^CC(O)N(R)$—, or $(R^C)_2NC(O)$— where optionally $R^2$ is joined with one or more groups $R^1$ as a ring having from 5 to 16 atoms excluding all hydrogen atoms.

In embodiments, $R^2$ may be $(C_3\text{-}C_{30})$aryl or $(C_3\text{-}C_{30})$heteroaryl. Exemplary $(C_3\text{-}C_{30})$aryl include, but are not limited to, phenyl, benzyl, biphenyl, triphenyl, indyl, naphthyl, indacyl, fluoryl, phenanthryl, anthracyl, and 2,6-t-butylanthracyl. In embodiments, $R^2$ may be $(C_1\text{-}C_{40})$alkyl. Exemplary $(C_1\text{-}C_{40})$alkyl include, but are not limited to, methyl, ethyl, propyl, isopropyl, butyl, t-butyl, pentyl, and hexyl.

In embodiments, $R^3$ may be $(C_3\text{-}C_{30})$aryl or $(C_3\text{-}C_{30})$heteroaryl. Exemplary $(C_3\text{-}C_{30})$aryl and $(C_3\text{-}C_{30})$heteroaryl include, but are not limited to, phenyl, benzyl, mesityl, dichlorobenzyl, biphenyl, triphenyl, indenyl, naphthyl, indacenyl, fluorenyl, phenanthryl, anthracyl, and 2,6-t-butylanthracyl, fluorobenzyl, perfluorobenzyl, 2,2-dimethylpropyl, and diisopropylphenyl.

$L^1$ may independently be $(C_1\text{-}C_{40})$hydrocarbyl, $(C_1\text{-}C_{40})$heterohydrocarbyl, or a ligand of formula (II) complexed to the metal M at (*).

(II)

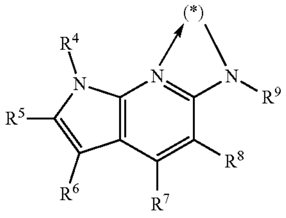

In embodiments, $L^1$ may be selected from structures of formulae (III) to (VIII).

(III)

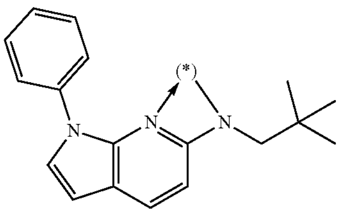

(IV)

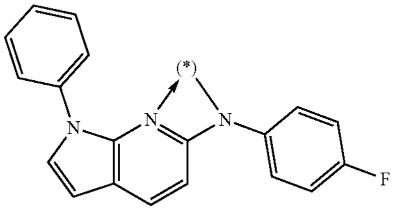

(V)

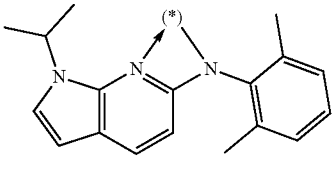

(VI)

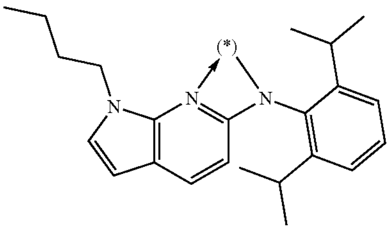

(VII)

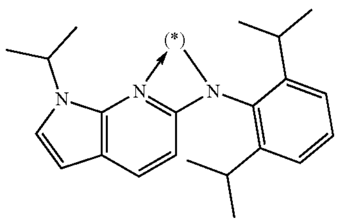

-continued (VIII)

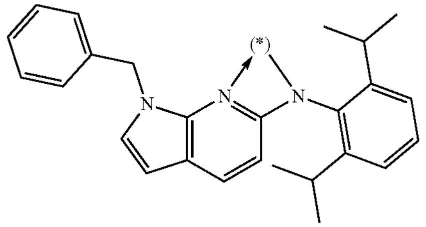

$L^2$ and $L^3$ may independently be halogen, $(C_1\text{-}C_{40})$hydrocarbyl, or $(C_1\text{-}C_{40})$heterohydrocarbyl.

In embodiments, one or more of $L^1$, $L^2$, and $L^3$ may be $(C_1\text{-}C_{20})$alkyl. For instance, $L^2$ and $L^3$ may be methyl or $L^1$, $L^2$, and $L^3$ may all be methyl. In other embodiments, one or more of $L^1$, $L^2$, and $L^3$ may be $(C_1\text{-}C_{20})$aryl. For instance, $L^2$ and $L^3$ may be aryl or $L^1$, $L^2$, and $L^3$ may all be benzyl.

$R^4$, $R^5$, $R^6$, $R^7$, $R^8$, and $R^9$ of formula (I) may independently be H, halogen, $(C_1\text{-}C_{40})$hydrocarbyl, $(C_1\text{-}C_{40})$heterohydrocarbyl, $Si(R^C)_3$, $P(R^P)_2$, $N(R^N)_2$, $OR^C$, $SR^C$, $NO_2$, CN, $CF_3$, $R^CS(O)$—, $R^CS(O)_2$—, $(R^C)_2C{=}N$—, $R^CC(O)O$—, $R^COC(O)$—, $R^CC(O)N(R)$—, or $(R^C)_2NC(O)$—.

In embodiments, the metal-ligand complex may be selected from structures of formulae (IX) to (XLVI).

(IX)

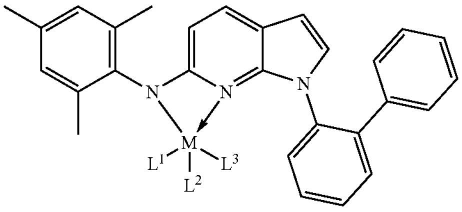

(X)

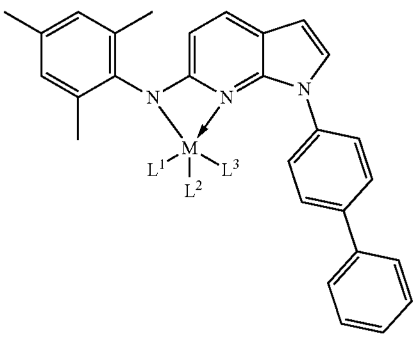

(XI)

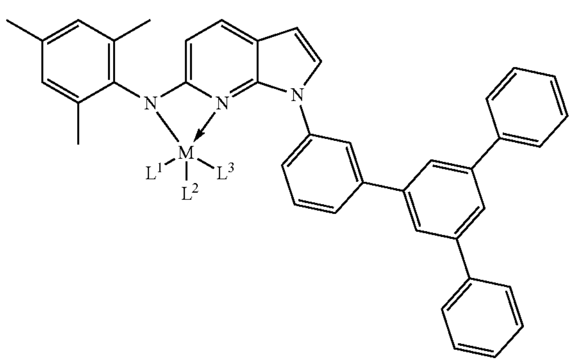

-continued (XII)

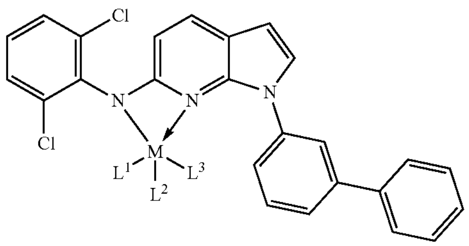

(XIII)

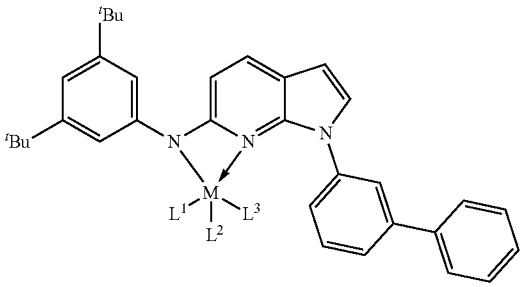

(XIV)

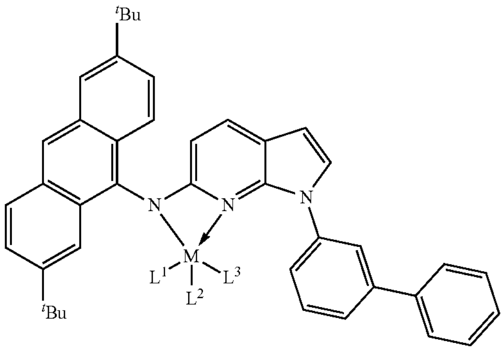

(XV)

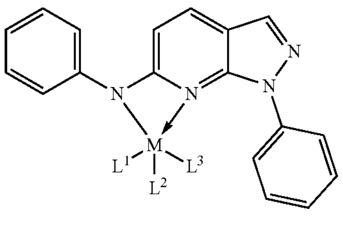

(XVI)

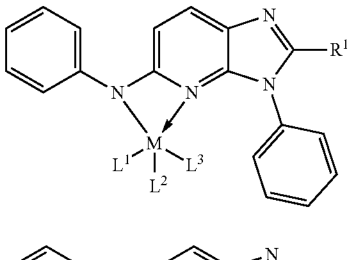

(XVII)

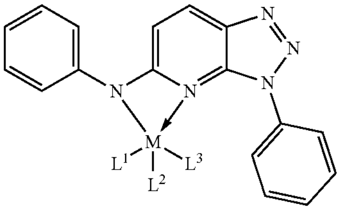

-continued
(XVIII)
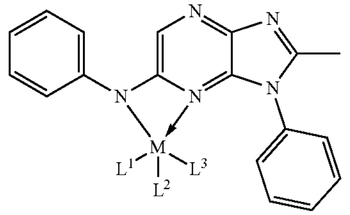
(XIX)
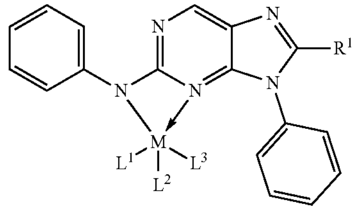
(XX)
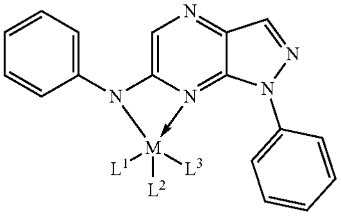
(XXI)
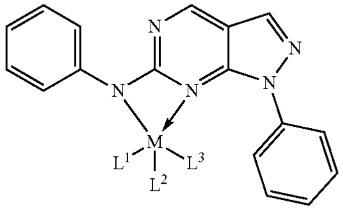
(XXII)
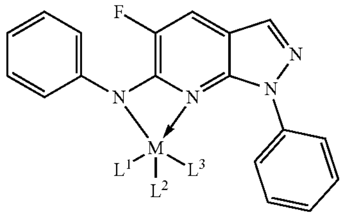
(XXIII)
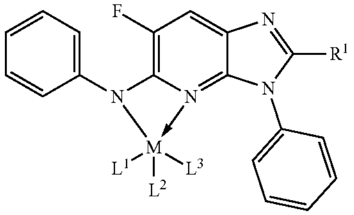
(XXIV)
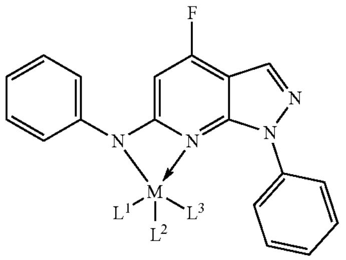
-continued
(XXV)
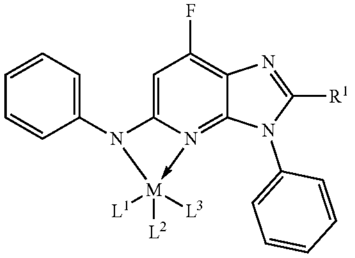
(XXVI)
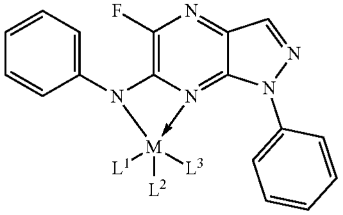
(XXVII)
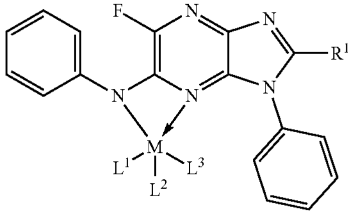
(XXVIII)
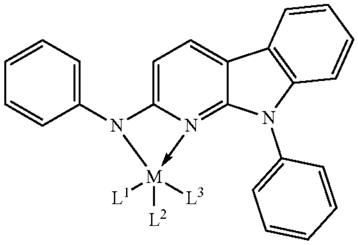
(XXIX)
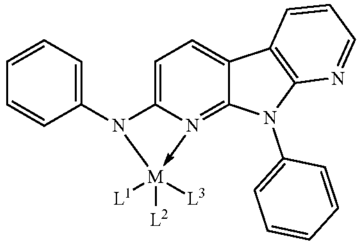
(XXX)
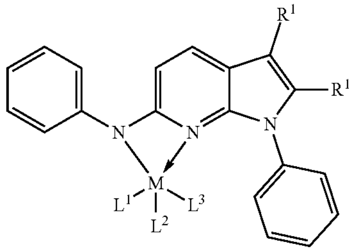

-continued
(XXXI)
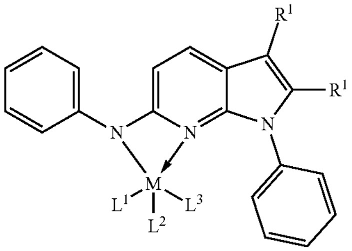
(XXXII)
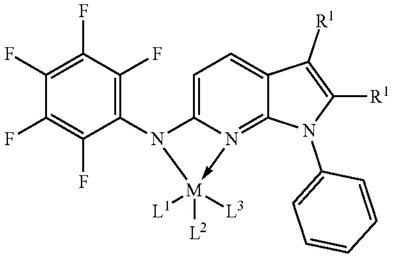
(XXXIII)
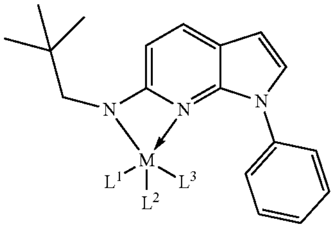
(XXXIV)
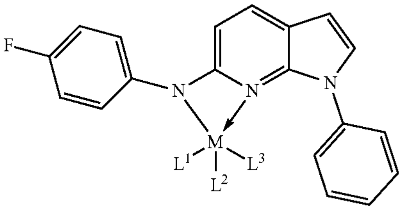
(XXXV)
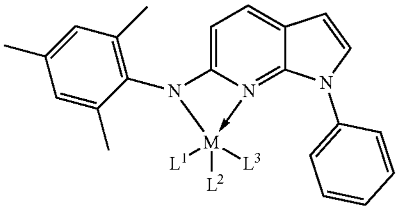
(XXXVI)
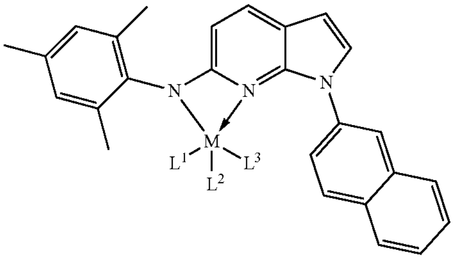
-continued
(XXXVII)
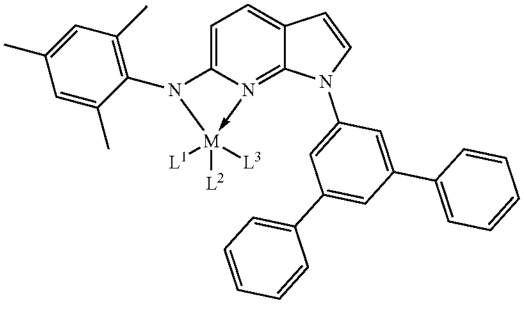
(XXXVIII)
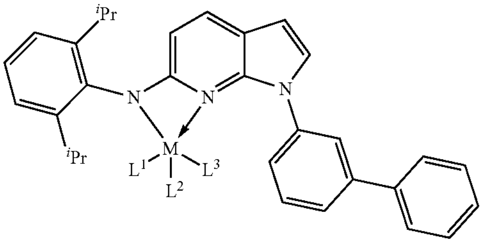
(XXXIX)
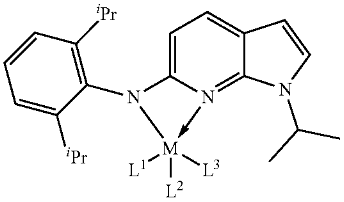
(XL)
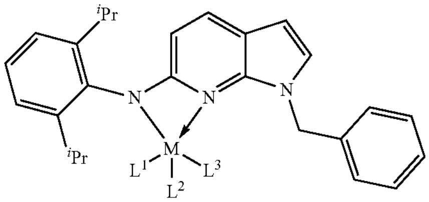
(XLI)
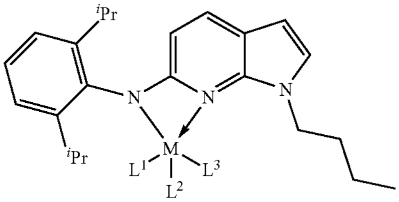
(XLII)
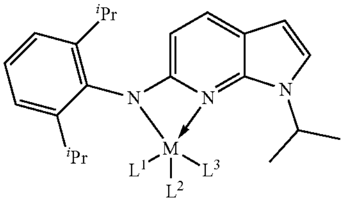

-continued
(XLIII)
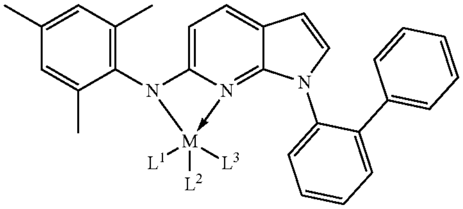
(XLIV)
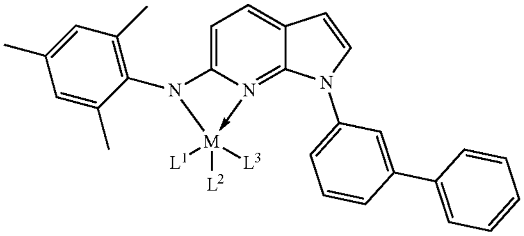
(XLV)
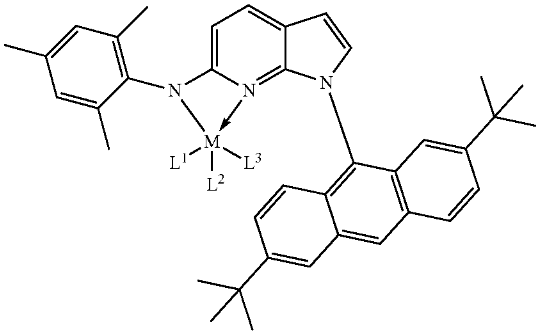
(XLVI)
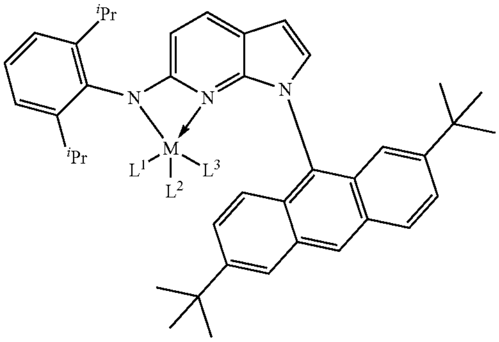
In embodiments, the metal-ligand complex may be selected from structures of formulae (XLVII) to (LXXXVI).
(XLVII)
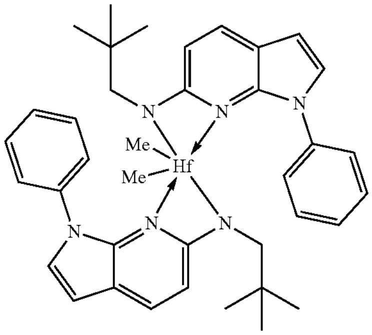
(XLVIII)
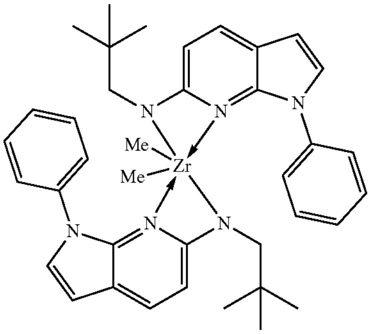
(XLIX)
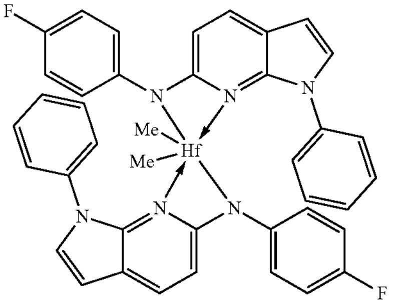
(L)
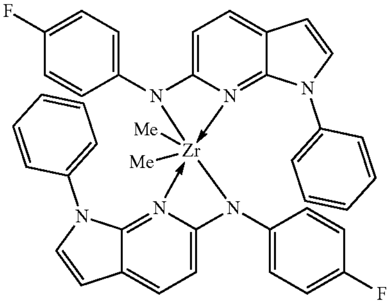
(LI)
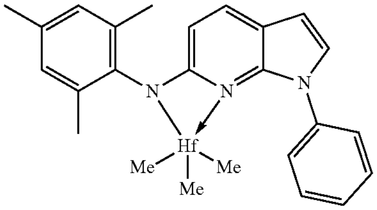

-continued
(LII)
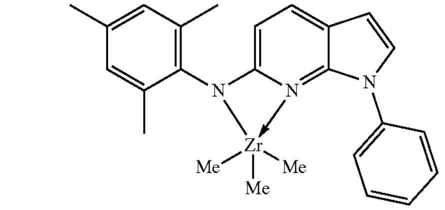
(LIII)
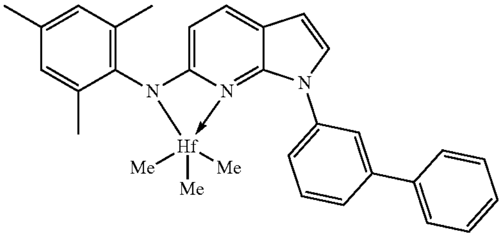
(LIV)
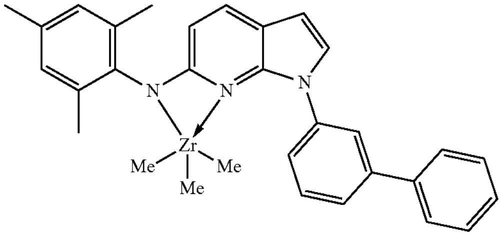
(LV)
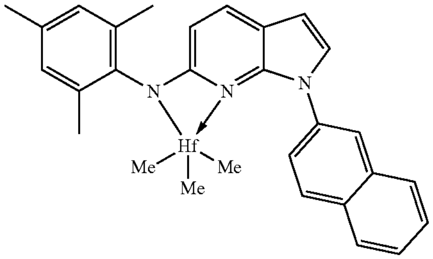
(LVI)
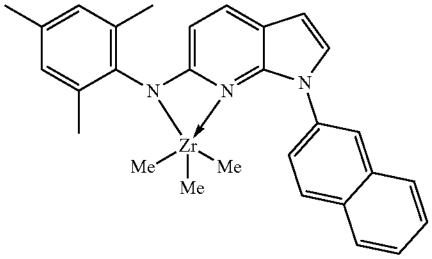
(LVII)
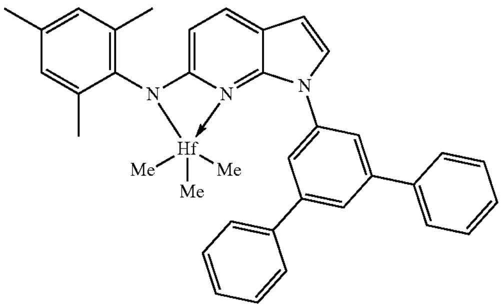
-continued
(LVIII)
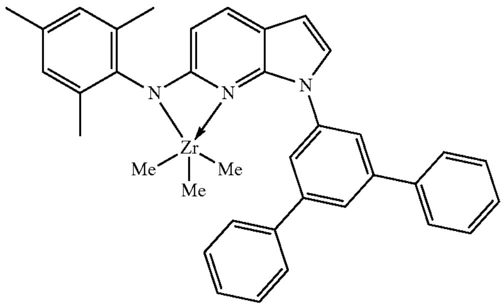
(LIX)
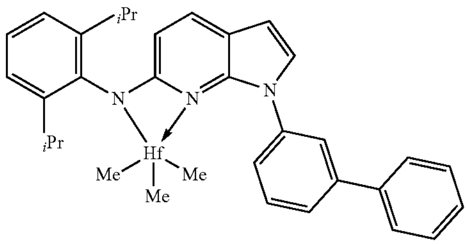
(LX)
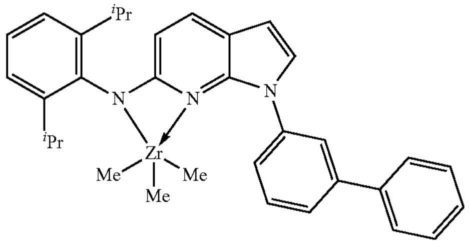
(LXI)
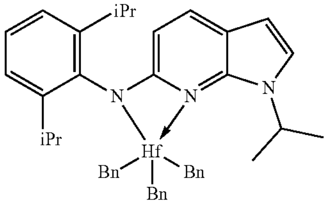
(LXII)
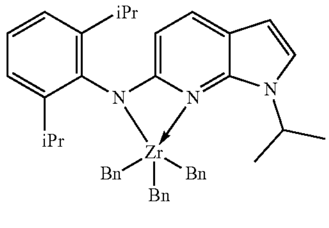
(LXIII)
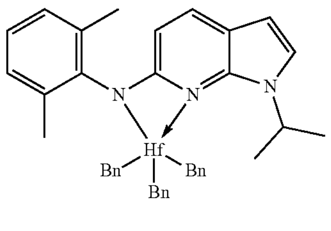

-continued
(LXIV)
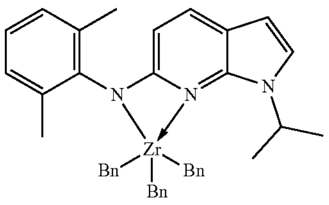
(LXV)
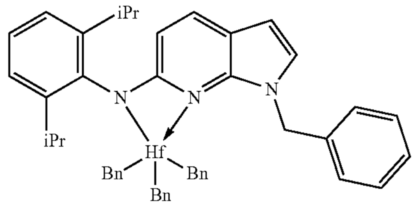
(LXVI)
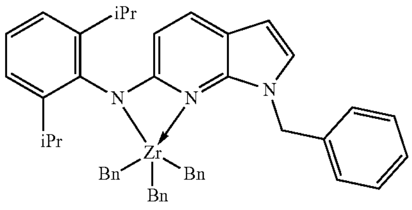
(LXVII)
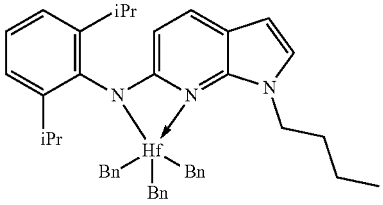
(LXVII)
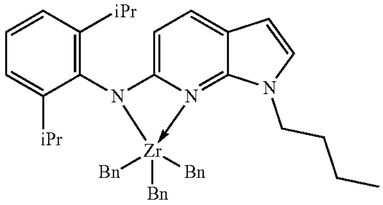
(LXIX)
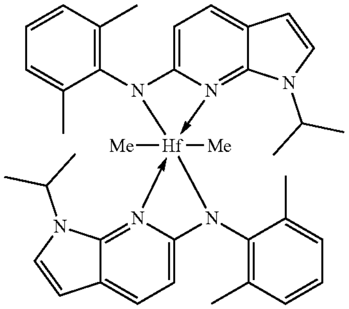
-continued
(LXX)
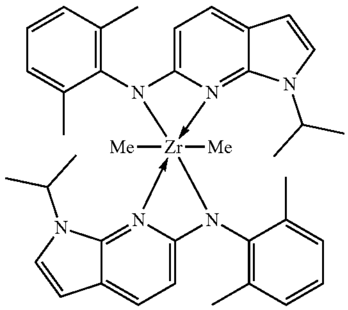
(LXXI)
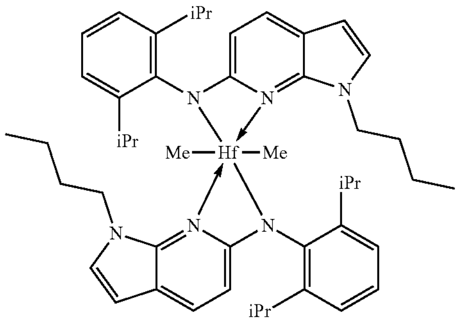
(LXXII)
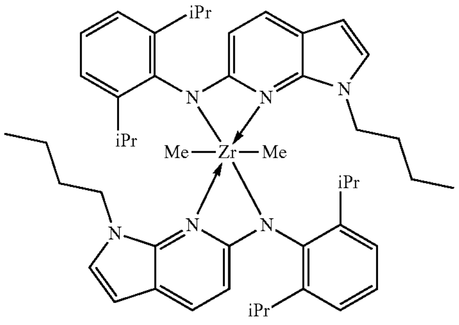
(LXXIII)
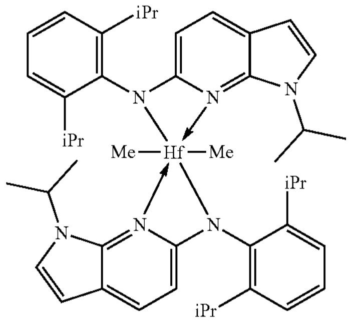
(LXXIV)
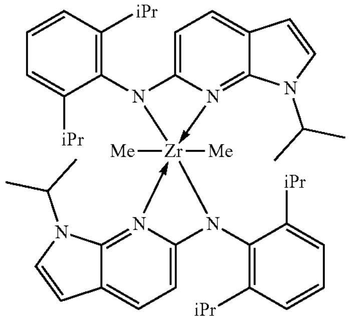

-continued
(LXXV)
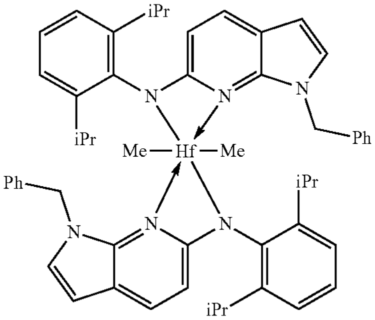
(LXXVI)
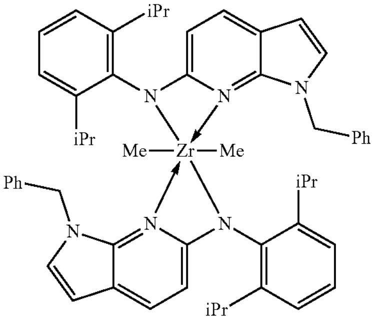
(LXXVII)
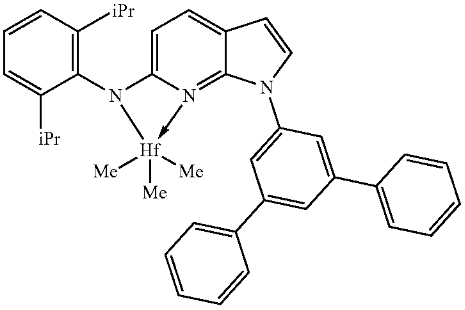
(LXXVIII)
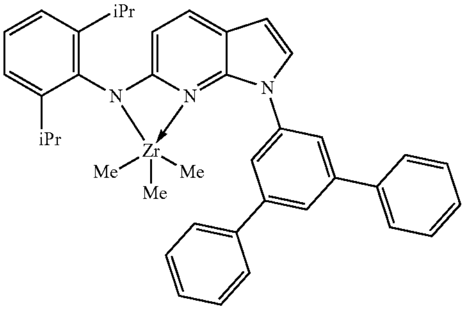
(LXXIX)
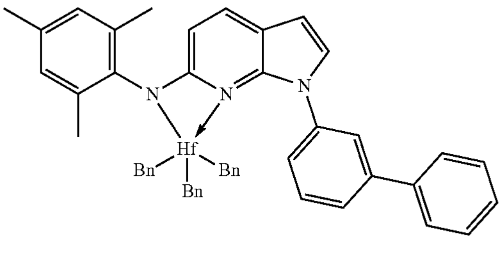
-continued
(LXXX)
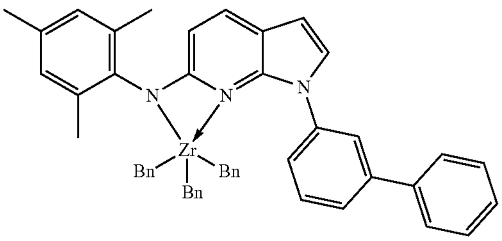
(LXXXI)
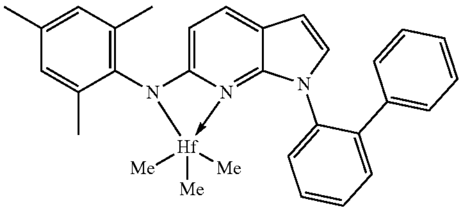
(LXXXII)
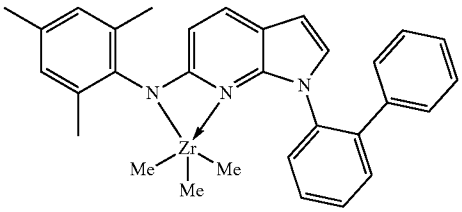
(LXXXIII)
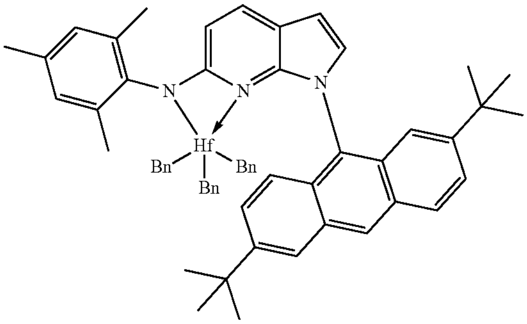
(LXXXIV)
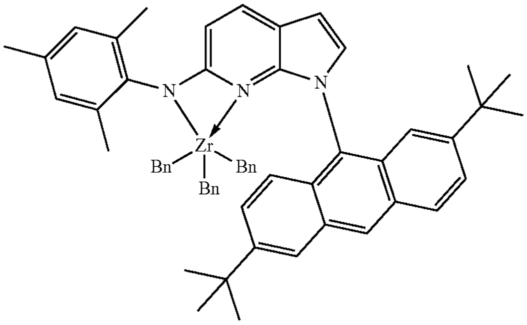

-continued (LXXXV)

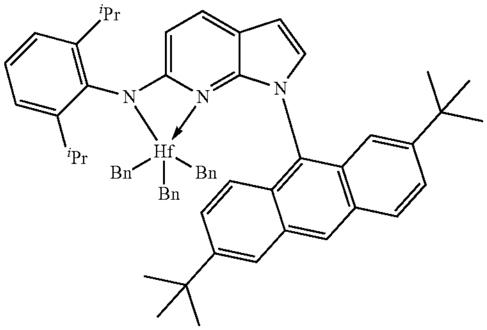

(LXXXVI)

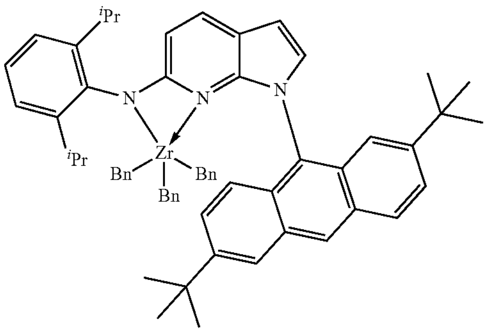

In embodiments, the metal-ligand complex may be selected from structures of formulae (LIX) to (LXII) and (LXXVII) to (LXXXVI).

Common abbreviations that may appear in this disclosure are listed below:

$L^1$, $L^2$, $L^3$, M, $R^1$, $R^2$, $R^3$, $R^4$, $R^5$, $R^6$, $R^7$, $R^8$, $R^9$, $R^C$, $R^N$, $R^P$, $Y^1$, $Y^2$, $Y^3$, and $Y^4$: as defined above; Me: methyl; Et: ethyl; Ph: phenyl; Bn: benzyl; i-Pr: iso-propyl; t-Bu: tert-butyl; t-Oct: tert-octyl (2,4,4-trimethylpentan-2-yl); Tf: trifluoromethane sulfonate; THF: tetrahydrofuran; $Et_2$ O: diethyl ether; $CH_2Cl_2$: dichloromethane; $C_6D_6$: deuterated benzene or benzene-d6; $CDCl_3$: deuterated chloroform; BHT: butyl ated hydroxytoluene; TCB: 1,2,4-trichlorobenzene; $MgSO_4$: magnesium sulfate; n-BuLi: butyllithium; $HfCl_4$: hafnium(IV) chloride; $HfBn_4$: hafnium(IV) tetrabenzyl; $ZrCl_4$: zirconium(IV) chloride; $ZrBn_4$: zirconium(IV) tetrabenzyl; $ZrBn_2Cl_2(OEt_2)$: zirconium (IV) dibenzyl dichloride mono-diethyletherate; $HfBn_2Cl_2(OEt_2)$: hafnium (IV) dibenzyl dichloride mono-diethyletherate; $N_2$: nitrogen gas; PhMe: toluene; PPR: parallel pressure reactor; MAO: methylaluminoxane; MMAO: modified methylaluminoxane; TEA: Triethyl amine; GC: gas chromatography; LC: liquid chromatography; NMR: nuclear magnetic resonance; MS: mass spectrometry; mmol: millimoles; M: molar solution; mM: millimolar solution; mL or ml: milliliters; min or mins: minutes; h or hrs: hours; d: days; RT: room temperature.

The term "independently selected" is used herein to indicate that the substituent groups, such as, $R^4$, $R^5$, $R^6$, $R^7$, $R^8$, and $R^9$, can be identical or different (e.g., $R^4$, $R^5$, $R^6$, $R^7$, $R^8$, and $R^9$ may all be substituted alkyls or $R^4$ and $R^5$ may be a cyclic alkyl and $R^6$ and $R^7$ may be a substituted alkyl, etc.) A chemical name associated with a sub stituent group is intended to convey the chemical structure that is recognized in the art as corresponding to that of the chemical name. Thus, chemical names are intended to supplement and illustrate, not preclude, the structural definitions known to those of skill in the art.

The term "substitution" means that at least one hydrogen atom (—H) bonded to a carbon atom or heteroatom of a corresponding unsubstituted compound or functional group is replaced by a substituent (e.g. $R^S$). The term "persubstitution" means that every hydrogen atom (—H) bonded to a carbon atom or heteroatom of a corresponding unsubstituted compound or functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent (e.g. $R^S$).

When used to describe certain carbon atom-containing chemical groups, a parenthetical expression having the form "($C_x$-$C_y$)" means that the unsubstituted form of the chemical group has from x carbon atoms to y carbon atoms, inclusive of x and y. For example, a ($C_1$-$C_{40}$)hydrocarbyl is an hydrocarbyl group having from 1 to 40 carbon atoms in its unsubstituted form. In some embodiments and general structures, certain chemical groups may be substituted by one or more substituents such as $R^S$. An $R^S$ substituted version of a chemical group defined using the "($C_x$-$C_y$)" parenthetical may contain more than y carbon atoms depending on the identity of any groups $R^S$. For example, a "($C_1$-$C_{40}$)alkyl substituted with exactly one group $R^S$, where $R^S$ is phenyl (—$C_6H_5$)" may contain from 7 to 46 carbon atoms. Thus, in general when a chemical group defined using the "($C_x$-$C_y$)" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

In some embodiments, each of the chemical groups (i.e., $R^2$, $R^3$, etc.) of the metal-ligand complex of formula (I) may be unsubstituted having no $R^S$ substituents. In other embodiments, at least one of the chemical groups of the metal-ligand complex of formula (I) may independently contain one or more than one $R^S$. In some embodiments, the sum total of $R^S$ in the chemical groups of the metal-ligand complex of formula (I) does not exceed 20. In other embodiments, the sum total of $R^S$ in the chemical groups of the metal-ligand complex of formula (I) does not exceed 10. In another embodiment, the sum total of $R^S$ in the chemical groups of the metal-ligand complex of formula (I) may not exceed 5 $R^S$. When two or more than two $R^S$ are bonded to a same chemical group of the metal-ligand complex of formula (I), each $R^S$ is independently bonded to the same or different carbon atom or heteroatom and may include persubstitution of the chemical group.

The term "—H" means a hydrogen or hydrogen radical that is covalently bonded to another atom. "Hydrogen" and "—H" are interchangeable, and unless clearly specified have identical meanings.

The term "($C_1$-$C_{40}$)hydrocarbyl" means a hydrocarbon radical of from 1 to 40 carbon atoms in which each hydrocarbon radical is aromatic or non-aromatic, saturated or unsaturated, straight chain or branched chain, cyclic (having three carbon atoms or more, and including monocyclic and polycyclic, fused and non-fused polycyclic, including bicyclic) or acyclic, and is substituted by one or more $R^S$ or unsubstituted.

In this disclosure, a ($C_1$-$C_{40}$)hydrocarbyl may be an unsubstituted or substituted ($C_1$-$C_{40}$)alkyl, ($C_3$-$C_{40}$)cycloalkyl, $(C_3\text{-}C_{20})$cycloalkyl-$(C_1\text{-}C_{20})$alkylene, $(C_6\text{-}C_{40})$aryl, or $(C_6\text{-}C_{20})$aryl-$(C_1\text{-}C_{20})$alkylene (such as benzyl ($-CH_2-C_6H_5$)).

The term "$(C_1\text{-}C_{40})$alkyl" means a saturated straight or branched hydrocarbon radical of from 1 to 40 carbon atoms that is unsubstituted or substituted by one or more $R^S$. Examples of unsubstituted $(C_1\text{-}C_{40})$alkyl are unsubstituted $(C_1\text{-}C_{20})$alkyl; unsubstituted $(C_1\text{-}C_{10})$alkyl, unsubstituted $(C_1\text{-}C_{10})$alkyl; unsubstituted $(C_1\text{-}C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1\text{-}C_{40})$alkyl are substituted $(C_1\text{-}C_{20})$alkyl, substituted $(C_1\text{-}C_{12})$alkyl, substituted $(C_1\text{-}C_{10})$alkyl, trifluoromethyl, and $[C_{45}]$alkyl. The term "$[C_{45}]$alkyl" (with square brackets) means there is a maximum of 45 carbon atoms in the radical, including substituents, and is, for example, a $(C_{27}\text{-}C_{40})$alkyl substituted by one $R^S$, which is a $(C_1\text{-}C_5)$alkyl, respectively. Each $(C_1\text{-}C_5)$alkyl may be, for example, methyl, trifluoromethyl, ethyl, 1-propyl, 1-methylethyl, or 1,1-dimethylethyl.

The term "$(C_3\text{-}C_{30})$aryl" means an unsubstituted or substituted (by one or more $R^S$) mono-, bi- or tricyclic aromatic hydrocarbon radical of from 3 to 30 carbon atoms, of which at least from 6 to 14 of the carbon atoms are aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclic aromatic hydrocarbon radical is present, at least one of the rings of the radical is aromatic. The other ring or rings of the aromatic radical may be independently fused or non-fused and aromatic or non-aromatic. Examples of unsubstituted $(C_3\text{-}C_{30})$aryl include: unsubstituted $(C_6\text{-}C_{20})$aryl, unsubstituted $(C_6\text{-}C_{18})$aryl; 2-$(C_1\text{-}C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_3\text{-}C_{30})$aryl include: substituted $(C_1\text{-}C_{20})$aryl; substituted $(C_6\text{-}C_{18})$aryl; 2,4-bis($[C_{10}]$alkyl)-phenyl; polyfluorophenyl; pentafluorophenyl; and fluoren-9-one-l-yl.

The term "$(C_3\text{-}C_{40})$cycloalkyl" means a saturated cyclic hydrocarbon radical of from 3 to 40 carbon atoms that is unsubstituted or substituted by one or more $R^S$. Other cycloalkyl groups (e.g., $(C_x\text{-}C_y)$cycloalkyl) are defined in an analogous manner as having from x to y carbon atoms and being either unsubstituted or substituted with one or more $R^S$. Examples of unsubstituted $(C_3\text{-}C_{40})$cycloalkyl are unsubstituted $(C_3\text{-}C_{20})$cycloalkyl, unsubstituted $(C_3\text{-}C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3\text{-}C_{40})$cycloalkyl are substituted $(C_3\text{-}C_{20})$cycloalkyl, substituted $(C_3\text{-}C_{10})$cycloalkyl, cyclopentanon-2-yl, and 1-fluorocyclohexyl.

The term "$(C_1\text{-}C_{40})$alkylene" means a saturated straight chain or branched chain diradical (i.e., the radicals are not on ring atoms) of from 1 to 40 carbon atoms that is unsubstituted or substituted by one or more $R^S$. Examples of unsubstituted $(C_1\text{-}C_{40})$alkylene are unsubstituted $(C_1\text{-}C_{20})$alkylene, including unsubstituted $-CH_2CH_2-$, $-(CH_2)_3-$, $-(CH_2)_4-$, $-(CH_2)_5-$, $-(CH_2)_6-$, $-(CH_2)_7-$, $-(CH_2)_8-$, $-CH_2C^*HCH_3$, and $-(CH_2)_4C^*(H)(CH_3)$, in which "C*" denotes a carbon atom from which a hydrogen atom is removed to form a secondary or tertiary alkyl radical. Examples of substituted $(C_1\text{-}C_{40})$alkylene are substituted $(C_1\text{-}C_{20})$alkylene, $-CF_2-$, $-C(O)-$, and $-(CH_2)_{14}C(CH_3)_2(CH_2)_5-$ (i.e., a 6,6-dimethyl substituted normal-1,20-eicosylene). Since as mentioned previously two $R^S$ may be taken together to form a $(C_1\text{-}C_{18})$ alkylene, examples of substituted $(C_1\text{-}C_{50})$alkylene also include 1,2-bis(methylene)cyclopentane, 1,2-bis(methylene)cyclohexane, 2,3-bis(methylene)-7,7-dimethyl-bicyclo [2.2.1]heptane, and 2,3-bis (methylene)bicyclo [2.2.2] octane.

The term "heteroatom," refers to an atom other than hydrogen or carbon. Examples of groups containing one or more than one heteroatom include $(C_1\text{-}C_{40})$heterohydrocarbyl, O, S, S(O), $S(O)_2$, halogen, $Si(R^C)_3$, $P(R^P)_2$, $N(R^N)_2$, $OR^C$, $SR^C$, $NO_2$, CN, $CF_3$, $R^CS(O)-$, $R^CS(O)_2-$, $(R^C)_2C{=}N-$, $R^CC(O)O-$, $R^COC(O)-$, $R^CC(O)N(R)-$, or $(R^C)_2NC(O)-$, where each $R^C$, $R^N$, and $R^P$ $(C_1\text{-}C_{30})$ hydrocarbyl or —H. The term "heterohydrocarbon" refers to a molecule or molecular framework in which one or more carbon atoms of a hydrocarbon are replaced with a heteroatom. The term "$(C_1\text{-}C_{40})$heterohydrocarbyl" means a heterohydrocarbon radical of from 1 to 40 carbon atoms. The heterohydrocarbon of the $(C_1\text{-}C_{40})$heterohydrocarbyl has one or more heteroatoms. The radical of the heterohydrocarbyl may be on a carbon atom or a heteroatom. Each $(C_1\text{-}C_{40})$heterohydrocarbyl may be unsubstituted or substituted (by one or more $R^S$), aromatic or non-aromatic, saturated or unsaturated, straight chain or branched chain, cyclic (including mono- and poly-cyclic, fused and non-fused polycyclic), or acyclic.

The $(C_1\text{-}C_{40})$heterohydrocarbyl may be unsubstituted or substituted. Non-limiting examples of the $(C_1\text{-}C_{40})$heterohydrocarbyl may include: $(C_1\text{-}C_{40})$heteroalkyl, $(C_1\text{-}C_{40})$hydrocarbyl-O—, $(C_1\text{-}C_{40})$hydrocarbyl-S—, $(C_1\text{-}C_{40})$hydrocarbyl-S(O)—, $(C_1\text{-}C_{40})$hydrocarbyl-$S(O)_2$—, $(C_1\text{-}C_{40})$hydrocarbyl-$Si(R^C)_2$—, $(C_1\text{-}C_{40})$hydrocarbyl-$N(R^N)$—, $(C_1\text{-}C_{40})$hydrocarbyl-$P(R^P)$—, $(C_2\text{-}C_{40})$heterocycloalkyl, $(C_2\text{-}C_{19})$heterocycloalkyl-$(C_1\text{-}C_{20})$alkylene, $(C_3\text{-}C_{20})$cycloalkyl-$(C_1\text{-}C_{19})$heteroalkylene, $(C_2\text{-}C_{19})$heterocycloalkyl-$(C_1\text{-}C_{20})$heteroalkylene, $(C_1\text{-}C_{40})$heteroaryl, $(C_1\text{-}C_{19})$heteroaryl-$(C_1\text{-}C_{20})$alkylene, $(C_6\text{-}C_{20})$aryl-$(C_1\text{-}C_{19})$ heteroalkylene, or $(C_1\text{-}C_{19})$heteroaryl-$(C_1\text{-}C_{20})$ heteroalkylene.

The term "$(C_4\text{-}C_{40})$heteroaryl" means an unsubstituted or substituted (by one or more $R^S$) mono-, bi-, or tricyclic heteroaromatic hydrocarbon radical of from 4 to 40 total carbon atoms and from 1 to 10 heteroatoms. A monocyclic heteroaromatic hydrocarbon radical includes one heteroaromatic ring; a bicyclic heteroaromatic hydrocarbon radical has two rings; and a tricyclic heteroaromatic hydrocarbon radical has three rings. When the bicyclic or tricyclic heteroaromatic hydrocarbon radical is present, at least one of the rings in the radical is heteroaromatic. The other ring or rings of the heteroaromatic radical may be independently fused or non-fused and aromatic or non-aromatic. Other heteroaryl groups (e.g., $(C_x\text{-}C_y)$heteroaryl generally, such as $(C_4\text{-}C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered ring or a 6-membered ring. The 5-membered ring monocyclic heteroaromatic hydrocarbon radical has 5 minus h carbon atoms, where h is the number of heteroatoms and may be 1, 2, or 3; and each heteroatom may be O, S, N, or P.

Examples of 5-membered ring heteroaromatic hydrocarbon radicals include pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring monocyclic heteroaromatic hydrocarbon radical has 6 minus h carbon atoms, where h is the number of heteroatoms and may be 1 or 2 and the heteroatoms may be N or P.

Examples of 6-membered ring heteroaromatic hydrocarbon radicals include pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f] indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

The term "($C_1$-$C_{40}$)heteroalkyl" means a saturated straight or branched chain radical containing one to forty carbon atoms and one or more heteroatom. The term "($C_1$-$C_{40}$)hetero-alkylene" means a saturated straight or branched chain diradical containing from 1 to 40 carbon atoms and one or more than one heteroatoms. The heteroatoms, of the heteroalkyls or the hereroalkylenes, may include $Si(R^C)_3$, $Ge(R^C)_3$, $Si(R^C)_2$, $Ge(R^C)_2$, $P(R^P)_2$, $P(R^P)$, $N(R^N)_2$, $N(R^N)$, N, O, $OR^C$, S, $SR^C$, S(O), and $S(O)_2$, wherein each of the heteroalkyl and heteroalkylene groups are unsubstituted or are substituted by one or more $R^S$.

Examples of unsubstituted ($C_2$-$C_{40}$)heterocycloalkyl include unsubstituted ($C_2$-$C_{20}$)heterocycloalkyl, unsubstituted ($C_2$-$C_{10}$)heterocycloalkyl, aziridin-1-yl, oxetan-2-yl, tetrahydrofuran-3-yl, pyrrolidin-1-yl, tetrahydrothiophen-S, S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means the anionic form of the halogen atom: fluoride ($F^-$), chloride ($Cl^-$), bromide ($Br^-$), or iodide ($I^-$).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may be present in substituents $R^S$. The term "unsaturated" means containing one or more carbon-carbon double bonds or carbon-carbon triple bonds, or (in heteroatom-containing groups) one or more carbon-nitrogen double bonds, carbon-phosphorous double bonds, or carbon-silicon double bonds, not including double bonds that may be present in substituents $R^S$, if any, or in aromatic rings or heteroaromatic rings, if any.

Catalysts for Polyolefin Synthesis

The metal-ligand complexes previously described herein may be utilized to prepare catalyst systems that may then be used in the polymerization of olefins, primarily ethylene and propylene. Specifically, a polymerization process may include polymerizing at least one olefin in the presence of a catalyst system comprising the metal-ligand complex and at least one activator to produce an olefinic polymer.

Co-Catalyst Component

The procatalyst comprising the metal-ligand complex of Formula (I) is rendered catalytically active by contacting it to, or combining it with, the activating co-catalyst or by using an activating technique such as those that are known in the art. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Aluminoxanes and their preparations are disclosed, for example, in U.S. Pat. No. 6,103,657, the entire content of which is incorporated herein by reference. Examples of polymeric or oligomeric alumoxanes are methylalumoxane, triisobutylaluminum-modified methylalumoxane, and isobutylalumoxane.

Exemplary Lewis acid activating co-catalysts are Group 13 metal compounds containing from 1 to 3 hydrocarbyl substituents as described herein. In some embodiments, exemplary Group 13 metal compounds are tri(hydrocarbyl)-substituted-aluminum or tri(hydrocarbyl)-boron compounds. In some other embodiments, exemplary Group 13 metal compounds are tri(($C_1$-$C_{10}$)alkyl)aluminum or tri(($C_6$-$C_{18}$)aryl)boron compounds and halogenated (including perhalogenated) derivatives thereof. In some other embodiments, exemplary Group 13 metal compounds are tris (fluoro-substituted phenyl)boranes, in other embodiments, tris(pentafluorophenyl)borane. In some embodiments, the activating co-catalyst is a tris(($C_1$-$C_{20}$)hydrocarbyl)methane borate (e.g., trityl tetrakis(pentafluorophenyl)borate) or a tri(($C_1$-$C_{20}$)hydrocarbyl)ammonium tetra(($C_1$-$C_{20}$)hy drocarbyl)borate (e.g., bis(octadecyl)methylammonium tetrakis (pentafluorophenyl)borate). As used herein, the term "ammonium" means a nitrogen cation that is a (($C_1$-$C_{20}$)hydrocarbyl)$_4N^+$, a (($C_1$-$C_{20}$)hydrocarbyl)$_3N(H)^+$, a (($C_1$-$C_{20}$)hydrocarbyl)$_2N(H)_2^+$, ($C_1$-$C_{20}$)hydrocarbylN$(H)_3^+$, or $N(H)_4^+$, wherein each ($C_1$-$C_{20}$)hydrocarbyl may be the same or different.

Exemplary combinations of neutral Lewis acid activating co-catalysts include mixtures comprising a combination of a tri(($C_1$-$C_4$)alkyl)aluminum and a halogenated tri(($C_6$-$C_{18}$)aryl)boron compound, especially a tris(pentafluorophenyl)borane. Other exemplary embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Exemplary embodiments ratios of numbers of moles of (metal-ligand complex):(tris(pentafluoro-phenylborane): (alumoxane) [e.g., (Group 4 metal-ligand complex):(tris(pentafluoro-phenylborane):(alumoxane)] are from 1:1:1 to 1:10:30, other exemplary embodiments are from 1:1:1.5 to 1:5:10.

Many activating co-catalysts and activating techniques have been disclosed with respect to different metal-ligand complexes in the following USPNs: U.S. Pat. Nos. 5,064,802; 5,296,433; 5,321,106; 5,350,723; 5,425,872; 5,625,087; 5,783,512; 5,883,204; 5,919,983; 6,696,379; and 7,163,907; the entire contents of each of which are incorporated herein by reference. Examples of suitable hydrocarbyloxides are disclosed in U.S. Pat. No. 5,296,433. Examples of suitable Bronsted acid salts for addition polymerization catalysts are disclosed in U.S. Pat. Nos. 5,064,802; 5,919,983; 5,783,512. Examples of suitable salts of a cationic oxidizing agent and a non-coordinating, compatible anion as activating co-catalysts for addition polymerization catalysts are disclosed in U.S. Pat. No. 5,321,106. Examples of suitable carbenium salts as activating co-catalysts for addition polymerization catalysts are disclosed in U.S. Pat. No. 5,350,723. Examples of suitable silylium salts as activating co-catalysts for addition polymerization catalysts are disclosed in U.S. Pat. No. 5,625,087. Examples of suitable complexes of alcohols, mercaptans, silanols, and oximes with tris(pentafluorophenyl)borane are disclosed in U.S. Pat. No. 5,296,433. Some of these catalysts are also described in a portion of U.S. Pat. No. 6,515,155 B1 beginning at column 50, at line 39, and going through column 56, at line 55, only the portion of which is incorporated by reference herein.

In some embodiments, the procatalyst comprising the metal-ligand complex of Formula (I) may be activated to form an active catalyst composition by combination with one or more cocatalyst such as a cation forming cocatalyst, a strong Lewis acid, or a combination thereof. Suitable cocatalysts for use include polymeric or oligomeric aluminoxanes, especially methyl aluminoxane, as well as inert, compatible, noncoordinating, ion forming compounds. Exemplary suitable cocatalysts include, but are not limited to modified methyl aluminoxane (MMAO); bis(hydrogenated tallow alkyl)methylammonium tetrakis(pentafluorophenyl)borate; triethyl aluminum (TEA); and any combinations thereof.

In some embodiments, one or more of the foregoing activating co-catalysts are used in combination with each other. In embodiments, a mixture of a tri(($C_1$-$C_4$)hydrocarbyl)aluminum, tri(($C_1$-$C_4$)hydrocarbyl)borane, or an ammonium borate with an oligomeric or polymeric alumoxane compound may be used.

The ratio of total number of moles of one or more metal-ligand complexes of Formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, in certain embodiments, the number of moles of the alumoxane that are employed is at least 100 times the number of moles of the metal-ligand complex of Formula (I). When tris(pentafluorophenyl)borane alone is used as the activating co-catalyst, in some other embodiments, the number of moles of the tris(pentafluorophenyl)borane that are employed to the total number of moles of one or more metal-ligand complexes of Formula (I) form 1:0.5 to 1:10, in some other embodiments, from 1:1 to 1:6, in some other embodiments, from 1:1 to 1:5. The remaining activating co-catalysts are generally employed in approximately mole quantities equal to the total mole quantities of one or more metal-ligand complexes of Formula (I).

Polyolefin Compositions

The polyolefin composition disclosed herein comprises the reaction product of one or more olefinic monomers with the olefin polymerization catalyst system disclosed herein under polymerization conditions and in the presence of one or more co-catalysts and/or scavengers.

The polyolefin composition disclosed herein can, for example, be an ethylene-based polymer, for example homopolymers and/or interpolymers (including copolymers) of ethylene and optionally one or more comonomers such as α-olefins. Such ethylene-based polymers can have a density in the range of 0.860 to 0.973 g/cm$^3$. All individual values and subranges from 0.860 to 0.973 g/cm$^3$ are included herein and disclosed herein; for example, the density can be from a lower limit of 0.860, 0.880, 0.885, 0.900, 0.905, 0.910, 0.915, or 0.920 g/cm$^3$ to an upper limit of 0.973, 0.963, 0.960, 0.955, 0.950, 0.925, 0.920, 0.915, 0.910, or 0.905 g/cm$^3$.

As used herein, the term "ethylene-based polymer" means a polymer having greater than 50 mol % units derived from ethylene monomer.

In one embodiment, the ethylene-based polymers can have a long chain branching frequency in the range of from 0.0 to 3 long chain branches (LCB) per 1000 carbon atoms. Branches per 1000 carbons may be determined by the ratio of branched carbons relative to the total carbons through standard $^{13}$C NMR combined with a Distortionless Enhancement by Polarization Transfer (DEPT) experiment to determine the resonances associated with branched carbons within the $^{13}$C NMR. In one embodiment, the ethylene-based polymers can have a molecular weight distribution ($M_w/M_n$) (measured according to the conventional GPC method) in the range of from greater than or equal to 2.0. All individual values and subranges from greater than or equal to 2 are included herein and disclosed herein; for example, the ethylene/α-olefin copolymer may have a molecular weight distribution ($M_w/M_n$) in the range of from 2 to 20; or in the alternative, the ethylene/α-olefin interpolymer may have a molecular weight distribution ($M_w/M_n$) in the range of from 2 to 5.

In another embodiment, the ethylene-based polymers may have a molecular weight distribution, $M_w/M_n$, of less than 2, e.g., when chain transfer agents are used in the polymerization. All individual values and subranges less than 2 are included and disclosed herein. For example, the $M_w/M_n$ of the ethylene-based polymers may be less than 2, or in the alternative, less than 1.9, or in the alternative, less than 1.8, or in the alternative, less than 1.5. In a particular embodiment, the ethylene-based polymer has a molecular weight distribution from 0.5 to 2.

In one embodiment, the ethylene-based polymers can have a molecular weight ($M_w$) in the range of from equal to or greater than 20,000 g/mole, for example, in the range of from 20,000 to 1,800,000 g/mole, or in the alternative, from 20,000 to 350,000 g/mole, or in the alternative, from 100,000 to 750,000 g/mole.

In one embodiment, the ethylene-based polymers can have a melt index ($I_2$) in the range of 0.02 to 200 g/10 minutes, as measured according to ASTM D1238 (incorporated herein by reference in its entirety) at 190° C. under a 2.16 kg load. All individual values and subranges from 0.02 to 200 g/10 minutes are included herein and disclosed herein; for example, the melt index ($I_2$) can be from a lower limit of 0.1, 0.2, 0.5, 0.6, 0.8, 1, 1.5, 2.0, 2.5, 3.0, 3.5, 4.0, 4.5, 5.0, 10, 15, 20, 30, 40, 50, 60, 80, 90, 100, or 150 g/10 minutes, to an upper limit of 0.9, 1, 1.5, 2.0, 2.5, 3.0, 3.5, 4.0, 4.5, 5.0, 10, 15, 20, 30, 40, 50, 60, 80, 90, 100, 150, or 200 g/10 minutes.

In one embodiment, the ethylene-based polymers can have a melt flow ratio ($I_{10}/I_2$) in the range of from 5 to 30, in which $I_2$ is measured as described above and $I_{10}$ is measured according to ASTM D1238 at 190° C. under a 10 kg load. All individual values and subranges from 5 to 30 are included herein and disclosed herein; for example, the melt flow ratio ($I_{10}/I_2$) can be from a lower limit of 5, 5.5, 6, 6.5, 8, 10, 12, 15, 20, or 25 to an upper limit of 5.5, 6, 6.5, 8, 10, 12, 15, 20, 25, or 30.

The ethylene-based polymers may comprise less than 50 mole percent of units derived from one or more α-olefin comonomers. All individual values and subranges from less than 50 mole percent are included herein and disclosed herein; for example, the ethylene-based polymers may comprise from less than 30 mole percent of units derived from one or more α-olefin comonomers; or in the alternative, less than 20 mole percent of units derived from one or more α-olefin comonomers; or in the alternative, from 1 to 20 mole percent of units derived from one or more α-olefin comonomers; or in the alternative, from 1 to 10 mole percent of units derived from one or more α-olefin comonomers.

The α-olefin comonomers typically have no more than 20 carbon atoms. For example, the α-olefin comonomers may have 3 to 10 carbon atoms in some embodiments and 3 to 8 carbon atoms in some embodiments. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

The ethylene-based polymers may comprise greater than 50 mole percent of units derived from ethylene. All individual values and subranges from greater than 50 mole percent are included herein and disclosed herein; for example, the ethylene-based polymers may comprise at least 52 mole percent of units derived from ethylene; or in the alternative, at least 65 percent mole percent of units derived from ethylene; or in the alternative, at least 85 mole percent of units derived from ethylene; or in the alternative, from 50 to 100 mole percent of units derived from ethylene; or in the alternative, from 80 to 100 mole percent of units derived from ethylene.

In one embodiment, the ethylene-based polymer comprises an olefin block copolymer prepared according to aα chain-shuttling polymerization process. The olefin block copolymer or poly(ethylene α-olefin) block copolymer comprises an ethylene-derived hard segment (i.e., polyethylene hard segment) and a soft segment comprising residuals from the α-olefin and ethylene. The residuals of the α-olefin and ethylene typically are approximately randomly distributed in the soft segment. In some embodiments, the polyethylene hard segment is characterizable as having less than 5 mole percent (mol %) of a residual of the α-olefin covalently incorporated therein. In some embodiments, the poly(ethylene α-olefin) block copolymer is characterizable as having a melting temperature of greater than 100 degrees Celsius, and in some embodiments, greater than 120° C., as determined by Differential Scanning calorimetry using the procedure described later. The poly(ethylene α-olefin) block copolymers comprise ethylene residuals and one or more copolymerizable α-olefin comonomer residuals (i.e., ethylene and one or more copolymerizable α-olefin comonomers in polymerized form). The poly(ethylene α-olefin) block copolymers are characterized by multiple blocks or segments of two or more polymerized monomer units differing in chemical or physical properties. That is, the ethylene/α-olefin interpolymers are block interpolymers, such as in some embodiments, multi-block interpolymers or copolymers. The terms "interpolymer" and copolymer" are used interchangeably herein. In some embodiments, the multi-block copolymer can be represented by the following formula: (AB)n, where n is at least 1, such as in some embodiments, an integer greater than 1, such as 2, 3, 4, 5, 10, 15, 20, 30, 40, 50, 60, 70, 80, 90, 100, or higher, "A" represents a hard block or segment and "B" represents a soft block or segment. In some embodiments, As and Bs are linked in a linear fashion, not in a branched or a star fashion.

"Hard" segments refer to blocks of polymerized units in which ethylene residuals are present in an amount greater than 95 weight percent, and in some embodiments, greater than 98 weight percent in the poly(ethylene α-olefin) block copolymers. In other words, the comonomer (i.e., α-olefin) residuals content in the hard segments is less than 5 weight percent, and in some embodiments, less than 2 weight percent. In some embodiments, the hard segments comprise all or substantially all ethylene residuals. The phrases "polyethylene hard segment" and "ethylene-derived hard segment" are synonymous and mean the hard segment portion of a poly(ethylene α-olefin) block copolymer.

"Soft" segments refer to blocks of polymerized units in which the comonomer (i.e., α-olefin) residuals content is greater than 5 weight percent, greater than 8 weight percent, greater than 10 weight percent, or greater than 15 weight percent in the poly(ethylene α-olefin) block copolymers. In some embodiments, the comonomer residuals content in the soft segments can be greater than 20 weight percent, greater than 25 eight percent, greater than 30 weight percent, greater than 35 weight percent, greater than 40 weight percent, greater than 45 weight percent, greater than 50 weight percent, or greater than 60 weight percent.

Polymerization Process

Any conventional polymerization processes may be employed to produce the polyolefin composition disclosed herein. Such conventional polymerization processes include, but are not limited to, a solution polymerization process, a particle forming polymerization process, and combinations thereof using one or more conventional reactors, e.g. loop reactors, isothermal reactors, fluidized bed reactors, stirred tank reactors, batch reactors in parallel, series, and/or any combinations thereof.

In one embodiment, the polyolefin composition disclosed herein may, for example, be produced via solution-phase polymerization process using one or more loop reactors, isothermal reactors, and combinations thereof.

In general, the solution phase polymerization process occurs in one or more well-stirred reactors such as one or more loop reactors or one or more spherical isothermal reactors at a temperature in the range of from 120 to 300° C.; for example, from 160 to 215° C., and at pressures in the range of from 300 to 1500 psi; for example, from 400 to 750 psi. The residence time in solution phase polymerization processes is typically in the range of from 2 to 30 minutes; for example, from 5 to 15 minutes. Ethylene, one or more solvents, one or more high temperature olefin polymerization catalyst systems, one or more co-catalysts and/or scavengers, and optionally one or more comonomers are fed continuously to the one or more reactors. Exemplary solvents include, but are not limited to, isoparaffins. For example, such solvents are commercially available under the name ISOPAR™ E from ExxonMobil Chemical Co., Houston, Texas The resultant mixture of the ethylene-based polymer and solvent is then removed from the reactor and the ethylene-based polymer is isolated. Solvent is typically recovered via a solvent recovery unit, i.e. heat exchangers and vapor liquid separator drum, and is then recycled back into the polymerization system.

In one embodiment, the ethylene-based polymer may be produced via solution polymerization in a single reactor system, for example a single loop reactor system, wherein ethylene and optionally one or more α-olefins are polymerized in the presence of one or more high temperature olefin polymerization catalyst systems, optionally one or more other catalysts, and optionally one or more co-catalysts. In one embodiment, the ethylene-based polymer may be produced via solution polymerization in a dual reactor system, for example a dual loop reactor system, wherein ethylene and optionally one or more α-olefins are polymerized in the presence of one or more an olefin polymerization catalyst systems, optionally one or more other catalysts, and optionally one or more co-catalysts. In one embodiment, the ethylene-based polymer may be produced via solution polymerization in a dual reactor system, for example a dual loop reactor system, wherein ethylene and optionally one or more α-olefins are polymerized in the presence of one or more high temperature olefin polymerization catalyst systems, as described herein, in both reactors.

In one embodiment, the ethylene-based polymer may be made using a gas phase polymerization process, e.g., utilizing a fluidized bed reactor. This type reactor and means for operating the reactor are disclosed in, for example, U.S. Pat. Nos. 3,709,853; 4,003,712; 4,011,382; 4,302,566; 4,543,399; 4,882,400; 5,352,749; 5,541,270; EP-A-0 802 202; and Belgian Patent No. 839,380; the entire contents of which are incorporated by reference herein. These patents disclose gas phase polymerization processes wherein the polymerization medium is either mechanically agitated or fluidized by the continuous flow of the gaseous monomer and diluent. Typical reaction temperatures may range from 30° C. to 200° C., from 30° C. to 190° C., from 30° C. to 180° C., from 30° C. to 170° C., from 30° C. to 160° C., from 30° C. to 150° C., from 30° C. to 140° C., from 30° C. to 130° C., from 30° C. to 120° C., from 30° C. to 110° C., from 30° C. to 100° C., from 30° C. to 90° C., from 30° C. to 80° C., from 40° C. to 200° C., from 50° C. to 200° C., from 60° C. to 200° C., from 70° C. to 200° C., from 80° C. to 200° C., from 90° C. to 200° C., from 100° C. to 200° C., from 110° C. to 200° C., from 120° C. to 200° C., from 130° C. to 200° C., from 140° C. to 200° C., or even from 150° C. to 200° C.

A polymerization process may be effected as a continuous gas phase process such as a fluid bed process. A fluid bed reactor may comprise a reaction zone and a so-called velocity reduction zone. The reaction zone may comprise a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may optionally be removed in a cyclone and/or fine filter. The gas is passed through a heat exchanger wherein the heat of polymerization is removed, compressed in a compressor and then returned to the reaction zone.

The reactor temperature of the fluid bed process herein ranges from 30° C. or 40° C. or 50° C. to 90° C. or 100° C. or 110° C. or 120° C. In general, the reactor temperature is operated at the highest temperature that is feasible taking into account the sintering temperature of the polymer product within the reactor. In such a fluid bed process, the polymerization temperature, or reaction temperature should be below the melting or "sintering" temperature of the polymer to be formed. Thus, the upper temperature limit in one embodiment is the melting temperature of the polyolefin produced in the reactor.

A slurry polymerization process can also be used. A slurry polymerization process generally uses pressures in the range of from 1 to 50 atmospheres and even greater and temperatures in the range of 0° C. to 120° C., and more particularly from 30° C. to 100° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, a branched alkane in one embodiment. The medium employed should be liquid under the conditions of polymerization and relatively inert. When a propane medium is used the process must be operated above the reaction diluent critical temperature and pressure. In one embodiment, a hexane, isopentane or isobutane medium is employed.

Also useful is particle form polymerization, a process where the temperature is kept below the temperature at which the polymer goes into solution. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484 and Metallocene-Based Polyolefins Vol. 2 pp. 322-332 (2000); the entire contents of both of which are incorporated by reference herein.

In one embodiment, the procatalyst comprising the metal-ligand complex of Formula (I) may be combined with one or more additional catalysts in a polymerization process. Suitable catalysts for use include any compound or combination of compounds that is adapted for preparing polymers of the desired composition or type. Both heterogeneous and homogeneous catalysts may be employed. Examples of heterogeneous catalysts include the well known Ziegler-Natta compositions, especially Group 4 metal halides supported on Group 2 metal halides or mixed halides and alkoxides and the well known chromium or vanadium based catalysts. In some embodiments, however, for ease of use and for production of narrow molecular weight polymer segments in solution, the catalysts for use herein are homogeneous catalysts comprising a relatively pure organometallic compound or metal complex; especially compounds or complexes based oil metals selected from Groups 3-10 or the Lanthanide series of the Periodic Table of the Elements. In some embodiments, any catalyst employed herein does not significantly detrimentally affect the performance of the other catalyst under the conditions of the present polymerization. Desirably, no catalyst is reduced in activity by greater than 25 percent, and in some embodiments, by greater than let percent, under the conditions of the present polymerization.

In one embodiment, the procatalyst comprising the metal-ligand complex of Formula (I) may be combined with one or more additional catalysts and a chain shuttling agent in a chain-shuttling polymerization process to prepare the aforementioned olefin block copolymer. Suitable catalysts for use include any compound or combination of compounds that is adapted for preparing polymers of the desired composition or type and are capable of chain shuttling. Nonlimiting examples of such catalysts include compositions having structures A, B, or C:

A

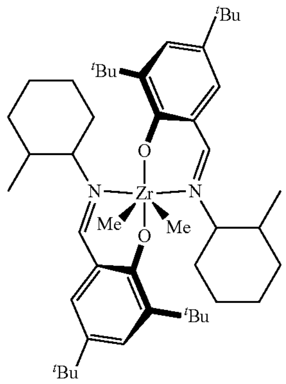

B

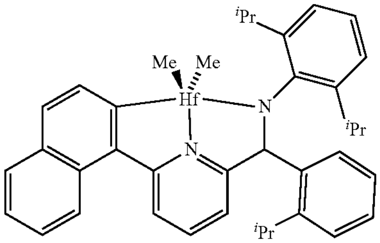

C

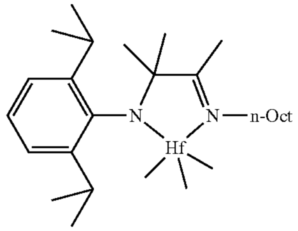

The procatalyst comprising the metal-ligand complex of Formula (I) may be activated to form an active catalyst composition by combination with one or more co-catalysts, as described above.

The ethylene-based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The ethylene-based polymers disclosed herein may contain any amounts of additives. The ethylene-based polymers may compromise from about 0 to about 10 percent by the combined weight of such additives, based on the weight of the ethylene-based polymers and the one or more additives. The ethylene-based polymers may further compromise fillers, which may include, but are not limited to, organic or inorganic fillers. Such fillers, e.g. calcium carbonate, talc, $Mg(OH)_2$, can be present in levels from about 0 to about 20 percent, based on the weight of the inventive ethylene-based polymers and the one or more additives and/or fillers. The ethylene-based polymers may further be blended with one or more polymers to form a blend.

One or more features of the present disclosure are illustrated in view of the examples as follows:

EXAMPLES

General Considerations

All solvents and reagents were obtained from commercial sources and used as received unless otherwise noted. Toluene, hexanes, and benzene-d6 were dried and degassed. Glassware was oven-dried for reactions sensitive to moisture. All metal complexes were synthesized and stored in an inert glovebox under a dry nitrogen atmosphere. NMR spectra were recorded on Varian 400-MR and VNMRS-500 spectrometers. Automated flash column chromatographic purifications were run on Teledyne ISCO (Combi Flash $R_F$ 200i) instruments unless otherwise noted. High Resolution Mass Spectroscopy (HRMS) analyses were carried out using Flow Injection (0.5 ml of 50/50 v/v % of 0.1% formic acid in water/THF) on an Agilent 6520 QTof, Quadrupole-time of flight, MS system via a dual spray electrospray (ESI) interface operating in the positive ion (PI) mode. GC-MS analysis was done on Agilent 7890 GC attached to a 5975C EI/CI MSD detector.

Synthesis of 6-chloro-1-phenyl-1H-pyrrolo[2,3-b]pyridine

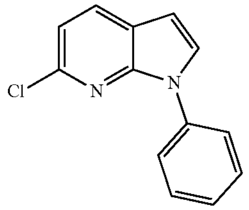 [SMILES: Clc1ccc2ccn(-c3ccccc3)c2n1]

A solution of 6-chloro-7-azaindole (4.0 g, 25.69 mmol), iodobenzene (6.5 g, 32.11 mmol), copper(II) acetate (0.51 g, 3.0 mmol) and cesium carbonate (12.6 g, 36.8 mmol) in DMF (65 mL) were heated at 140° C. for 48 hours. The reaction mixture was cooled to room temperature, diluted with water (50 mL) and extracted with ethyl acetate (2×100 mL). The combined organic extracts were dried over magnesium sulfate and concentrated. The crude mixture was purified by ISCO chromatography using ethyl acetate-hexanes as eluent (0-10%) to afford the literature reported compound as a pale yellow oil (3.14 g, 52%).

$^1$H-NMIt (500 MHz, $CDCl_3$) δ=7.90 (d, J=8.2 Hz, 1H), 7.75 (d, J=7.6 Hz, 2H), 7.51 (m, 3H), 7.35 (t, J=7.4 Hz, 1H), 7.15 (d, J=8.2 Hz, 1H), 6.63 (d, J=3.6 Hz, 1H). UPLC-MS (ESI) m/z=229.052 $[M+H]^+$, calcd. for 229.053.

Synthesis of 1-([1,1'-biphenyl]-3-yl)-6-chloro-1H-pyrrolo[2,3-b]pyridine

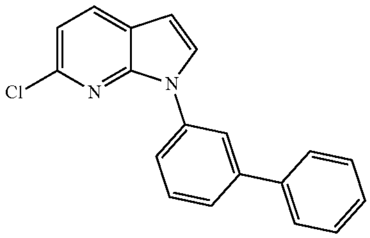 [SMILES: Clc1ccc2ccn(-c3cccc(-c4ccccc4)c3)c2n1]

A solution of 6-chloro-7-azaindole (1.0 g, 6.55 mmol), 3-bromobiphenyl (1.64 g, 9.83 mmol), copper(II) acetate (0.14 g, 0.79 mmol) and cesium carbonate (4.3 g, 13.11 mmol) in DMF (15 mL) were heated at 140° C. for 48 hours. The reaction mixture was cooled to room temperature, diluted with water (50 mL) and extracted with ethyl acetate (2×100 mL). The combined organic extracts were dried over magnesium sulfate and concentrated. The crude mixture was purified by ISCO chromatography using ethyl acetate-hexanes as eluent (0-10%) to afford the title compound as a pale yellow oil (1.02 g, 51%).

$^{1}$H-NMR (500 MHz, $CDCl_3$) δ=7.90 (m, 2H), 7.74 (dt, J=6.8, 2.3 Hz, 1H), 7.64 (dd, J=8.3, 1.3 Hz, 2H), 7.58 (m, 2H), 7.53 (d, J=3.6 Hz, 1H), 7.46 (t, J=7.5 Hz, 2H), 7.37 (m, 1H), 7.15 (d, J=8.2 Hz, 1H), 6.63 (d, J=3.7 Hz, 1H). $^{13}$C-NMR (125 MHz, $CDCl_3$) δ=146.4, 145.2, 142.8, 140.6, 138.5, 131.5, 129.9, 129.0, 128.3, 127.9, 127.4, 125.6, 122.9, 122.8, 120.3, 117.1, 102.1.

Synthesis of 6-chloro-1-(naphthalen-2-yl)-1H-pyrrolo[2,3-b]pyridine

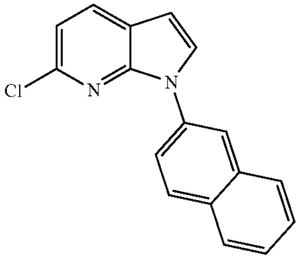 [SMILES: Clc1ccc2ccn(-c3ccc4ccccc4c3)c2n1]

A solution of 6-chloro-7-azaindole (1.0 g, 6.55 mmol), 2-bromonapthalene (2.04 g, 9.83 mmol), copper(II) acetate (0.14 g, 0.79 mmol) and cesium carbonate (4.3 g, 13.11 mmol) in DMF (15 mL) were heated at 140° C. for 48 hours. The reaction mixture was cooled to room temperature, diluted with water (50 mL) and extracted with ethyl acetate (2×100 mL). The combined organic extracts were dried over magnesium sulfate and concentrated. The crude mixture was purified by ISCO chromatography using ethyl acetate-hexanes as eluent (0-10%) to afford the title compound as a colorless oil (1.26 g, 62%).

$^{1}$H-NMR (500 MHz, $CDCl_3$) δ=8.15 (d, J=2.1 Hz, 1H), 8.00 (d, J=8.8 Hz, 1H), 7.91 (m, 4H), 7.61 (d, J=3.6 Hz, 1H), 7.52 (m, 2H), 7.18 (d, J=8.2 Hz, 1H), 6.67 (d, J=3.6 Hz, 1H). $^{13}$C-NMR (125 MHz, $CDCl_3$) δ=146.4, 145.1, 135.4, 133.6, 131.9, 131.3, 129.3, 128.3, 127.9, 127.7, 126.7, 126.0, 122.7, 121.5, 120.1, 117.0, 102.0.

Synthesis of 1-([1,1':3',1"-terphenyl]-5'-yl)-6-chloro-1H-pyrrolo[2,3-b]pyridine

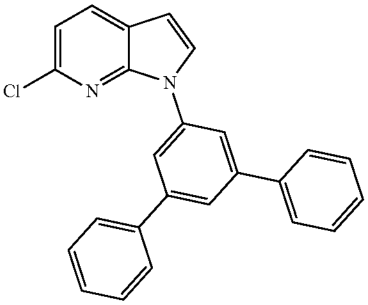 [SMILES: Clc1ccc2ccn(-c3cc(-c4ccccc4)cc(-c4ccccc4)c3)c2n1]

A solution of 6-chloro-7-azaindole (1.0 g, 6.55 mmol), 5'-bromo-1,1':3',1"-terphenyl (3.04 g, 9.8 mmol), copper(II) acetate (0.14 g, 0.79 mmol) and cesium carbonate (4.3 g, 13.1 mmol) in DMSO (10 mL) were heated at 140° C. for 24 hours. The reaction mixture was cooled to room temperature, diluted with water (50 mL) and extracted with diethyl ether (2×100 mL). The combined organic extracts were dried over magnesium sulfate and concentrated. The crude mixture was purified by ISCO chromatography using ethyl acetate-hexanes as eluent (0-10%) to afford the title compound as a white solid (1.9 g, 75%).

$^{1}$H NMR (400 MHz, $CDCl_3$) δ7.94-7.88 (m, 3H), 7.78 (td, J=1.6, 0.5 Hz, 1H), 7.73-7.68 (m, 4H), 7.58 (dd, J=3.6, 0.5 Hz, 1H), 7.53-7.45 (m, 4H), 7.43-7.37 (m, 2H), 7.17 (dd, J=8.2, 0.5 Hz, 1H), 6.65 (dd, J=3.7, 0.5 Hz, 1H). $^{13}$C NMR (101 MHz, $CDCl_3$) δ146.32, 145.14, 143.05, 140.45, 138.71, 131.36, 128.91, 128.16, 127.82, 127.37, 124.44, 121.63, 120.06, 117.02, 101.98.

Synthesis of 6-chloro-1-isopropyl-1H-pyrrolo[2,3-b]pyridine

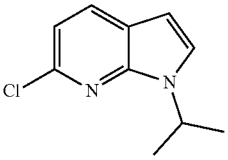

In a 100 mL round-bottom flask, 12 mL of dry DMF was added dropwise over a suspension of 6-chloro-1H-pyrrolo[2,3-b]pyridine (1.00 g, 6.55 mmol, 1.00 eq.), and NaH (60% in oil) (0.315 g, 7.87 mmol, 1.2 eq.) under $N_2$ at 0° C. for 5 mins. During this addition, $H_2$ gas evolved and a pale suspension was formed, the mixture was stirred at room temperature for another 10 min. Then isopropyl bromide (0.74 mL, 7.86 mmol, 1.2 eq.) was added and the solution was stirred at room temperature overnight. After completion of the reaction, the solution was diluted in 100 mL of ice water, then extracted with EtOAc (3×30 mL). The combined organic layers were washed with brine (2×30 mL), filtered, and dried in vacuo. The crude reaction mixture was purified by flash column chromatography on silica gel using 95:5 hexane:EtOAc as eluent to afford the title compound as a colorless oil in 52% yield.

$^1$H NMR ($CDCl_3$, 400 MHz) δ1.50 (d, J=6.8 Hz, 6 H), 5.18 (m, 1H), 6.46 (d, J=3.6 Hz, 1H), 7.05 (d, J=8.1 Hz, 1H0, 7.28 (d, J=3.6 Hz, 1H), 7.81 (d, J=8.2 Hz, 1H). $^{13}$C NMR ($CDCl_3$, 101 MHz) δ23.0, 45.6, 100.1, 115.8, 119.3, 124.5, 131.1, 144.2, 146.0.

Synthesis of 1-benzyl-6-chloro-1H-pyrrolo[2,3-b]pyridine

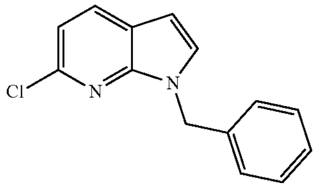 [SMILES: Clc1ccc2ccn(Cc3ccccc3)c2n1]

In a 100 mL round-bottom flask, 12 mL of dry DMF was added dropwise over a suspension of 6-chloro-1H-pyrrolo[2,3-b]pyridine (1.00 g, 6.55 mmol, 1.00 eq.), and NaH (0.189 g, 7.87 mmol, 1.2 eq.) under $N_2$ at 0° C. for 5 mins. During this addition, $H_2$ gas evolved and a pale suspension was formed, the mixture was stirred at room temperature for another 10 min. Then benzyl bromide (0.67 mL, 7.86 mmol, 1.2 eq.) was added and the solution was stirred at room temperature overnight. After completion of the reaction, the solution was diluted in 100 mL of ice water, then extracted with EtOAc (3×30 mL). The combined organic layers were washed with brine (2×30 mL), filtered, and dried in vacuo. The crude reaction mixture was purified by flash column chromatography on silica gel using 95:5 hexane:EtOAc as eluent to afford the title compound as a white solid in 69% yield.

$^1$H NMR ($CDCl_3$, 400 MHz) δ5.46 (s, 2H0, 6.47 (d, J=3.5 Hz, 1H), 7.10 (d, J=8.2 Hz, 1H), 7.13 (d, J=3.5 Hz, 1H), 7.20-7.25 (m, 2H), 7.27-7.35 (m, 3H), 7.85 (d, J=8.2 Hz, 1H). $^{13}$C NMR ($CDCl_3$, 101 MHz) δ48.0, 100.6, 116.1, 119.0, 127.8, 127.9, 128.2, 128.9, 131.2, 137.4, 144.7, 146.9.

Synthesis of 1-butyl-6-chloro-1H-pyrrolo[2,3-b]pyridine

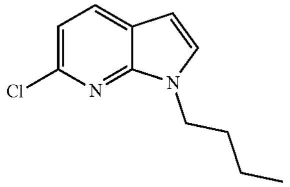

In a 100 mL round-bottom flask, 12 mL of dry DMF was added dropwise over a suspension of 6-chloro-1H-pyrrolo[2,3-b]pyridine (1.00 g, 6.55 mmol, 1.00 eq.), and NaH (0.189 g, 7.87 mmol, 1.2 eq.) under $N_2$ at 0° C. for 5 mins. During this addition, $H_2$ gas evolved and a pale suspension was formed, the mixture was stirred at room temperature for another 10 min. Then 1-bromobutane (0.85 mL, 7.86 mmol, 1.2 eq.) was added and the solution was stirred at room temperature overnight. After completion of the reaction, the solution was diluted in 100 mL of ice water, then extracted with EtOAc (3×30 mL). The combined organic layers were washed with brine (2×30 mL), filtered, and dried in vacuo. The crude reaction mixture was purified by flash column chromatography on silica gel using 95:5 hexane:EtOAc as eluent to afford the title compound as a yellow oil in 54% yield.

$^1$H NMR ($CDCl_3$, 400 MHz) δ0.93 (t, J=7.3 Hz, 3H), 1.34 (m, 2H), 1.83 (m, 2H), 4.25 (t, J=7.2 Hz, 2H), 6.43 (d, J=3.5 Hz, 1H), 7.04 (d, J=8.1 Hz, 1H), 7.18 (d, J=3.5 Hz, 1H), 7.81 (d, J=8.2 Hz, 1H). $^{13}$C NMR ($CDCl_3$, 101 MHz) δ13.8, 20.1, 32.5, 44.5, 99.8, 115.7, 119.1, 128.2, 131.0, 144.4, 146.7.

Synthesis of 6-chloro-1-(3,5-dimethylbenzyl)-1H-pyrrolo[2,3-b]pyridine

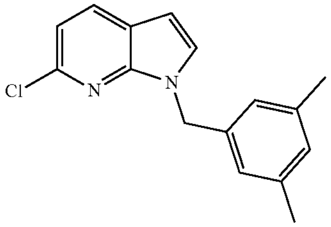 [SMILES: Cc1cc(C)cc(Cn2ccc3ccc(Cl)nc32)c1]

In a 100 mL round-bottom flask, 12 mL of dry DMF was added dropwise over a suspension of 6-chloro-1H-pyrrolo[2,3-b]pyridine (1.00 g, 6.55 mmol, 1.00 eq.), and NaH (0.189 g, 7.87 mmol, 1.2 eq.) under $N_2$ at 0° C. for 5 mins. During this addition, $H_2$ gas evolved and a pale suspension was formed, the mixture was stirred at room temperature for another 10 min. 3,5-dimethylbenzyl bromide (1.57 g, 7.86 mmol, 1.2 eq.) was added and the solution was stirred at room temperature overnight. After completion of the reaction, the solution was diluted in 100 mL of ice water, then extracted with EtOAc (3×30 mL). The combined organic layers were washed with brine (2×30 mL), filtered, and dried in vacuo. The crude reaction mixture was purified by flash column chromatography on silica gel using 99:1 hexane:EtOAc as eluent to afford the title compound in 67% yield.

$^1$H NMR ($CDCl_3$, 400 MHz) δ2.28 (s, 6H), 5.38 (s, 2H), 6.46 (d, J=3.4 Hz, 1H), 6.86 (s, 2H), 6.93 (s, 1H), 7.09 (d, J=8.1 Hz, 1H0, 7.13 (d, J=3.4 Hz, 1H), 7.85 (d, J=8.1 Hz, 1H). $^{13}$C NMR ($CDCl_3$, 101 MHz) δ21.4, 47.9, 100.4, 116.0, 119.0, 125.8, 128.2, 129.6, 131.1, 137.2, 138.5, 144.7, 146.9.

Synthesis of N-neopentyl-1-phenyl-1H-pyrrolo[2,3-b]pyridin-6-amine

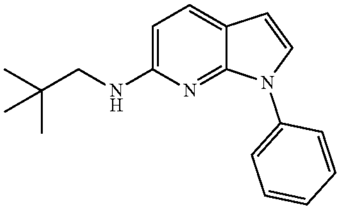 [SMILES: CC(C)(C)CNc1ccc2ccn(-c3ccccc3)c2n1]

A solution of 6-chloro-1-phenyl-1H-pyrrolo[2,3-b]pyridine (1.0 g, 4.4 mmol), $Pd_2(dba)_3$ (0.08 mg, 0.09 mmol), neopentylamine (1.02 mL, 8.8 mmol), rac-BINAP(0.14 mg, 0.22 mmol) and sodium tent-butoxide (1.3 g, 13.1 mmol) in 1,4-dioxane (13 mL) was heated under reflux for 24 hours under nitrogen atmosphere. The reaction was cooled to room temperature, diluted with ethyl acetate (40 mL), passed through a silica gel plug and concentrated. The orange residue was purified subsequently using normal-phase flash chromatography (10% MeOH in $CH_2Cl_2$) to give the compound as a brown oil. The compound was then subjected to reverse-phase chromatography to afford the title compound as a yellow oil (1.2 g, 96%).

$^1$H-NMR (500 MHz, $CDCl_3$) δ=7.84 (dd, J=8.6, 1.2 Hz, 2H), 7.67 (d, J=8.5 Hz, 1H), 7.47 (dd, J=8.4, 7.5 Hz, 2H), 7.19 (d, J=3.6 Hz, 1H), 6.44 (d, J=3.6 Hz, 1H), 6.33 (d, J=8.5 Hz, 1H), 4.46 (s, 1H), 3.19 (d, J=5.4 Hz, 2H), 0.99 (s, 6H). $^{13}$C-NMR (125 MHz, $CDCl_3$) δ=156.4, 139.3, 130.9, 129.0, 125.4, 123.4, 122.8, 113.0, 102.5, 102.2, 54.1, 32.4, 27.8.

Synthesis of N-(4-fluorophenyl)-1-phenyl-1H-pyrrolo[2,3-b]pyridin-6-amine

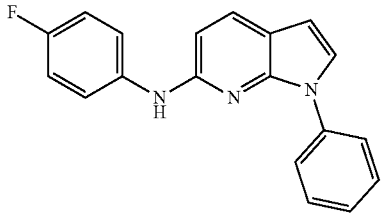 [SMILES: Fc1ccc(Nc2ccc3ccn(-c4ccccc4)c3n2)cc1]

A solution of 6-chloro-1-phenyl-1H-pyrrolo[2,3-b]pyridine (1.0 g, 4.4 mmol), $Pd_2(dba)_3$ (0.08 mg, 0.09 mmol), 4-fluoroaniline (0.8 mL, 8.8 mmol), rac-BINAP(0.14 mg, 0.22 mmol) and sodium tert-butoxide (1.3 g, 13.1 mmol) in 1,4-dioxane (13 mL) was heated under reflux for 24 hours under nitrogen atmosphere. The reaction was cooled to room temperature, diluted with ethyl acetate (40 mL), passed through a silica gel plug and concentrated. The orange residue was purified subsequently using normal-phase flash chromatography (10% MeOH in $CH_2Cl_2$) to give the compound as a brown oil. The compound was then subjected to reverse-phase chromatography to afford the title compound as a brown oil (1.27 g, 96%).

$^1$H-NMR (500 MHz, $CDCl_3$) δ=7.81 (m, 2H), 7.78 (m, 1H), 7.49 (m, 6H), 7.30 (d, J=3.6 Hz, 1H), 6.99 (dd, J=9.0, 8.4 Hz, 2H), 6.61 (m, 1H), 6.52 (d, J=3.6 Hz, 1H), 6.38 (s, 2H). $^{13}$C-NMR (125 MHz, $CDCl_3$) δ=159.4, 157.1, 151.9, 146.2, 138.9, 137.5, 131.2, 129.2, 126.0, 124.4, 123.7, 121.1, 121.0, 115.8, 115.5, 114.8, 104.3, 102.3. $^{19}$F-NMR (470 MHz, $CDCl_3$) δ=−121.76.

Synthesis of N-mesityl-1-phenyl-1H-pyrrolo[2,3-b]pyridin-6-amine

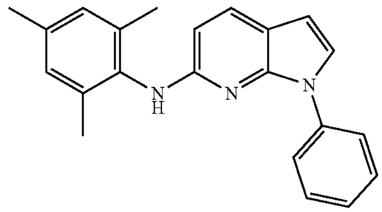 [SMILES: Cc1cc(C)c(Nc2ccc3ccn(-c4ccccc4)c3n2)c(C)c1]

A solution of 6-chloro-1-phenyl-1H-pyrrolo[2,3-b]pyridine (1.0 g, 4.4 mmol), $Pd_2(dba)_3$ (0.08 mg, 0.09 mmol), mesidine (1.2 mL, 8.8 mmol), rac-BINAP(0.14 mg, 0.22 mmol) and sodium tert-butoxide (1.3 g, 13.1 mmol) in 1,4-dioxane (13 mL) was heated under reflux for 24 hours under nitrogen atmosphere. The reaction was cooled to room temperature, diluted with ethyl acetate (40 mL), passed through a silica gel plug and concentrated. The orange residue was purified subsequently using normal-phase flash chromatography (10% MeOH in $CH_2Cl_2$) to give the compound as a brown oil. The compound was then subjected to reverse-phase chromatography to afford the title compound as a yellow solid (0.92 g, 64%).

$^1$H-NMR (500 MHz, $CDCl_3$) δ=7.84 (dd, J=8.6, 1.1 Hz, 1H), 7.63 (dd, J=8.5, 0.5 Hz, 1H), 7.49 (dd, J=8.5, 7.5 Hz, 2H), 7.29 (m, 1H), 7.23 (d, J=3.6 Hz, 1H), 6.96 (d, J=0.9 Hz, 2H), 6.46 (d, J=3.6 Hz, 1H), 5.94 (d, J=8.5 Hz, 1H), 5.90 (s, 1H), 2.32 (s, 3H), 2.21 (s, 6H). $^{13}$C-NMR (125 MHz, $CDCl_3$) δ=154.8, 147.0, 139.2, 136.9, 136.2, 134.7, 131.2, 129.3, 129.2, 125.7, 123.7, 123.6, 114.1, 102.1, 101.0, 21.1, 18.6.

Synthesis of 1-([1,1'-biphenyl]-3-yl)-N-mesityl-1H-pyrrolo[2,3-b]pyridin-6-amine

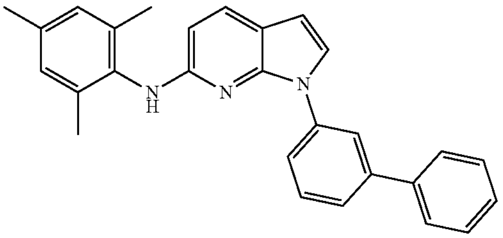 [SMILES: Cc1cc(C)c(Nc2ccc3ccn(-c4cccc(-c5ccccc5)c4)c3n2)c(C)c1]

A solution of 1-([1,1'-biphenyl]-3-yl)-6-chloro-1H-pyrrolo[2,3-b]pyridine (0.49 g, 1.6 mmol), $Pd(dppf)Cl_2 \cdot DCM$ (0.04 g, 0.048 mmol), mesidine (0.25 mL, 1.8 mmol) and sodium tert-butoxide (0.31 g, 3.2 mmol) in toluene (3 mL) was heated under reflux for 24 hours under nitrogen atmosphere. The reaction was cooled to room temperature, diluted with ethyl acetate (40 mL), passed through a silica gel plug and concentrated. The orange residue was purified subsequently using normal-phase ISCO flash chromatography (0-10% ethyl acetate in hexanes) to afford the title compound as a yellow oil (0.45 g, 85%).

$^1$H-NMR (500 MHz, $CDCl_3$) δ=8.01 (s, 1H), 7.85 (ddd, J=7.8, 2.1, 1.3 Hz, 1H), 7.67 (dd, J=8.3, 1.2 Hz, 3H), 7.54 (m, 5H), 7.41 (m, 1H), 7.28 (d, J=3.7 Hz, 1H), 6.96 (d, J=1.1 Hz, 2H), 6.51 (d, J=3.6 Hz, 1H), 6.01 (d, J=8.5 Hz, 1H), 5.93 (s, 1H), 2.33 (s, 3H), 2.23 (s, 6H). $^{13}$C-NMR (125 MHz, $CDCl_3$) δ=142.5, 141.0, 136.8, 129.6, 129.3, 128.9, 127.7, 127.4, 123.8, 122.7, 122.5, 114.0, 102.3, 101.2, 21.1, 18.6.

Synthesis of N-mesityl-1-(naphthalen-2-yl)-1H-pyrrolo[2,3-b]pyridin-6-amine

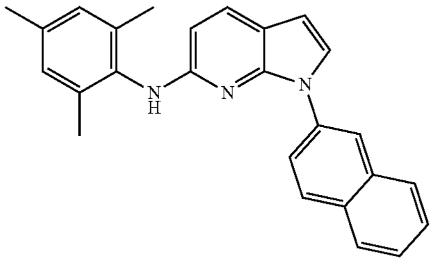 [SMILES: Cc1cc(C)c(Nc2ccc3ccn(-c4ccc5ccccc5c4)c3n2)c(C)c1]

A solution of 6-chloro-1-(naphthalen-2-yl)-1H-pyrrolo[2,3-b]pyridine (0.68 g, 2.5 mmol), $Pd(dppf)Cl_2 \cdot DCM$ (0.06 g, 0.074 mmol), mesidine (0.38 mL, 2.7 mmol) and sodium tert-butoxide (0.47 g, 4.9 mmol) in toluene (3 mL) was heated under reflux for 24 hours under nitrogen atmosphere. The reaction was cooled to room temperature, diluted with ethyl acetate (40 mL), passed through a silica gel plug and concentrated. The orange residue was purified subsequently using normal-phase ISCO flash chromatography (0-10% ethyl acetate in hexanes) to afford the title compound as a yellow oil (0.5 g, 62%).

$^1$H-NMR (500 MHz, $CDCl_3$) δ=8.27 (d, J=2.0 Hz, 1H), 8.04 (dd, J=8.8, 2.1 Hz, 1H), 7.97 (d, J=8.8 Hz, 1H), 7.89 (d, J=9.2 Hz, 2H), 7.69 (d, J=8.5 Hz, 1H), 7.53 (m, 2H), 7.36 (d, J=3.6 Hz, 1H), 6.99 (d, J=1.2 Hz, 2H), 6.54 (d, J=3.6 Hz, 1H), 6.04 (d, J=8.5 Hz, 1H), 5.96 (s, 1H), 2.36 (s, 3H), 2.24 (s, 6H). $^{13}$C-NMR (125 MHz, $CDCl_3$) δ=136.8, 136.2, 133.9, 131.6, 129.3, 129.0, 128.1, 127.8, 126.6, 125.7, 123.8, 122.8, 120.9, 114.1, 102.5, 101.3, 21.1, 18.6, 14.3.

Synthesis of 1-([1,1'-biphenyl]-3-yl)-N-(2,6-diisopropylphenyl)-1H-pyrrolo[2,3-b]pyridin-6-amine

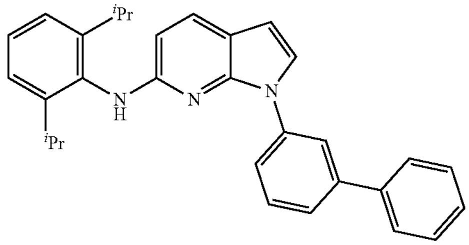 [SMILES: CC(C)c1cccc(C(C)C)c1Nc1ccc2ccn(-c3cccc(-c4ccccc4)c3)c2n1]

A solution of 1-([1,1'-biphenyl]-3-yl)-6-chloro-1H-pyrrolo[2,3-b]pyridine (0.47 g, 1.5 mmol), $Pd(dppf)Cl_2 \cdot DCM$ (0.038 g, 0.046 mmol), 2,6-diisopropylaniline (0.41 g, 2.3 mmol) and sodium tert-butoxide (0.3 g, 3.1 mmol) in toluene (3 mL) was heated under reflux for 24 hours under nitrogen atmosphere. The reaction was cooled to room temperature, diluted with ethyl acetate (40 mL), passed through a silica gel plug and concentrated. The orange residue was purified using normal-phase (0-10% ethyl acetate in hexanes) followed by reverse phase (50-100% water-acetonitrile) ISCO flash chromatography to afford the title compound as a white solid (0.28 g, 55%).

$^1$H-NMR (400 MHz, $CDCl_3$) δ8.03 (t, J=1.9 Hz, 1H), 7.85 (ddd, J=7.8, 2.1, 1.3 Hz, 1H), 7.65 (d, J=8.3 Hz, 4H), 7.58 (t, J=7.7 Hz, 1H), 7.53 (dt, J=7.7, 1.5 Hz, 1H), 7.51-7.45 (m, 2H), 7.42-7.36 (m, 1H), 7.33 (dd, J=8.5, 6.7 Hz, 1H), 7.28 (d, J=3.6 Hz, 1H), 7.24 (dd, J=1.3, 0.7 Hz, 1H), 6.50 (d, J=3.6 Hz, 1H), 6.07-5.88 (m, 2H), 3.30 (p, J=6.9 Hz, 2H), 1.15 (d, J=7.0 Hz, 12H). $^{13}$C-NMR (101 MHz, $CDCl_3$) δ155.90, 147.96, 146.90, 142.66, 140.84, 139.76, 134.18, 131.05, 128.85, 127.70, 127.64, 127.37, 127.22, 123.84, 123.63, 123.51, 121.52, 116.51, 113.74, 28.31, 23.85.

Synthesis of 1-([1,1':3',1"-terphenyl]-5'-yl)-N-(2,6-diisopropylphenyl)-1H-pyrrolo[2,3-b]pyridin-6-amine

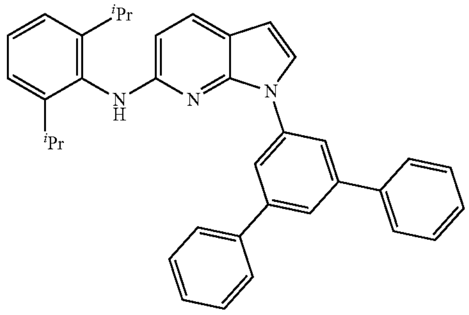 [SMILES: CC(C)c1cccc(C(C)C)c1Nc1ccc2ccn(-c3cc(-c4ccccc4)cc(-c4ccccc4)c3)c2n1]

A solution of 1-([1,1':3',1"-terphenyl]-5'-yl)-6-chloro-1H-pyrrolo[2,3-b]pyridine (0.5 g, 1.3 mmol), $Pd(dppf)Cl_2 \cdot DCM$ (0.032 g, 0.039 mmol), 2,6-diisopropylaniline (0.35 g, 2.0 mmol) and sodium tert-butoxide (0.25 g, 2.6 mmol) in toluene (3 mL) was heated under reflux for 24 hours under nitrogen atmosphere. The reaction was cooled to room temperature, diluted with ethyl acetate (40 mL), passed through a silica gel plug and concentrated. The orange residue was purified using normal-phase (0-10% ethyl acetate in hexanes) followed by reverse phase (50-100% water-acetonitrile) ISCO flash chromatography to afford the title compound as a white solid (0.24 g, 35%).

$^1$H-NMR (400 MHz, $CDCl_3$) δ8.00 (d, J=1.6 Hz, 2H), 7.73 (t, J=1.7 Hz, 1H), 7.72-7.63 (m, 5H), 7.53-7.44 (m, 4H), 7.43-7.37 (m, 2H), 7.34-7.28 (m, 2H), 7.26-7.20 (m, 2H), 6.50 (d, J=3.6 Hz, 1H), 6.01 (d, J=8.5 Hz, 1H), 5.92 (s, 1H), 3.29 (p, J=6.9 Hz, 2H), 1.14 (d,J=6.9 Hz, 12H). $^{13}$C-NMR (101 MHz, $CDCl_3$) δ155.90, 147.96, 146.90, 142.66, 140.84, 139.76, 134.18, 131.05, 128.85, 127.70, 127.64, 127.37, 127.22, 123.84, 123.63, 123.51, 121.52, 116.51, 113.74, 28.31, 23.85.

Synthesis of 1-([1,1':3',1"-terphenyl]-5'-yl)-N-mesityl-1H-pyrrolo[2,3-b]pyridin-6-amine

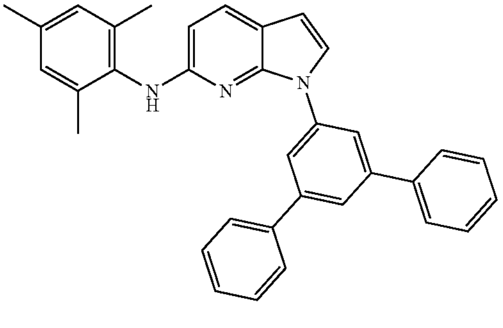 [SMILES: Cc1cc(C)c(Nc2ccc3ccn(-c4cc(-c5ccccc5)cc(-c5ccccc5)c4)c3n2)c(C)c1]

A solution of 1-([1,1':3',1"-terphenyl]-5'-yl)-6-chloro-1H-pyrrolo[2,3-b]pyridine (0.5 g, 1.3 mmol), Pd(dppf)$Cl_2$·DCM (0.032 g, 0.039 mmol), mesidine (0.27 g, 2.0 mmol) and sodium tert-butoxide (0.25 g, 2.6 mmol) in toluene (3 mL) was heated under reflux for 24 hours under nitrogen atmosphere. The reaction was cooled to room temperature, diluted with ethyl acetate (40 mL), passed through a silica gel plug and concentrated. The orange residue was purified using normal-phase (0-10% ethyl acetate in hexanes) ISCO flash chromatography to afford the title compound as a pink solid (0.24 g, 55%).

$^1$H-NMR (400 MHz, $CDCl_3$) δ7.97 (dd, J=1.6, 0.5 Hz, 2H), 7.91 (td, J=1.4, 0.4 Hz, 2H), 7.77 (td, J=1.7, 0.5 Hz, 1H), 7.72-7.67 (m, 10H), 7.65 (d, J=8.5 Hz, 1H), 7.58 (dd, J=3.6, 0.5 Hz, 1H), 7.51-7.45 (m, 9H), 7.42-7.38 (m, 4H), 7.29 (dd, J=3.6, 0.5 Hz, 1H), 7.17 (dd, J=8.2, 0.5 Hz, 1H), 6.92-6.87 (m, 2H), 6.65 (dd, J=3.7, 0.5 Hz, 1H), 6.49 (dd, J=3.6, 0.5 Hz, 1H), 6.01 (dd, J=8.4, 0.5 Hz, 1H), 5.87 (s, 1H), 2.27 (s, 3H), 2.19 (s, 6H). $^{13}$C-NMR (101 MHz, $CDCl_3$) δ154.67, 146.92, 145.14, 143.05, 142.70, 140.87, 140.45, 139.77, 138.69, 136.55, 135.92, 134.48, 131.34, 131.10, 129.08, 128.89, 128.82, 128.16, 127.80, 127.61, 127.37, 127.36, 124.46, 123.60, 123.57, 121.65, 121.46, 120.04, 117.01, 113.79, 102.15, 101.95, 101.30, 20.93, 18.47.

Synthesis of 1-butyl-N-(2,6-diisopropylphenyl)-1H-pyrrolo[2,3-b]pyridine-6-amine

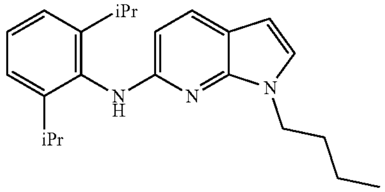 [SMILES: CCCCn1ccc2ccc(Nc3c(C(C)C)cccc3C(C)C)nc21]

A solution of 1-butyl-6-chloro-1H-pyrrolo[2,3-b]pyridine (0.075 g, 0.36 mmol), Pd(dppf)$Cl_2$·DCM (0.018 g, 0.022 mmol), 2,6-diisopropylaniline (0.076 mL, 0.40 mmol) and sodium tert-butoxide (0.069 g, 0.72 mmol) in toluene (0.53 mL) was heated under reflux for 16 hours under nitrogen atmosphere. The reaction was cooled to room temperature, diluted with dichloromethane (8 mL) and washed with 4 mL of brine. The combined organics were concentrated on silica gel and purified via flash column chromatography on silica gel using a gradient (0%-10% ethyl acetate in hexanes) to give the title compound in 63% yield as a clear oil.

$^1$H NMR ($CDCl_3$, 400 MHz) δ1.01 (t, J=7.3 Hz, 3H), 1.19 (d, J=6.9 Hz, 12 H), 1.39-1.48 (m, 2H), 1.85-1.92 (m, 2H), 3.27-3.36 (m, 2H), 4.21 (t, J=7.2 Hz, 2H), 5.90 (d, J=8.4 Hz, 2H), 6.32 (d, J=3.3 Hz, 1H), 6.95 (d, J=3.4 Hz, 1H), 7.27 (d, J=7.6 Hz, 1H), 7.34-7.38 (m, 1H), 7.59 (d, J=8.4 Hz, 1H). $^{13}$C NMR ($CDCl_3$, 101 MHz) δ13.9, 20.3, 24.0, 28.4, 32.6, 43.9, 99.5, 100.4, 113.0, 123.8, 124.0, 127.7, 129.0, 130.7, 134.7, 148.1, 155.6.

Synthesis of 1-butyl-N-(2,6-dimethylphenyl)-1H-pyrrolo[2,3-b]pyridine-6-amine

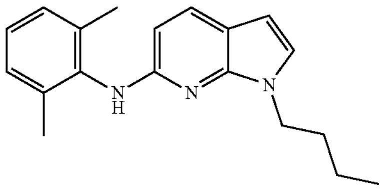 [SMILES: CCCCn1ccc2ccc(Nc3c(C)cccc3C)nc21]

A solution of 1-butyl-6-chloro-1H-pyrrolo[2,3-b]pyridine (0.075 g, 0.36 mmol), Pd(dppf)$Cl_2$·DCM (0.018 g, 0.022 mmol), 2,6-dimethylaniline (0.050 mL, 0.40 mmol) and sodium tert-butoxide (0.069 g, 0.72 mmol) in toluene (0.53 mL) was heated under reflux for 16 hours under nitrogen atmosphere. The reaction was cooled to room temperature, diluted with dichloromethane (8 mL) and washed with 4 mL of brine. The combined organics were concentrated on silica gel and purified via flash column chromatography on silica gel using a gradient (0%-10% ethyl acetate in hexanes) to give the title compound in 67% yield as a clear oil.

$^1$H NMR ($CDCl_3$, 400 MHz) δ0.98 (t, J=7.3 Hz, 3H), 1.40 (m, 2H), 2.28 (s, 6H), 4.17 (t, J=7.2 Hz, 2H), 5.92 (d, J=5.9 Hz, 1H), 5.95 (s, 1H), 6.30 (d, J=3.4 Hz, 1H), 6.93 (d, J=3.4 Hz, 1H), 7.11-7.17 (m, 3H), 7.59 (d, J=8.4 Hz, 1H). $^{13}$C NMR ($CDCl_3$, 101 MHz) δ13.9, 18.7, 20.3, 32.6, 44.0, 99.5, 100.3, 113.3, 123.9, 126.3, 128.6, 130.9, 136.8, 137.7, 147.0, 154.0.

Synthesis of 1-butyl-N-(3,5-di-tert-butylphenyl)-1H-pyrrolo[2,3-b]pyridine-6-amine

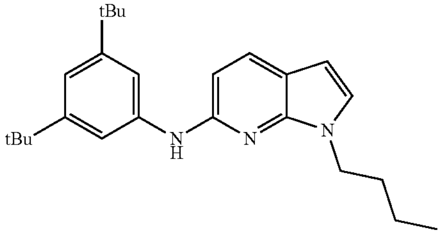 [SMILES: CCCCn1ccc2ccc(Nc3cc(C(C)(C)C)cc(C(C)(C)C)c3)nc21]

A solution of 1-butyl-6-chloro-1H-pyrrolo[2,3-b]pyridine (0.075 g, 0.36 mmol), Pd(dppf)$Cl_2$·DCM (0.018 g, 0.022 mmol), 3,5-di-tert-butylaniline (0.083 mL, 0.40 mmol) and sodium tert-butoxide (0.069 g, 0.72 mmol) in toluene (0.53 mL) was heated under reflux for 16 hours under nitrogen atmosphere. The reaction was cooled to room temperature, diluted with dichloromethane (8 mL) and washed with 4 mL of brine. The combined organics were concentrated on silica gel and purified via flash column chromatography on silica gel using a gradient (0%-10% ethyl acetate in hexanes) to give the title compound in 78% yield as a clear oil.

$^1$H NMR ($CDCl_3$, 400 MHz) δ0.97 (t, J=7.3 Hz, 3H), 1.35-1.43 (m, 2H), 1.39 (s, 18H), 1.88 (m, 2H), 4.26 (t, J=7.2 Hz, 2H), 6.35 (d, J=3.4 Hz, 1H), 6.49 (s, 1H), 6.59 (d, J=8.4 Hz, 1H), 6.98 (d, J3.4 Hz, 1H), 7.10 (s, 1H), 7.50 (s, 2H), 7.73 (d, J=8.4 Hz, 1H). $^{13}$C NMR ($CDCl_3$, 101 MHz) δ13.9, 20.3, 31.7, 32.7, 35.1, 44.2, 99.6, 103.9, 113.4, 113.5, 115.8, 124.4, 130.6, 141.0, 146.4, 151.6, 151.7.

Synthesis of 1-benzyl-N-(2,6-diisopropylphenyl)-1H-pyrolo[2,3-b]pyridine-6-amine

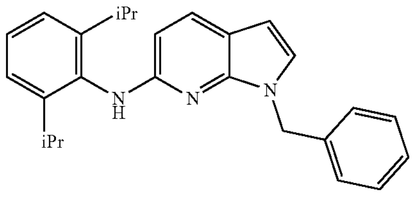 [SMILES: CC(C)c1cccc(C(C)C)c1Nc1ccc2ccn(Cc3ccccc3)c2n1]

A solution of 1-benzyl-6-chloro-1H-pyrrolo[2,3-b]pyridine (0.075 g, 0.31 mmol), Pd(dppf)$Cl_2$·DCM (0.018 g, 0.022 mmol), 2,6-diisopropylaniline (0.066 mL, 0.40 mmol) and sodium tert-butoxide (0.069 g, 0.72 mmol) in toluene (0.53 mL) was heated under reflux for 16 hours under nitrogen atmosphere. The reaction was cooled to room temperature, diluted with dichloromethane (8 mL) and washed with 4 mL of brine. The combined organics were concentrated on silica gel and purified via flash column chromatography on silica gel using a gradient (0%-10% ethyl acetate in hexanes) to give the title compound in 56% yield as a clear oil.

$^1$H NMR ($CDCl_3$, 400 MHz) δ1.17 (d, J=6.9 Hz, 12H), 3.26-3.36 (m, 2H), 5.39 (s, 2H), 5.91 (s, 1H), 5.94 (d, J=8.5 Hz, 1H), 6.33 (d, J=3.5 Hz, 1H), 6.85 (d, J=3.5 Hz, 1H), 7.25-7.37(m, 9H), 7.60 (d, J=8.4 Hz, 1H). $^{13}$C NMR ($CDCl_3$, 101 MHz) δ24.0, 28.4, 47.6, 100.4, 100.8, 112.9, 123.7, 124.0, 127.5, 127.7, 127.8, 128.7, 130.9, 134.7, 138.4, 147.4, 148.1, 155.8.

Synthesis of 1-benzyl-N-(2,6-dimethylphenyl)-1H-pyrrolo[2,3-b]pyridin-6-amine

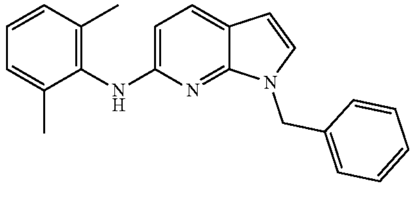 [SMILES: Cc1cccc(C)c1Nc1ccc2ccn(Cc3ccccc3)c2n1]

A solution of 1-benzyl-6-chloro-1H-pyrrolo[2,3-b]pyridine (0.075 g, 0.31 mmol), Pd(dppf)$Cl_2$·DCM (0.018 g, 0.022 mmol), 2,6-dimethylaniline (0.043 mL, 0.35 mmol) and sodium tert-butoxide (0.069 g, 0.72 mmol) in toluene (0.53 mL) was heated under reflux for 16 hours under nitrogen atmosphere. The reaction was cooled to room temperature, diluted with dichloromethane (8 mL) and washed with 4 mL of brine. The combined organics were concentrated on silica gel and purified via flash column chromatography on silica gel using a gradient (0%-10% ethyl acetate in hexanes) to give the title compound in 63% yield as a clear oil.

$^1$H NMR ($CDCl_3$, 400 MHz) δ2.27 (s, 6H), 5.37 (s, 2H), 5.95 (bs, 1H), 5.98 (d, J=8.4 Hz, 1H), 6.34 (d, J=3.5 Hz, 1H), 6.86 (d, J=3.5 Hz, 1H), 7.12-7.18 (m, 3H0, 7.24-7.36 (m, 5H0, 7.63 (d, J=8.4 Hz, 1H). $^{13}$C NMR ($CDCl_3$, 101 MHz) δ18.7, 47.6, 100.4, 100.7, 113.1, 123.9, 126.4, 127.5, 127.8, 128.6, 128.7, 131.0, 136.9, 137.7, 138.4, 147.4, 154.2.

Synthesis of 1-benzyl-N-(3,5-di-tert-butylphenyl)-1H-pyrrolo[2,3-b]pyridine-6-amine

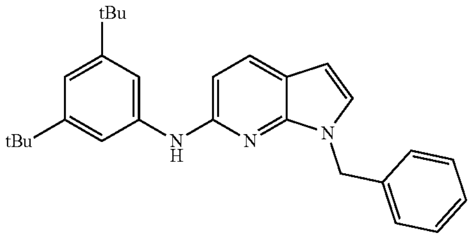 [SMILES: CC(C)(C)c1cc(Nc2ccc3ccn(Cc4ccccc4)c3n2)cc(C(C)(C)C)c1]

A solution of 1-benzyl-6-chloro-1H-pyrrolo[2,3-b]pyridine (0.075 g, 0.31 mmol), Pd(dppf)$Cl_2$·DCM (0.015 g, 0.019 mmol), 3,5-di-tert-butylaniline (0.071 mL, 0.35 mmol) and sodium tert-butoxide (0.059 g, 0.2 mmol) in toluene (0.53 mL) was heated under reflux for 16 hours under nitrogen atmosphere. The reaction was cooled to room temperature, diluted with dichloromethane (8 mL) and washed with 4 mL of brine. The combined organics were concentrated on silica gel and purified via flash column chromatography on silica gel using a gradient (0%-10% ethyl acetate in hexanes) to give the title compound in 92% yield as a clear oil.

$^1$H NMR ($CDCl_3$, 400 MHz) δ1.34 (s, 18H), 5.48 (s, 2H), 6.40 (d, J=3.5 Hz, 1H), 6.55 (bs, 1H), 6.1 (d, J=8.4 Hz, 1H), 6.93 (d, J=3.5 Hz, 1H), 7.10 (s, 1H), 7.23-7.34 (m, 5H), 7.47 (d, J=1.3 Hz, 2H), 7.77 (d, J=8.4 Hz, 1H). $^{13}$C NMR ($CDCl_3$, 101 MHz) δ31.6, 35.0, 47.6, 53.5, 100.6, 104.1, 113.3, 113.7, 116.0, 124.3, 127.46, 127.5, 128.7, 130.9, 138.3, 140.8, 151.6, 152.0.

Synthesis of N-(2,6-diisopropylphenyl)-1-(3,5-dimethylbenzyl)-1H-pyrrolo[2,3-b]pyridin-6-amine

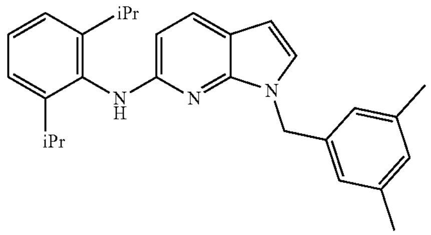 [SMILES: Cc1cc(C)cc(Cn2ccc3ccc(Nc4c(C(C)C)cccc4C(C)C)nc32)c1]

A solution of 6-chloro-1-(3,5-dimethylbenzyl)-1H-pyrrolo[2,3-b]pyridine (0.075 g, 0.28 mmol), Pd(dppf)$Cl_2$·DCM (0.014 g, 0.017 mmol), 2,6-diisopropylaniline (0.059 mL, 0.31 mmol) and sodium tert-butoxide (0.053 g, 0.55 mmol) in toluene (0.53 mL) was heated under reflux for 16 hours under nitrogen atmosphere. The reaction was cooled to room temperature, diluted with dichloromethane (8 mL) and washed with 4 mL of brine. The combined organics were concentrated on silica gel and purified via flash column chromatography on silica gel using a gradient (0%-10% ethyl acetate in hexanes) to give the title compound in 65% yield as a clear oil.

$^1$H NMR ($CDCl_3$, 400 MHz) δ1.20 (d, J=6.88 Hz, 12H), 2.33 (s, 6H), 3.29-3.39 (m, 2H), 5.34 (s, 2H), 5.95 (d, J=8.4 Hz, 1H), 5.91-6.01 (bs, 1H), 6.34 (d, J=3.5 Hz, 1H), 6.87 (d, J=3.5 Hz, 1H), 6.92-6.97 (m, 3H), 7.26-7.30 (m, 2H), 7.35-7.39 (m, 1H), 7.63 (d, J=8.4 Hz, 1H). $^{13}$C NMR ($CDCl_3$, 101 MHz) δ21.4, 24.0, 28.5, 47.6, 100.3, 100.6, 112.9, 123.82, 123.4, 125.8, 125.9, 127.8, 129.2, 131.0, 134.6, 138.1, 138.3, 148.1, 155.7.

Synthesis of 1-(3,5-dimethylbenzyl)-N-(2,6-dimethylphenyl)-1H-pyrrolo[2,3-b]pyridin-6-amine

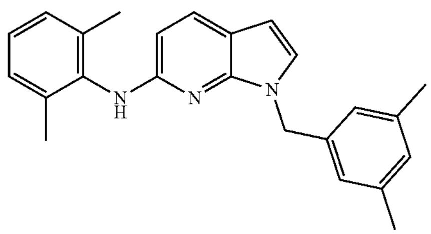 [SMILES: Cc1cc(C)cc(Cn2ccc3ccc(Nc4c(C)cccc4C)nc32)c1]

A solution of 6-chloro-1-(3,5-dimethylbenzyl)-1H-pyrrolo[2,3-b]pyridine (0.075 g, 0.28 mmol), Pd(dppf)$Cl_2$·DCM (0.014 g, 0.017 mmol), 2,6-dimethylaniline (0.038 mL, 0.31 mmol) and sodium tert-butoxide (0.053 g, 0.55 mmol) in toluene (0.53 mL) was heated under reflux for 16 hours under nitrogen atmosphere. The reaction was cooled to room temperature, diluted with dichloromethane (8 mL) and washed with 4 mL of brine. The combined organics were concentrated on silica gel and purified via flash column chromatography on silica gel using a gradient (0%-10% ethyl acetate in hexanes) to give the title compound in 58% yield as a clear oil.

$^{1}$H NMR ($CDCl_3$, 400 MHz) δ2.28 (s, 6H), 2.30 (s, 6H), 5.30 (s, 2H), 5.97 (d, J=8.4 Hz, 1H), 5.95-6.10 (bs, 1H), 6.33 (d, J=3.5 Hz, 1H), 6.86 (d, J=3.5 Hz, 1H), 6.90 (s, 2H), 6.92 (s, 1H), 7.10-7.20 (m, 3H), 7.63 (d, J=8.4 Hz, 1H). $^{13}$C NMR ($CDCl_3$, 101 MHz) δ18.7, 21.4, 47.6, 100.3, 100.6, 113.1, 115.7, 124.0, 125.8, 126.4, 128.6, 129.2, 131.1, 136.8, 137.6, 138.1, 138.3, 154.1.

Synthesis of N-(3,5-di-tert-butylphenyl)-1-(3,5-dimethylbenzyl)-1H-pyrrolo[2,3-b]pyridin-6-amine

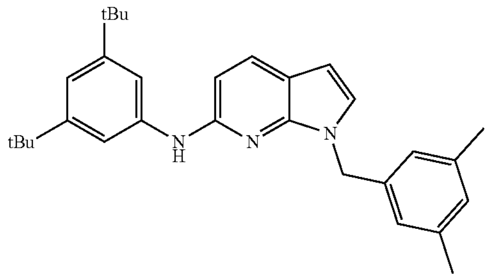 [SMILES: Cc1cc(C)cc(Cn2ccc3ccc(Nc4cc(C(C)(C)C)cc(C(C)(C)C)c4)nc32)c1]

A solution of 6-chloro-1-(3,5-dimethylbenzyl)-1H-pyrrolo[2,3-b]pyridine (0.075 g, 0.28 mmol), Pd(dppf)$Cl_2$·DCM (0.014 g, 0.017 mmol), 3,5-di-tert-butylaniline (0.064 mL, 0.31 mmol) and sodium tert-butoxide (0.053 g, 0.55 mmol) in toluene (0.53 mL) was heated under reflux for 16 hours under nitrogen atmosphere. The reaction was cooled to room temperature, diluted with dichloromethane (8 mL) and washed with 4 mL of brine. The combined organics were concentrated on silica gel and purified via flash column chromatography on silica gel using a gradient (0%-10% ethyl acetate in hexanes) to give the title compound in 66% yield as a clear oil.

$^{1}$H NMR ($CDCl_3$, 400 MHz) δ1.35 (s, 18H), 2.28 (s, 6H), 5.39 (s, 2H), 6.39 (d, J=3.5 Hz, 1H), 6.53 (s, 1H), 6.64 (d, J=8.4 Hz, 1H), 6.87 (s, 2H), 6.89-7.00 (m, 2H), 7.09 (m, 1H), 7.47 (s, 2H), 7.76 (d, J=8.4 Hz, 1H). $^{13}$C NMR ($CDCl_3$, 101 MHz) δ24.4, 31.6, 35.1, 47.5, 100.4, 104.0, 113.3, 113.8, 116.0, 124.4, 125.5, 129.2, 130.8, 138.1, 138.3, 140.9, 146.6, 151.6, 151.9.

Synthesis of N-(2,6-diisopropylphenyl)-1-isopropyl-1H-pyrrolo[2,3-b]pyridin-6-amine

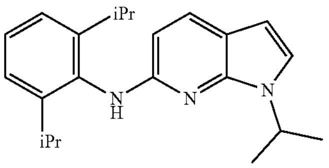 [SMILES: CC(C)c1cccc(C(C)C)c1Nc1ccc2ccn(C(C)C)c2n1]

A solution of 6-chloro-1-isopropyl-1H-pyrrolo[2,3-b]pyridine (0.075 g, 0.39 mmol), Pd(dppf)$Cl_2$·DCM (0.019 g, 0.023 mmol), 2,6-diisopropylaniline (0.082 mL, 0.43 mmol) and sodium tert-butoxide (0.074 g, 0.77 mmol) in toluene (0.73 mL) was heated under reflux for 16 hours under nitrogen atmosphere. The reaction was cooled to room temperature, diluted with dichloromethane (8 mL) and washed with 4 mL of brine. The combined organics were concentrated on silica gel and purified via flash column chromatography on silica gel using a gradient (0%-10% ethyl acetate in hexanes) to give the title compound in 62% yield as a clear oil.

$^{1}$H NMR ($CDCl_3$, 400 MHz) δ1.18 (d, J=6.9 Hz, 12H), 1.52 (d, J=6.8 Hz, 6H), 3.32 (m, 2H), 5.10 (m, 1H), 5.89 (d, J=8.5 Hz, 1H), 5.92 (s, 1H), 6.33 (d, J=3.5 Hz, 1H), 7.04 (d, J=3.5 Hz, 1H), 7.26 (d, J=7.1 Hz, 2H), 7.32-7.37 (m, 2H), 7.58 (d, J=8.5 Hz, 1H). $^{13}$C NMR ($CDCl_3$, 101 MHz) δ23.1, 24.0, 28.4, 44.7, 99.8, 100.5, 113.1, 119.9, 124.0, 127.7, 130.8, 134.6, 146.4, 148.1, 155.4.

Synthesis of N-(2,6-dimethylphenyl)-1-isopropyl-1H-pyrrolo[2,3-b]pyridin-6-amine

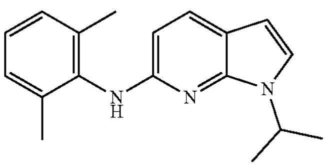 [SMILES: Cc1cccc(C)c1Nc1ccc2ccn(C(C)C)c2n1]

A solution of 6-chloro-1-isopropyl-1H-pyrrolo[2,3-b]pyridine (0.075 g, 0.39 mmol), Pd(dppf)$Cl_2$·DCM (0.019 g, 0.023 mmol), 2,6-dimethylaniline (0.053 mL, 0.43 mmol) and sodium tert-butoxide (0.074 g, 0.77 mmol) in toluene (0.73 mL) was heated under reflux for 16 hours under nitrogen atmosphere. The reaction was cooled to room temperature, diluted with dichloromethane (8 mL) and washed with 4 mL of brine. The combined organics were concentrated on silica gel and purified via flash column chromatography on silica gel using a gradient (0%-10% ethyl acetate in hexanes) to give the title compound in 50% yield as a clear oil.

$^{1}H$ NMR ($CDCl_3$, 400 MHz) δ1.50 (d, J=8.0 Hz, 6H), 2.27 (s, 6H0, 5.02-5.12 (m, 1H), 5.91 (d, J=8.0 Hz, 1H), 5.94 (b s, 1H), 6.32 (d, j=3.5 Hz, 1H), 7.03 (d, J=4.0 1H), 7.10-7.17 (m, 3H0, 7.59 (d, J=12.0 Hz, 1H). $^{13}C$ NMR ($CDCl_3$, 101 MHz) δ18.7, 23.1, 44.8, 99.8, 100.4, 113.4, 120.1, 126.3, 128.6, 130.9, 136.8, 137.7, 146.5, 153.8.

Synthesis of N-(3,5-di-tert-butylphenyl)-1-isopropyl-1H-[2,3-b]pyridin-6-amine

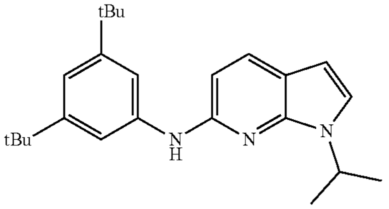 [SMILES: CC(C)n1ccc2ccc(Nc3cc(C(C)(C)C)cc(C(C)(C)C)c3)nc21]

A solution of 6-chloro-1-isopropyl-1H-pyrrolo[2,3-b]pyridine (0.075 g, 0.39 mmol), Pd(dppf)$Cl_2$·DCM (0.019 g, 0.023 mmol), 3,5-di-tert-butylamine (0.089 mL, 0.43 mmol) and sodium tert-butoxide (0.074 g, 0.77 mmol) in toluene (0.73 mL) was heated under reflux for 16 hours under nitrogen atmosphere. The reaction was cooled to room temperature, diluted with dichloromethane (8 mL) and washed with 4 mL of brine. The combined organics were concentrated on silica gel and purified via flash column chromatography on silica gel using a gradient (0%-10% ethyl acetate in hexanes) to give the title compound in 60% yield as a clear oil.

$^{1}H$ NMR ($CDCl_3$, 400 MHz) δ1.38 (s, 18H), 1.53 (d, J=8.0 Hz, 6H0, 5.15-5.25 (m, 1H), 6.38 (d, J=3.5 Hz, 1H), 6.47 (b s, 1H), 6.59 (d, J=8.0 Hz, 1H), 7.08-7.10 (m, 2H), 7.50 (d, J=1.6 Hz, 2H), 7.71 (d, J=8.0 Hz, 1H). $^{13}C$ NMR ($CDCl_3$, 101 MHz) δ23.1, 31.6, 35.1, 45.0, 99.9, 104.1, 113.5, 113.5, 115.8, 120.4, 130.6, 141.0, 145.8, 151.5, 151.6.

Synthesis of Metal-Ligand Complex 1

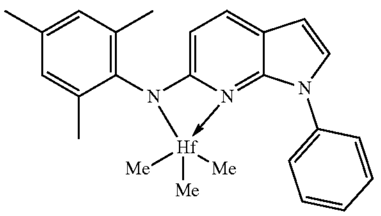

An oven-dried vial was charged with hafnium tetrachloride (0.059 g, 0.18 mmol) and toluene (2 mL). To the stirring slurry was added 3.0 M methylmagnesium bromide in diethyl ether (0.27 mL, 0.81 mmol) to provide a heterogeneous mixture, which upon vigorous stirring for three minutes turned cloudy and light brown. To the mixture was added a solution of the ligand (0.06 g, 0.18 mmol) in toluene (3 mL). The resulting mixture was stirred at room temperature for four hours. The reaction mixture was diluted with hexanes (2 mL) and filtered to obtain a clear solution. The solution was concentrated to afford the title compound as a pale yellow solid (0.1 g, 100%).

$^{1}H$-NMR (500 MHz, $C_6D_6$) δ7.21 (dd, J=8.6, 1.8 Hz, 1H), 7.14-7.06 (m, 4H), 6.98 (dt, J=6.5, 4.3 Hz, 3H), 6.88 (s, 2H), 6.42 (dd, J=3.4, 1.9 Hz, 1H), 6.11 (dd, J=3.5, 1.8 Hz, 1H), 5.55 (dd, J=8.5, 1.8 Hz, 1H), 2.33 (d, J=2.0 Hz, 6H), 2.19 (d, J=2.0 Hz, 3H), 0.33 (d, J=1.9 Hz, 9H). $^{13}C$-NMR (126 MHz, $C_6D_6$) δ164.05, 143.54, 142.43, 138.27, 136.58, 133.95, 133.26, 130.00, 129.17, 127.93, 125.85, 123.70, 113.33, 103.00, 99.11, 65.67, 20.59, 18.35.

Synthesis of Metal-Ligand Complex 2

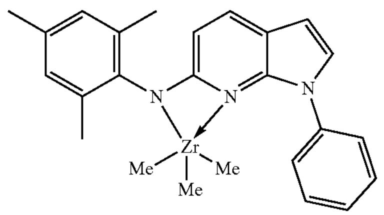

An oven-dried vial was charged with zirconium tetrachloride (0.043 g, 0.18 mmol) and toluene (2 mL). To the stirring slurry was added 3.0 M methylmagnesium bromide in diethyl ether (0.27 mL, 0.81 mmol) to provide a heterogeneous mixture, which upon vigorous stirring for three minutes turned cloudy and black. To the mixture was added a solution of the ligand (0.06 g, mmol) in toluene (3 mL). The resulting mixture was stirred at room temperature for four hours. The reaction mixture was diluted with hexanes (2 mL) and filtered to obtain a clear solution. The solution was concentrated to afford the title compound as a brown solid (0.085 g, 100%).

$^{1}H$-NMR (500 MHz, $C_6D_6$) δ7.29-7.22 (m, 2H), 7.17 (d, J=8.6 Hz, 1H), 7.08 (d, J=7.5 Hz, 1H), 6.98 (dq, J=13.7, 6.7, 6.0 Hz, 2H), 6.87 (t, J=7.7 Hz, 2H), 6.78 (d, J=5.8 Hz, 3H), 6.56 (d, J=3.5 Hz, 1H), 6.18 (d, J=3.5 Hz, 1H), 5.60 (d, J=8.5 Hz, 1H), 2.14 (s, 3H), 2.01 (s, 7H), 1.13-0.65 (m, 9H).

Synthesis of Metal-Ligand Complex 3

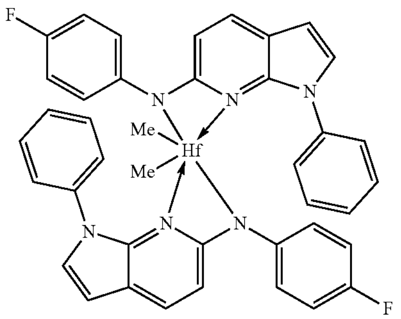

An oven-dried vial was charged with hafnium tetrachloride (0.032 g, 0.10 mmol) and toluene (2 mL). To the stirring slurry was added 3.0 M methylmagnesium bromide in diethyl ether (0.15 mL, 0.44 mmol) to provide a heterogeneous mixture, which upon vigorous stirring for three minutes turned cloudy and light brown. To the mixture was added a solution of the ligand (0.06 g, 0.20 mmol) in toluene (3 mL). The resulting mixture was stirred at room temperature for four hours. The reaction mixture was diluted with hexanes (2 mL) and filtered to obtain a clear solution. The solution was concentrated to afford the title compound as a pale yellow solid (0.081 g, 100%).

$^1$H-NMR (500 MHz, $C_6D_6$) δ7.16-7.07 (m, 7H), 7.06-7.01 (m, 4H), 7.01-6.94 (m, 2H), 6.92-6.83 (m, 8H), 6.77 (dt, J=22.5, 8.0 Hz, 6H), 6.42 (d, J=3.5 Hz, 2H), 6.13 (d, J=3.5 Hz, 2H), 5.96 (d, J=8.7 Hz, 2H), 0.15 (s, 6H). $^{19}$F-NMR (470 MHz, $C_6D_6$) δ−119.98.

Synthesis of Metal-Ligand Complex 4

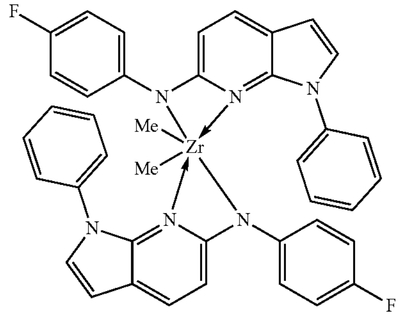

An oven-dried vial was charged with zirconium tetrachloride (0.023 g, 0.10 mmol) and toluene (2 mL). To the stirring slurry was added 3.0 M methylmagnesium bromide in diethyl ether (0.15 mL, 0.44 mmol) to provide a heterogeneous mixture, which upon vigorous stirring for three minutes turned cloudy and black. To the mixture was added a solution of the ligand (0.06 g, 0.20 mmol) in toluene (3 mL). The resulting mixture was stirred at room temperature for four hours. The reaction mixture was diluted with hexanes (2 mL) and filtered to obtain a clear solution. The solution was concentrated to afford the title compound as a brown solid (0.072 g, 100%).

$^1$H-NMR (500 MHz, $C_6D_6$) δ7.14-7.06 (m, 7H), 7.03-6.95 (m, 7H), 6.95-6.90 (m, 4H), 6.86 (q, J=8.7, 7.9 Hz, 8H), 6.72-6.65 (m, 2H), 6.39 (d, J=3.5 Hz, 2H), 6.11 (dd, J=3.6, 0.9 Hz, 2H), 6.04 (d, J=8.7 Hz, 2H), 0.54 (s, 6H). $^{19}$F-NMR (470 MHz, $C_6D_6$) δ−120.21.

Synthesis of Metal-Ligand Complex 5

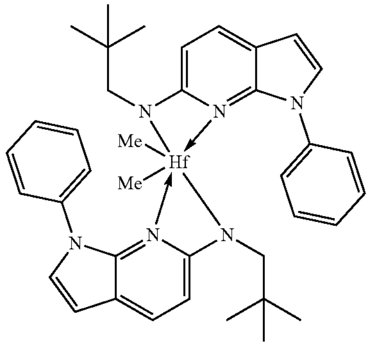

An oven-dried vial was charged with hafnium tetrachloride (0.034 g, 0.11 mmol) and toluene (2 mL). To the stirring slurry was added 3.0 M methylmagnesium bromide in diethyl ether (0.16 mL, 0.47 mmol) to provide a heterogeneous mixture, which upon vigorous stirring for three minutes turned cloudy and light brown. To the mixture was added a solution of the ligand (0.06 g, 0.22 mmol) in toluene (3 mL). The resulting mixture was stirred at room temperature for four hours. The reaction mixture was diluted with hexanes (2 mL) and filtered to obtain a clear solution. The solution was concentrated to afford the title compound as a pale yellow solid (0.082 g, 100%).

$^1$H-NMR (500 MHz, $C_6D_6$) δ7.26 (d, J=8.9 Hz, 2H), 7.20 (d, J=7.2 Hz, 4H), 7.08 (d, J=7.4 Hz, 1H), 6.99 (dt, J=13.2, 7.4 Hz, 6H), 6.82 (s, 2H), 6.51 (d, J=3.6 Hz, 2H), 6.18 (s, 2H), 5.88 (s, 2H), 3.32 (s, 2H), 2.67 (s, 2H), 0.92 (s, 18H), 0.28 (d, J=62.2 Hz, 6H). $^{13}$C-NMR (126 MHz, $C_6D_6$) δ134.43, 129.37, 128.92, 128.15, 125.28, 112.22, 102.82, 98.95, 58.03, 27.86, 21.03.

Synthesis of Metal-Ligand Complex 6

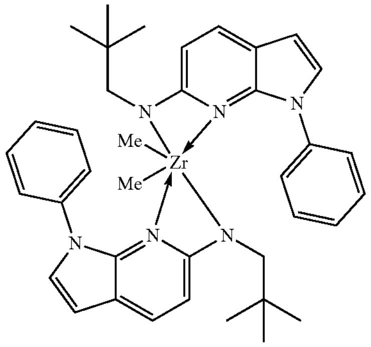

An oven-dried vial was charged with zirconium tetrachloride (0.025 g, 0.11 mmol) and toluene (2 mL). To the stirring slurry was added 3.0 M methylmagnesium bromide in diethyl ether (0.16 mL, 0.47 mmol) to provide a heterogeneous mixture, which upon vigorous stirring for three minutes turned cloudy and black. To the mixture was added a solution of the ligand (0.06 g, mmol) in toluene (3 mL). The resulting mixture was stirred at room temperature for four hours. The reaction mixture was diluted with hexanes (2 mL) and filtered to obtain a clear solution. The solution was concentrated to afford the title compound as a pale yellow solid (0.073 g, 100%).

$^1$H-NMR (400 MHz, $C_6D_6$) δ7.27 (s, 1H), 7.24 (s, 1H), 7.21 (d, J=7.8 Hz, 4H), 7.12-7.04 (m, 1H), 7.02-6.91 (m, 4H), 6.80 (d, J=8.3 Hz, 2H), 6.54 (d, J=3.6 Hz, 2H), 6.20 (d, J=3.5 Hz, 2H), 5.91 (d, J=8.9 Hz, 2H), 3.12 (d, J=67.7 Hz, 2H), 2.64 (d, J=33.0 Hz, 2H), (s, 18H), 0.41 (s, 6H). $^{13}$C-NMR (101 MHz, $C_6D_6$) δ143.58, 138.86, 134.67, 126.31, 125.27, 124.59, 122.97, 111.94, 102.78, 98.82, 58.44, 34.09, 27.84, 21.02.

Synthesis of Metal-Ligand Complex 7

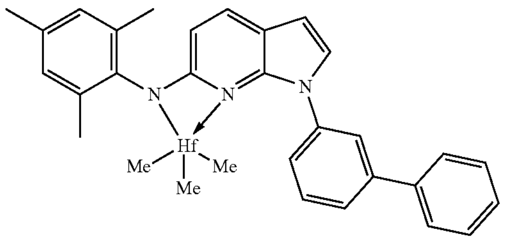

An oven-dried vial was charged with hafnium tetrachloride (0.048 g, 0.15 mmol) and toluene (2 mL). To the stirring slurry was added 3.0 M methylmagnesium bromide in diethyl ether (0.22 mL, 0.65 mmol) to provide a heterogeneous mixture, which upon vigorous stirring for three minutes turned cloudy and light brown. To the mixture was added a solution of the ligand (0.06 g, 0.15 mmol) in toluene (3 mL). The resulting mixture was stirred at room temperature for four hours. The reaction mixture was diluted with hexanes (2 mL) and filtered to obtain a clear solution. The solution was concentrated to afford the title compound as a pale yellow solid (0.093 g, 100%).

$^1$H-NMR (500 MHz, $C_6D_6$) δ7.37-7.27 (m, 5H), 7.25 (d, J=8.6 Hz, 1H), 7.20 (d, J=7.8 Hz, 1H), 7.15 (t, J=7.4 Hz, 2H), 7.13-7.06 (m, 8H), 7.06-7.02 (m, 1H), 6.99 (dd, J=19.9, 7.5 Hz, 1H), 6.87 (s, 2H), 6.53-6.42 (m, 1H), 6.23-6.05 (m, 1H), 5.57 (d, J=8.6 Hz, 1H), 2.33 (s, 6H), 2.19 (s, 3H), 0.30 (s, 9H). $^{13}$C-NMR (126 MHz, $C_6D_6$) δ164.10, 143.87, 143.48, 142.42, 139.92, 138.71, 136.61, 133.94, 133.25, 130.40, 129.17, 128.92, 128.74, 128.15, 127.21, 127.09, 125.28, 125.14, 124.01, 113.22, 102.95, 99.11, 65.70, 34.47, 31.56, 29.02, 25.24, 22.65, 21.03, 20.59, 20.48, 18.33, 13.95.

Synthesis of Metal-Ligand Complex 8

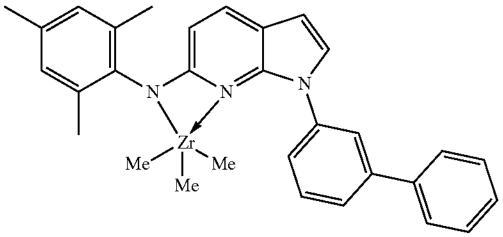

An oven-dried vial was charged with zirconium tetrachloride (0.035 g, 0.15 mmol) and toluene (2 mL). To the stirring slurry was added 3.0 M methylmagnesium bromide in diethyl ether (0.22 mL, 0.65 mmol) to provide a heterogeneous mixture, which upon vigorous stirring for three minutes turned cloudy and black. To the mixture was added a solution of the ligand (0.06 g, 0.15 mmol) in toluene (3 mL). The resulting mixture was stirred at room temperature for four hours. The reaction mixture was diluted with hexanes (2 mL) and filtered to obtain a clear solution. The solution was concentrated to afford the title compound as a brown solid (0.080 g, 100%).

$^1$H-NMR (500 MHz, $C_6D_6$) δ7.47-7.36 (m, 5H), 7.36-7.23 (m, 11H), 7.23-7.04 (m, 24H), 7.03-6.90 (m, 8H), 6.79 (d, J=17.5 Hz, 4H), 6.67-6.51 (m, 3H), 6.52-6.31 (m, 2H), 6.30-6.16 (m, 4H), 5.91 (dd, J=31.4, 8.7 Hz, 2H), 5.63 (d, J=8.6 Hz, 1H), 2.44-2.23 (m, 14H), 2.15 (d, J=18.0 Hz, 9H), 2.12-1.98 (m, 26H), 0.79 (d, J=82.1 Hz, 9H).

Synthesis of Metal-Ligand Complex 9

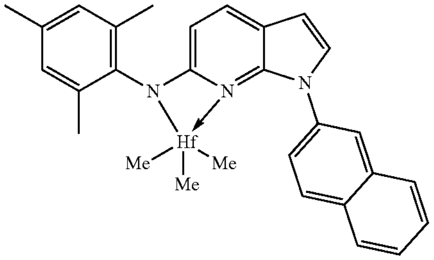

An oven-dried vial was charged with hafnium tetrachloride (0.051 g, 0.16 mmol) and toluene (2 mL). To the stirring slurry was added 3.0 M methylmagnesium bromide in diethyl ether (0.23 mL, 0.70 mmol) to provide a heterogeneous mixture, which upon vigorous stirring for three minutes turned cloudy and light brown. To the mixture was added a solution of the ligand (0.06 g, 0.16 mmol) in toluene (3 mL). The resulting mixture was stirred at room temperature for four hours. The reaction mixture was diluted with hexanes (2 mL) and filtered to obtain a clear solution. The solution was concentrated to afford the title compound as a pale yellow solid (0.095 g, 100%).

$^1$H-NMR (500 MHz, $C_6D_6$) δ7.59 (dd, J=17.7, 8.4 Hz, 3H), 7.39 (d, J=2.1 Hz, 1H), 7.22 (ddd, J=21.7, 16.8, 8.2 Hz, 4H), 7.11 (d, J=9.4 Hz, 3H), 6.88 (s, 2H), 6.53 (dd, J=3.5 Hz, 1H), 6.19 (dd, J=11.7, 3.5 Hz, 1H), 5.59 (d, J=8.8 Hz, 1H), 2.33 (s, 6H), 2.18 (s, 3H), 0.22 (s, 9H). $^{13}$C-NMR (126 MHz, $C_6D_6$) δ164.09, 143.94, 142.41, 136.58, 135.65, 133.94, 133.53, 133.26, 132.74, 130.36, 129.18, 128.92, 126.87, 126.53, 125.28, 124.59, 124.34, 124.22, 113.33, 103.06, 99.13, 65.89, 34.58, 31.56, 29.03, 26.84, 25.25, 22.65, 21.04, 20.60, 20.50, 18.35, 13.96, 11.27.

Synthesis of Metal-Ligand Complex 10

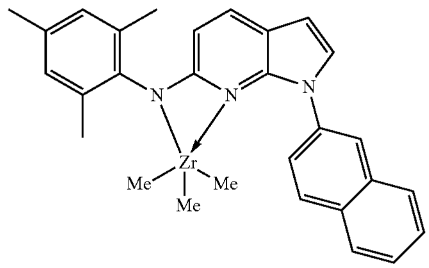

An oven-dried vial was charged with zirconium tetrachloride (0.037 g, 0.16 mmol) and toluene (2 mL). To the stirring slurry was added 3.0 M methylmagnesium bromide in diethyl ether (0.23 mL, 0.70 mmol) to provide a heterogeneous mixture, which upon vigorous stirring for three minutes turned cloudy and black. To the mixture was added a solution of the ligand (0.06 g, mmol) in toluene (3 mL). The resulting mixture was stirred at room temperature for four hours. The reaction mixture was diluted with hexanes (2 mL) and filtered to obtain a clear solution. The solution was concentrated to afford the title compound as a brown solid (0.082 g, 100%).

$^1$H-NMR (500 MHz, $C_6D_6$) δ8.04-7.78 (m, 2H), 7.79-7.61 (m, 2H), 7.62-7.37 (m, 2H), 7.37-7.05 (m, 7H), 6.99 (dd, J=20.4, 7.4 Hz, 2H), 6.89 (d, J=17.4 Hz, 2H), 6.77 (d, J=18.1 Hz, 1H), 6.62 (dd, J=34.0, 3.5 Hz, 1H), 6.49-6.36 (m, 1H), 6.27 (dd, J=44.1, 3.5 Hz, 2H), 5.91 (d, J=8.8 Hz, 1H), 2.39 (s, 4H), 2.24 (s, 3H), 2.17-1.91 (m, 9H), 0.36 (s, 9H).

Synthesis of Metal-Ligand Complex 11

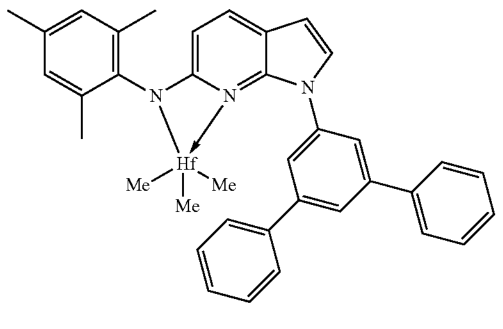

An oven-dried vial was charged with hafnium tetrachloride (0.04 g, 0.13 mmol) and toluene (2 mL). To the stirring slurry was added 3.0 M methylmagnesium bromide in diethyl ether (0.18 mL, 0.55 mmol) to provide a heterogeneous mixture, which upon vigorous stirring for three minutes turned cloudy and light brown. To the mixture was added a solution of the ligand (0.06 g, 0.13 mmol) in toluene (3 mL). The resulting mixture was stirred at room temperature for four hours. The reaction mixture was diluted with hexanes (2 mL) and filtered to obtain a clear solution. The solution was concentrated to afford the title compound as a brown oil (0.088 g, 100%).

$^1$H-NMR (400 MHz, $C_6D_6$) δ7.77 (dd, J=13.9, 1.7 Hz, 4H), 7.63 (d, J=1.7 Hz, 1H), 7.52-7.45 (m, 6H), 7.43-7.33 (m, 5H), 7.34-7.23 (m, 5H), 7.24-6.93 (m, 22H), 6.90-6.81 (m, 3H), 6.50 (dd, J=11.2, 3.5 Hz, 1H), 6.19 (q, J=3.5 Hz, 3H), 5.58 (dd, J=8.7, 5.4 Hz, 1H), 2.30 (s, 6H), 2.06 (s, 4H), 0.20 (s, 9H). $^{13}$C-NMR (101 MHz, $C_6D_6$) δ164.13, 146.43, 145.22, 144.24, 143.86, 142.96, 142.39, 140.48, 140.23, 139.95, 139.14, 138.81, 136.62, 133.90, 133.23, 130.91, 129.15, 128.91, 128.77, 128.72, 128.49, 128.15, 127.81, 127.78, 127.57, 127.32, 127.20, 127.16, 126.45, 125.28, 124.63, 124.43, 124.19, 121.51, 119.92, 116.88, 113.08, 102.85, 101.59, 99.08, 65.70, 20.58, 18.31.

Synthesis of Metal-Ligand Complex 12

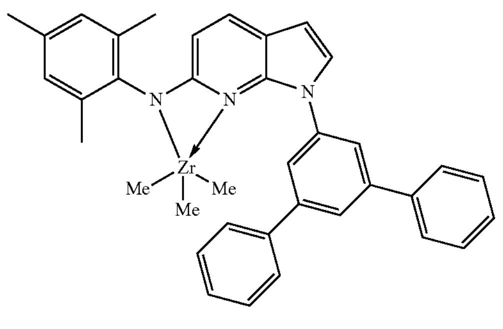

An oven-dried vial was charged with zirconium tetrachloride (0.029 g, 0.13 mmol) and toluene (2 mL). To the stirring slurry was added 3.0 M methylmagnesium bromide in diethyl ether (0.18 mL, 0.55 mmol) to provide a heterogeneous mixture, which upon vigorous stirring for three minutes turned cloudy and black. To the mixture was added a solution of the ligand (0.06 g, mmol) in toluene (3 mL). The resulting mixture was stirred at room temperature for four hours. The reaction mixture was diluted with hexanes (2 mL) and filtered to obtain a clear solution. The solution was concentrated to afford the title compound as a pale yellow oil (0.077 g, 100%).

$^1$H-NMR (400 MHz, $C_6D_6$) δ7.79 (d, J=1.6 Hz, 3H), 7.63 (d, J=1.7 Hz, 2H), 7.53-7.45 (m, 7H), 7.41-7.24 (m, 10H), 7.24-6.91 (m, 27H), 6.86 (d, J=8.2 Hz, 2H), 6.79-6.62 (m, 3H), 6.50 (dd, J=11.2, 3.4 Hz, 2H), 6.19 (dd, J=7.0, 3.6 Hz, 3H), 5.58 (d, J=8.8 Hz, 1H), 2.06 (s, 5H), 1.81 (s, 3H), 1.46 (s, 3H). $^{13}$C-NMR (101 MHz, $C_6D_6$) δ166.55, 145.23, 144.21, 142.96, 142.48, 140.48, 140.23, 139.65, 138.81, 134.11, 133.69, 132.86, 131.56, 130.90, 128.91, 128.72, 128.49, 128.14, 127.20, 125.67, 124.20, 121.86, 121.52, 120.69, 119.91, 116.88, 110.42, 103.40, 101.58, 101.17, 21.02, 20.50, 18.32, 18.14.

Synthesis of Metal-Ligand Complex 13

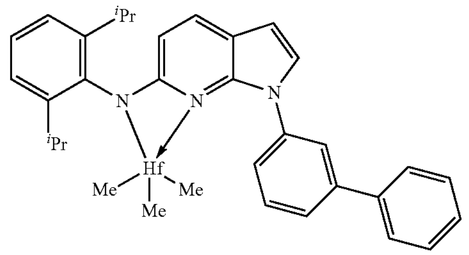

An oven-dried vial was charged with hafnium tetrachloride (0.043 g, 0.14 mmol) and toluene (2 mL). To the stirring slurry was added 3.0 M methylmagnesium bromide in diethyl ether (0.20 mL, 0.59 mmol) to provide a heterogeneous mixture, which upon vigorous stirring for three minutes turned cloudy and light brown. To the mixture was added a solution of the ligand (0.06 g, 0.14 mmol) in toluene (3 mL). The resulting mixture was stirred at room temperature for four hours. The reaction mixture was diluted with hexanes (2 mL) and filtered to obtain a clear solution. The solution was concentrated to afford the title compound as a dark brown oil (0.090 g, 100%).

$^1$H-NMR (500 MHz, $C_6D_6$) δ7.38-7.27 (m, 3H), 7.26-7.06 (m, 10H), 7.03-6.94 (m, 2H), 6.44 (d, J=3.5 Hz, 1H), 6.19-6.03 (m, 1H), 5.56 (d, J=8.6 Hz, 1H), 3.60 (hept, J=6.9 Hz, 2H), 1.31 (d, J=6.9 Hz, 6H), 1.17 (d, J=6.9 Hz, 6H), 0.33 (s, 9H). $^{13}$C-NMR (126 MHz, $C_6D_6$) δ165.65, 144.18, 143.87, 143.42, 142.16, 139.86, 138.51, 136.40, 130.32, 128.92, 128.73, 128.15, 127.28, 127.21, 126.11, 125.59, 125.55, 125.28, 124.27, 123.80, 113.12, 102.86, 99.80, 65.90, 28.73, 24.45, 24.08.

Synthesis of Metal-Ligand Complex 14

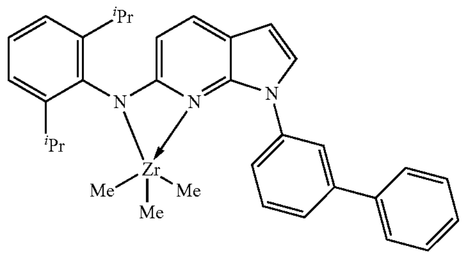

An oven-dried vial was charged with zirconium tetrachloride (0.031 g, 0.14 mmol) and toluene (2 mL). To the stirring slurry was added 3.0 M methylmagnesium bromide in diethyl ether (0.20 mL, 0.59 mmol) to provide a heterogeneous mixture, which upon vigorous stirring for three minutes turned cloudy and black. To the mixture was added a solution of the ligand (0.06 g, mmol) in toluene (3 mL). The resulting mixture was stirred at room temperature for four hours. The reaction mixture was diluted with hexanes (2 mL) and filtered to obtain a clear solution. The solution was concentrated to afford the title compound as a brown solid (0.078 g, 100%).

$^1$H-NMR (500 MHz, $C_6D_6$) δ7.50 (dt, J=7.8, 1.5 Hz, 1H), 7.21 (d, J=8.7 Hz, 1H), 7.19-7.03 (m, 9H), 6.99 (dd, J=20.0, 7.5 Hz, 1H), 6.94-6.80 (m, 3H), 6.44 (d, J=3.6 Hz, 1H), 6.16 (d, J=3.5 Hz, 1H), 5.79 (d, J=8.7 Hz, 1H), 3.48 (p, J=7.0 Hz, 1H), 3.21 (hept, J=7.0 Hz, 1H), 1.27 (d, J=7.1 Hz, 3H), 1.15-0.98 (m, 7H), 0.75-0.46 (m, 4H). $^{13}$C-NMR (126 MHz, $C_6D_6$) δ167.17, 144.50, 144.09, 143.41, 142.78, 142.56, 139.76, 138.65, 134.44, 129.29, 128.92, 128.67, 128.15, 126.98, 125.28, 124.63, 124.18, 123.85, 122.78, 121.08, 120.16, 109.84, 103.41, 101.63, 28.35, 24.31, 23.50, 23.12, 22.96, 21.04.

Synthesis of Metal-Ligand Complex 15

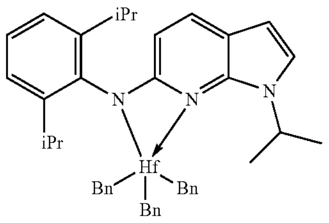

An oven-dried vial inside of a glovebox was charged with N-(2,6-diisoporpylphenyl)-1-isopropyl-1H-pyrolo[2,3-b] pyridin-6-amine (0.034 g, 0.10 mmol) and $HfBn_4$ (0.054 g, 0.10 mmol, 1 eq.), then dissolved in 1 mL of deuterated benzene. The reaction mixture was then concentrated to afford the title compound as a yellow solid (0.071 g, 90% yield).

$^1$H NMR ($C_6D_6$, 400 MHz) δ1.00 (d, J=5.4 Hz, 6H), 1.02 (d, J=5.3 Hz, 6H), 1.09 (d, J=5.5 Hz, 6H), 2.24 (bs, 6H), 3.05-3.10 (m, 2H), 4.69-4.79 (m, 1H), 5.41 (d, J=8.0 Hz, 1H), 6.11 (d, iji=2.9 Hz, 1H), 6.41 (d, J=2.9 Hz, 1H), 6.76-6.82 (m, 8H), 6.94-7.20 (m, 12H). It is believed that these data show the inclusion of approximately 1 equivalent of toluene. $^{13}$C NMR ($C_6D_6$, 101 MHz) δ23.2, 24.0, 25.2, 28.6, 45.6, 89.5, 99.6, 103.0, 113.7, 119.0, 122.6, 124.1, 125.3, 126.6, 128.2, 128.9, 136.3, 141.8, 142.3, 144.9, 164.2.

Synthesis of Metal-Ligand Complex 16

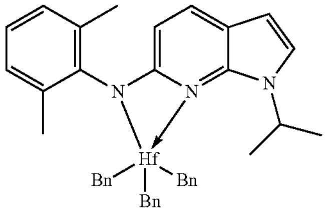

An oven-dried vial inside of a glovebox was charged with N-(2,6-dimethylphenyl)-1-isopropyl-1H-pyrrolo[2,3-b] pyridin-6-amine (0.028 g, 0.10 mmol) and $HfBn_4$ (0.054 g, 0.10 mmol, 1 eq.), then dissolved in 1 mL of deuterated benzene. The reaction mixture was then concentrated to afford the title compound as a yellow solid (0.071 g, 97% yield).

$^1$H NMR ($C_6D_6$, 400 MHz) δ1.07 (d, J=8.0 Hz, 6H), 1.89 (s, 6H), 2.22 (bs, 6H), 4.76-4.86 (m, 1H), 6.12 (d, J=2.9 Hz, 1H), 6.43 (d, J=2.9 Hz, 1H), 6.49 (d, J=5.8 Hz, 2H), 6.72 (d, J=6.0 Hz, 6H), 6.80 (t, J=5.9 Hz, 3H), 6.90-7.12 (m, 15H)*, 7.19 (d, J=6.8 Hz, 1H). It is believed that these data show the inclusion of approximately 1 equivalent of toluene and residual hafnium tetrabenzyl.

Synthesis of Metal-Ligand Complex 17

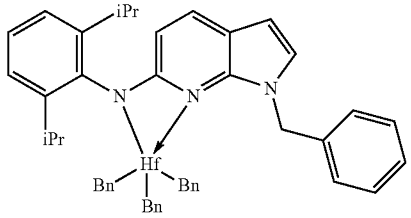

An oven-dried vial inside of a glovebox was charged with 1-benzyl-N-(2,6-diisopropylphenyl)-1H-pyrrolo[2,3-b]pyridin-6-amine (0.038 g, 0.10 mmol) and $HfBn_4$ (0.054 g, 0.10 mmol, 1 eq.), then dissolved in 1 mL of deuterated benzene. The reaction mixture was then concentrated to afford the title compound as a yellow solid (0.081 g, 98% yield).

$^1$H NMR ($C_6D_6$, 400 MHz) δ1.10 (d, J=6.8 Hz, 6H), 1.18 (d, J=6.8 Hz, 6H), 2.25 (bs, 6H), 3.18-3.29 (m, 2H), 4.73 (s, 2H), 5.51 (d, J=8.6 Hz, 1H), 6.07 (d, J=3.6 Hz, 1H), 6.20 (d, J=3.6 Hz, 1H), 6.53 (d, J=7.2 Hz, 2H), 6.77-7.23 (m, 35H). It is believed that these data show the inclusion of approximately 1 equivalent of toluene and residual hafnium tetrabenzyl. $^{13}$C NMR ($C_6D_6$, 101 MHz) δ24.4, 25.5, 29.0, 49.1, 83.4, 100.1, 103.2, 114.0, 123.0, 123.8, 124.6, 124.8, 127.1, 127.4, 127.9, 128.98, 129.05, 129.2, 130.3, 136.8, 136.9, 138.9, 142.1, 144.1, 145.2, 164.9.

Synthesis of Metal-Ligand Complex 18

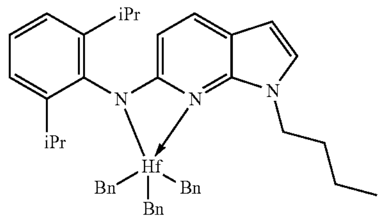

An oven-dried vial inside of a glovebox was charged with 1-butyl-N-(2,6-diisopropylphenyl)-1H-pyrrolo[2,3-b]pyridin-6-amine (0.035 g, 0.10 mmol) and $HfBn_4$ (0.054 g, mmol, 1 eq.), then dissolved in 1 mL of deuterated benzene. The reaction mixture was then concentrated to afford the title compound as a yellow solid (0.078 g, 97% yield).

$^1$H NMR ($C_6D_6$, 400 MHz) δ0.65 (t, J=8.0 Hz, 3H), 0.97-0.108 (m, 2H), 1.08 (d, J=8.0 Hz, 6H), 1.16 (d, J=6.9 Hz, 6H), 1.14-1.21 (m, 2H), 1.38-1.47 (m, 2H), 2.30 (bs, 6H), 3.14-3.24 (m, 2H), 3.48-3.52 (m, 2H), 5.47 (d, J=8.0 Hz, 1H), 6.12 (d, J=3.6 Hz, 1H), 6.36 (d, J=3.6 Hz, 1H), 6.53 (d, J=8.0 Hz, 1H), 6.81-6.86 (m, 9H), 6.90-7.25 (m, 19H). It is believed that these data show the inclusion of approximately 1 equivalent of toluene and residual hafnium tetrabenzyl. $^{13}$C NMR ($C_6D_6$, 101 MHz) δ13.6, 19.9, 24.0, 25.1, 28.6, 32.7, 45.0, 83.1, 89.2, 99.3, 102.5, 113.7, 122.4, 122.6, 124.2, 124.4, 125.3, 126.6, 127.5, 128.2, 128.6, 128.8, 129.0, 129.9, 130.6, 136.3, 137.5, 138.6, 141.8, 142.9, 144.8, 164.3.

Synthesis of Metal-Ligand Complex 19

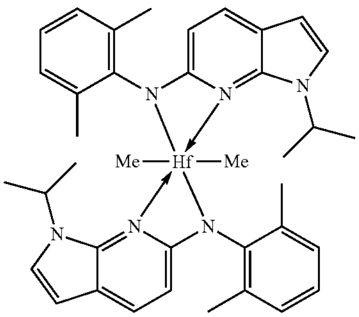

An oven-dried vial was charged with hafnium tetrachloride (0.034 g, 0.11 mmol) and toluene (2 mL). To the stirring slurry was added 3.0 M methylmagnesium bromide in diethyl ether (0.22 mL, 0.66 mmol) to provide a heterogeneous mixture, which upon vigorous stirring for three minutes turned cloudy and light brown. To the mixture was added a solution of the ligand (0.061 g, 0.22 mmol) in toluene (3 mL). The resulting mixture was stirred at room temperature for four hours. The reaction mixture was diluted with hexanes (2 mL) and filtered to obtain a clear solution. The solution was concentrated to afford the title compound as a brown solid (0.062 g, 74%). The $^1$H NMR showed a ratio of 20.76:1.00 of bis:mono catalyst.

$^1$H NMR ($C_6D_6$, 400 MHz) δ0.76 (s, 6H), 1.31 (d, J=6.5 Hz, 12H), 2.23 (s, 12H), 5.44-5.55 (m, 2H), 5.48 (d, J=8.5 Hz, 2H), 6.24 (d, J=3.6 Hz, 2H), 6.60 (d, J=3.6 Hz, 2H), 6.76-6.83 (m, 6H), 7.25 (d, J=8.5 Hz, 2H). $^{13}$C NMR ($C_6D_6$, 101 MHz) δ18.9, 23.8, 45.8, 57.0, 98.8, 103.0, 114.1, 118.6, 124.9, 128.2, 134.6, 135.3, 142.7, 144.1, 162.1.

Synthesis of Metal-Ligand Complex 20

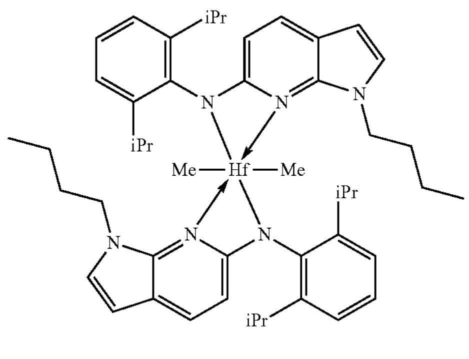

An oven-dried vial was charged with hafnium tetrachloride (0.034 g, 0.11 mmol) and toluene (2 mL). To the stirring slurry was added 3.0 M methylmagnesium bromide in diethyl ether (0.22 mL, 0.66 mmol) to provide a heterogeneous mixture, which upon vigorous stirring for three minutes turned cloudy and light brown. To the mixture was added a solution of the ligand (0.077 g, 0.22 mmol) in toluene (3 mL). The resulting mixture was stirred at room temperature for four hours. The reaction mixture was diluted with hexanes (2 mL) and filtered to obtain a clear solution. The solution was concentrated to afford the title compound as a brown solid (0.096 g, 96%).

$^1$H NMR ($C_6D_6$, 400 MHz) δ0.76 (m, 6H), 1.18 (d, J=6.9 Hz, 6H), 1.38 (d, J=6.9 Hz, 6H), 3.58-3.73 (m, 8H), 5.51 (d, J=8.5 Hz, 1H), 5.76 (d, J=8.6 Hz, 1H), 6.09 (d, J=3.5 Hz, 1H), 6.17 (d, J=3.5 Hz, 2H), 6.30 (d, J=3.5 Hz, 1H), 6.35 (d, J=3.5 Hz, 2H), 7.00-7.28 (m, 7H). It is believed that these data show the inclusion of toluene and deuterated benzene. $^{13}$C NMR ($C_6D_6$, 101 MHz) δ13.5, 13.9, 20.0, 20.4, 24.3, 28.8, 31.7, 32.2, 44.5, 65.8, 98.5, 101.0, 101.3, 101.8, 109.3, 113.5, 122.4, 123.8, 125.3, 126.2, 129.0, 136.1, 142.2, 143.2, 144.3, 164.4, 166.8.

Synthesis of Metal-Ligand Complex 21

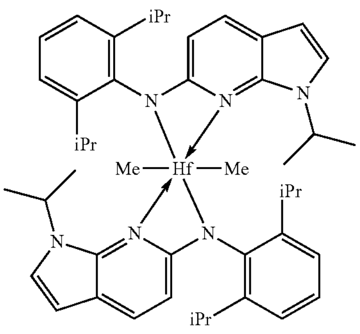

An oven-dried vial was charged with hafnium tetrachloride (0.034 g, 0.11 mmol) and toluene (2 mL). To the stirring slurry was added 3.0 M methylmagnesium bromide in diethyl ether (0.22 mL, 0.66 mmol) to provide a heterogeneous mixture, which upon vigorous stirring for three minutes turned cloudy and light brown. To the mixture was added a solution of the ligand (0.074 g, 0.22 mmol) in toluene (3 mL). The resulting mixture was stirred at room temperature for four hours. The reaction mixture was diluted with hexanes (2 mL) and filtered to obtain a clear solution. The solution was concentrated to afford the title compound as a brownish-yellow solid (0.091 g, 94%). The NMR showed the majority of the product appears to be the desired product and the remainder of the material appears to be conformational isomers.

$^1$H NMR ($C_6D_6$, 400 MHz) δ0.85 (m, 6H), 0.93 (d, J=8.0 Hz, 3H), 1.01 (d, J=8.0 Hz, 3H), 1.44 (d, J=8.0 Hz, 3H), 3.45-3.56 (m, 4H), 4.24-4.34 (m, 2H), 5.69 (d, J=8.7 Hz, 2H), 6.18 (d, J=3.5 Hz, 2H), 6.43 (d, J=3.6 Hz, 2H), 6.97-7.03 (m, 2H), 7.11-7.28 (m, 16H). It is believed that these data show the inclusion of toluene and conformational isomers. $^{13}$C NMR ($C_6D_6$, 101 MHz) δ13.7, 43.9, 52.6, 65.4, 101.1, 101.6, 109.2, 115.1, 123.8, 125.3, 128.2, 129.0, 132.7, 137.5, 144.7, 145.1, 166.8.

Synthesis of Metal-Ligand Complex 22

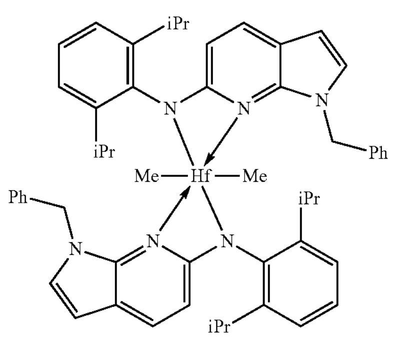

An oven-dried vial was charged with hafnium tetrachloride (0.034 g, 0.11 mmol) and toluene (2 mL). To the stirring slurry was added 3.0 M methylmagnesium bromide in diethyl ether (0.22 mL, 0.66 mmol) to provide a heterogeneous mixture, which upon vigorous stirring for three minutes turned cloudy and light brown. To the mixture was added a solution of the ligand (0.084 g, 0.22 mmol) in toluene (3 mL). The resulting mixture was stirred at room temperature for four hours. The reaction mixture was diluted with hexanes (2 mL) and filtered to obtain a clear solution. The solution was concentrated and afforded the title compound as a brown solid (0.101 g, 94%). Proton NMR shows a mixture of isomers and no remaining starting materials.

$^1$H NMR ($C_6D_6$, 400 MHz) δ0.53 (t, J=7.0 Hz, 3H), 0.64 (bs, 6H), 0.67 (d, J=6.9 Hz, 3H), 0.11 (d, J=6.9 Hz 3H), 1.18 (d, J=6.9 Hz, 6H), 1.21 (d, J=6.8 Hz, 3H), 1.34-1.40 (m, 9H), 4.96 (d, J=16.0 Hz, 1H), 5.00 (s, 1H), 5.55 (d, J=8.6 Hz, 1H), 5.82 (d, J=8.7 Hz, 1H), 6.07 (t, J=3.5 Hz, 2H), 6.11 (d, J=3.5 Hz, 1H), 6.19 (d, J=3.6 Hz, 1H), 6.75-6.85 (m, 4H), 6.95-7.40 (m, 15H).

Metal-Ligand Complexes in Olefin Polymerization

Polymerization Examples

Batch Reactor Polymerization Procedure

The batch reactor polymerizations were conducted in a 2 L PARR batch reactor. The reactor is heated by an electrical heating mantle, and is cooled by an internal serpentine cooling coil containing cooling water. Both the reactor and the heating/cooling system are controlled and monitored by a CAMILE TG process computer. The bottom of the reactor is fitted with a dump valve, which empties the reactor contents into a stainless steel dump pot, which is prefilled with a catalyst kill solution (typically 5 mL of a IRGAFOS/IRGANOX/toluene mixture). The dump pot is vented to a 30 gal. blow-down tank, with both the pot and the tank purged with nitrogen. All solvents used for polymerization or catalyst makeup are run through solvent purification columns to remove any impurities that may affect polymerization. The 1-octene and ISOPAR-E were passed through 2 columns, the first containing A2 alumina, the second containing Q5. (ISOPAR E is an isoparaffin fluid, typically containing less than 1 ppm benzene and less than 1 ppm sulfur, which is commercially available from ExxonMobil Chemical Company.) The ethylene was passed through 2 columns, the first containing A204 alumina and 4 Å mol sieves, the second containing Q5 reactant. The $N_2$, used for transfers, was passed through a single column containing A204 alumna, 4 Å mol sieves and Q5.

The reactor is loaded first from the shot tank that may contain ISOPAR-E solvent and/or 1-octene, depending on desired reactor load. The shot tank is filled to the load set points by use of a lab scale to which the shot tank is mounted. After liquid feed addition, the reactor is heated up to the polymerization temperature set point. If ethylene is used, it is added to the reactor when at reaction temperature to maintain reaction pressure set point. Ethylene addition amounts are monitored by a micro-motion flow meter.

The catalyst and activators were mixed with the appropriate amount of purified toluene to achieve a desired molarity solution. The catalyst and activators were handled in an inert glove box, drawn into a syringe and pressure transferred into the catalyst shot tank. This was followed by 3 rinses of toluene, 5 mL each. Immediately after catalyst addition the run timer begins. If ethylene was used, it was then added by the CAMILE to maintain reaction pressure set point in the reactor. These polymerizations were run for 10 min., then the agitator was stopped and the bottom dump valve opened to empty reactor contents to the dump pot. The dump pot contents are poured into trays placed in a lab hood where the solvent is evaporated off overnight. The trays containing the remaining polymer are then transferred to a vacuum oven, where they are heated up to 140° C. under vacuum to remove any remaining solvent. After the trays cool to ambient temperature, the polymers are weighed for yield/efficiencies, and submitted for polymer testing.

Polymer examples were prepared following the batch reactor process using the following conditions: 120° C.: 280 psig ethylene, 300 g 1-octene, 609 g ISOPAR E, 10 umol MMAO-3A, 1.2 eq. of bis(hydrogenated tallow alkyl)methylammonium tetrakis(pentafluoro-phenyl)borate to catalyst. Conditions at 150° C.: 331 psig ethylene, 300 g 1-octene, 546 g ISOPAR E, 10 umol MMAO-3A, 1.2 eq. of bis(hydrogenated tallow alkyl)methylammonium tetrakis-(pentafluorophenyl)borate to catalyst. Conditions at 190° C.: 400 psig ethylene, 300 g 1-octene, 520 g ISOPAR E, 10 umol MMAO-3A, 1.2 eq. of bis(hydrogenated tallow alkyl) methyl-ammonium tetrakis(pentafluorophenyl)borate to catalyst. All reactions were run for 10 minutes. All polymerizations were performed with bis(hydrogenated tallow alkyl)methylammonium tetra-kis(pentafluorophenyl)borate as the activator and MMAO as the scavenger.

Table 1, provided in the FIGURE, summarizes the polymerization data obtained when using Metal-Ligand Complexes 1-22.

According to an aspect, either alone or in combination with any other aspect, a metal-ligand complex of formula (I) may be defined in which: M is a metal chosen from titanium, hafnium, and zirconium, the metal having a formal oxidation state of +4; $Y^1$, $Y^2$, $Y^3$, and $Y^4$ are independently $C(R^1)$, N, or $N(R^1)$, where each $R^1$ is H, halogen, $(C_1\text{-}C_{40})$hydrocarbyl, $(C_1\text{-}C_{40})$heterohydrocarbyl, $Si(R^C)_3$, $P(R^P)_2$, $N(R^N)_2$, $OR^C$, $SR^C$, $NO_2$, CN, $CF_3$, $R^CS(O)$—, $R^CS(O)_2$—, $(R^C)_2C{=}N$—, $R^CC(O)O$—, $R^COC(O)$—, $R^CC(O)N(R)$—, or $(R^C)_2NC(O)$—, and where optionally any two or more $R^1$ are joined as a ring having from 5 to 16 atoms excluding all hydrogen atoms; $R^2$ is H, $(C_1\text{-}C_{40})$hydrocarbyl, $(C_1\text{-}C_{40})$heterohydrocarbyl, $Si(R^C)_3$, $P(R^P)_2$, $N(R^N)_2$, $OR^C$, $SR^C$, $NO_2$, CN, $CF_3$, $R^CS(O)$—, $R^CS(O)_2$—, $(R^C)_2C{=}N$—, $R^CC(O)O$—, $R^COC(O)$—, $R^CC(O)N(R)$—, or $(R^C)_2NC(O)$— where optionally $R^2$ is joined with one or more groups $R^1$ as a ring having from 5 to 16 atoms excluding all hydrogen atoms; $R^3$ is $(C_1\text{-}C_{40})$hydrocarbyl or $(C_1\text{-}C_{40})$heterohydrocarbyl; $L^1$ is independently $(C_1\text{-}C_{40})$hydrocarbyl, $(C_1\text{-}C_{40})$heterohydrocarbyl, or a ligand of formula (II) complexed to the metal M at (*); $L^2$ and $L^3$ are independently halogen, $(C_1\text{-}C_{40})$hydrocarbyl, or $(C_1\text{-}C_{40})$heterohydrocarbyl; $R^4$, $R^5$, $R^6$, $R^7$, $R^8$, and $R^9$ are independently H, halogen, $(C_1\text{-}C_{40})$hydrocarbyl, $(C_1\text{-}C_{40})$heterohydrocarbyl, $Si(R^C)_3$, $P(R^P)_2$, $N(R^N)_2$, $OR^C$, $SR^C$, $NO_2$, CN, $CF_3$, $R^CS(O)$—, $R^CS(O)_2$—, $(R^C)_2C{=}N$—, $R^CC(O)O$—, $R^COC(O)$—, $R^CC(O)N(R)$—, or $(R^C)_2NC(O)$—; each $R^C$ in the metal-ligand complex is independently $(C_1\text{-}C_{30})$hydrocarbyl or H; each $R^P$ in the metal-ligand complex is independently $(C_1\text{-}C_{30})$hydrocarbyl or H; and each $R^N$ in the metal-ligand complex is independently $(C_1\text{-}C_{30})$hydrocarbyl or H.

According to a second aspect, either alone or in combination with any other aspect, $R^3$ is $(C_3\text{-}C_{30})$aryl or $(C_3\text{-}C_{30})$heteroaryl.

According to a third aspect, either alone or in combination with any other aspect, $Y^1$, $Y^2$, and $Y^3$ are all C(H).

According to a fourth aspect, either alone or in combination with any other aspect, $R^2$ is $(C_3\text{-}C_{30})$aryl or $(C_3\text{-}C_{30})$heteroaryl.

According to a fifth aspect, either alone or in combination with any other aspect, $R^2$ is $(C_1\text{-}C_{40})$alkyl.

According to a sixth aspect, either alone or in combination with any other aspect, the metal-ligand complex may be selected from structures of formulae (IX) to (XLVI).

According to a seventh aspect, either alone or in combination with any other aspect, $L^1$ may be selected from structures of formulae (III) to (VIII).

According to an eighth aspect, either alone or in combination with any other aspect, $L^2$ and $L^3$ are methyl.

According to a ninth aspect, either alone or in combination with any other aspect, $L^1$, $L^2$, and $L^3$ are methyl.

According to a tenth aspect, either alone or in combination with any other aspect, $L^2$ and $L^3$ are benzyl.

According to an eleventh aspect, either alone or in combination with any other aspect, $L^1$, $L^2$, and $L^3$ are benzyl.

According to a twelfth aspect, either alone or in combination with any other aspect, the metal-ligand complex may be selected from structures of formulae (XLVII) to (LXXXVI).

According to a thirteenth aspect, either alone or in combination with any other aspect, the metal-ligand complex may be selected from structures of formulae (LIX) to (LXII) and (LXXVII) to (LXXXVI).

According to a fourteenth aspect, either alone or in combination with any other aspect, a polymerization process includes polymerizing at least one olefin in the presence of a catalyst system comprising the metal-ligand complex of any other aspect and at least one activator to produce an olefinic polymer.

According to a fifteenth aspect, either alone or in combination with any other aspect, the activator comprises modified methylaluminoxane, bis(hydrogenated tallow alkyl)methylammonium, tetrakis(pentafluorophenyl)borate, tris(pentafluorophenyl)borane, or a combination of two or more thereof.

According to a sixteenth aspect, either alone or in combination with any other aspect, the at least one olefin comprises ethylene.

According to a seventeenth aspect, either alone or in combination with any other aspect, the at least one olefin comprises at least one α-olefin.

According to an eighteenth aspect, either alone or in combination with any other aspect, the at least one olefin comprises a mixture of ethylene and at least one of 1-hexene and 1-octene.

According to a nineteenth aspect, either alone or in combination with any other aspect, the polymerizing is a solution phase polymerization process that occurs in a reactor maintained at a temperature from 120° C. to 300° C.

According to a nineteenth aspect, either alone or in combination with any other aspect, the polymerizing is a gas phase polymerization process that occurs in a reactor maintained at a temperature from 30° C. to 200° C.

It should be apparent to those skilled in the art that various modifications can be made to the described embodiments without departing from the spirit and scope of the claimed subject matter. Thus, it is intended that the specification cover modifications and variations of the described embodiments provided such modification and variations come within the scope of the appended claims and their equivalences.

The invention claimed is:

1. A metal-ligand complex according to formula (I):

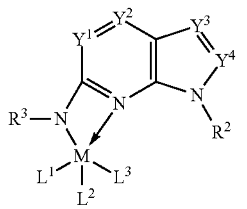

(I)

where:

M is a metal chosen from titanium, hafnium, and zirconium, the metal having a formal oxidation state of +4;

$Y^1$, $Y^2$, $Y^3$, and $Y^4$ are independently $C(R^1)$, N, or $N(R^1)$, where each $R^1$ is H, halogen, $(C_1\text{-}C_{40})$ hydrocarbyl, $(C_1\text{-}C_{40})$ heterohydrocarbyl, $Si(R^C)_3$, $P(RP)_2$, $N(RN)_2$, $OR^C$, $SR^C$, $NO_2$, CN, $CF_3$, $R^CS(O)$—, $R^CS(O)_2$—, $(R^C)_2C{=}N$—, $RC^C(O)O$—, $RCO^C(O)$—, $RC^C(O)N(R)$—, or $(R^C)_2NC(O)$—, and where optionally any two or more $R^1$ are joined as a ring having from 5 to 16 atoms excluding all hydrogen atoms;

$R^2$ is H, $(C_1\text{-}C_{40})$ hydrocarbyl, $(C_1\text{-}C_{40})$ heterohydrocarbyl, $Si(R^C)_3$, $P(R^P)_2$, $N(R^N)_2$, $OR^C$, $SR^C$, $NO_2$, CN, $CF_3$, $R^CS(O)$—, $R^CS(O)_2$—, $(R^C)_2C{=}N$—, $R^CC(O)O$—, $R^COC(O)$—, $R^CC(O)N(R)$—, or $(R^C)_2NC(O)$— where optionally $R^2$ is joined with one or more groups $R^1$ as a ring having from 5 to 16 atoms excluding all hydrogen atoms;

$R^3$ is $(C_1\text{-}C_{40})$ hydrocarbyl or $(C_1\text{-}C_{40})$ heterohydrocarbyl;

$L^1$ is independently $(C_1\text{-}C_{40})$ hydrocarbyl, $(C_1\text{-}C_{40})$ heterohydrocarbyl, or a ligand of formula (II) complexed to the metal M at (*);

(II)

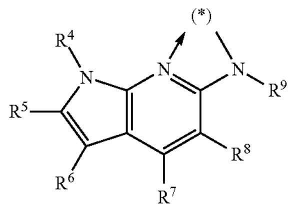

$L^2$ and $L^3$ are independently halogen, $(C_1\text{-}C_{40})$ hydrocarbyl, or $(C_1\text{-}C_{40})$ heterohydrocarbyl;

$R^4$, $R^5$, $R^6$, $R^7$, $R^8$, and $R^9$ are independently H, halogen, $(C_1\text{-}C_{40})$ hydrocarbyl, $(C_1\text{-}C_{40})$ heterohydrocarbyl, $Si(R^C)_3$, $P(R^P)_2$, $N(R^N)_2$, $OR^C$, $SR^C$, $NO_2$, CN, $CF_3$, $R^CS(O)$—, $R^CS(O)_2$—, $(R^C)_2C{=}N$—, $R^CC(O)O$—, $R^COC(O)$—, $R^CC(O)N(R)$—, or $(R^C)_2NC(O)$—;

each $R^C$ in the metal-ligand complex is independently $(C_1\text{-}C_{30})$ hydrocarbyl or H;

each $R^P$ in the metal-ligand complex is independently $(C_1\text{-}C_{30})$ hydrocarbyl or H; and each $R^N$ in the metal-ligand complex is independently $(C_1\text{-}C_{30})$ hydrocarbyl or H.

2. The metal-ligand complex of claim 1, wherein $R^3$ is $(C_3\text{-}C_{30})$ aryl or $(C_3\text{-}C_{30})$ heteroaryl.

3. The metal-ligand complex of claim 1, wherein $Y^1$, $Y^2$, and $Y^3$ are all C(H).

4. The metal-ligand complex of claim 1, wherein $R^2$ is $(C_3\text{-}C_{30})$ aryl or $(C_3\text{-}C_{30})$ heteroaryl.

5. The metal-ligand complex of claim 1, wherein $R^2$ is $(C_1\text{-}C_{40})$ alkyl.

6. The metal-ligand complex of claim 1, selected from the group consisting of:

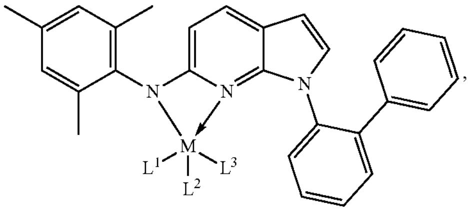

,

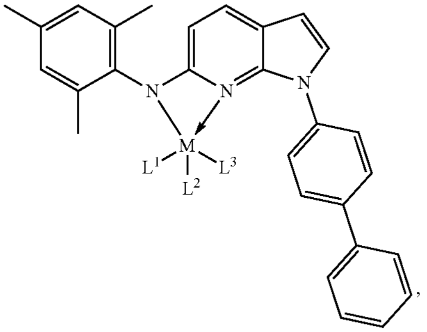

,

-continued

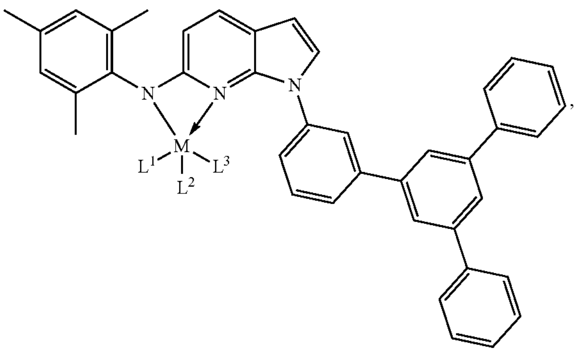

,

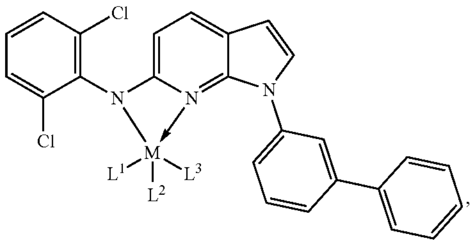

,

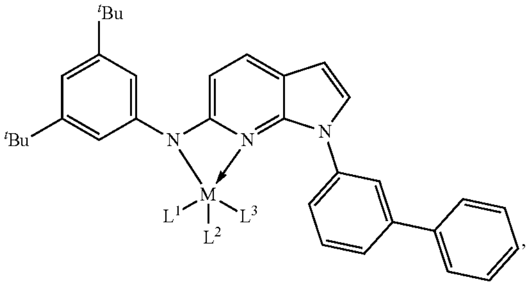

,

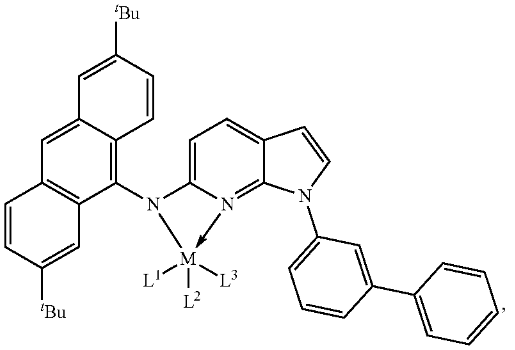

,

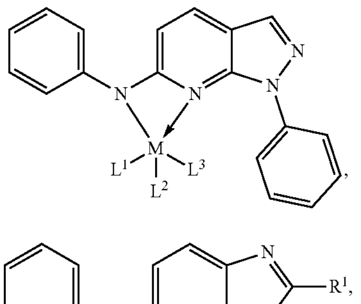

,

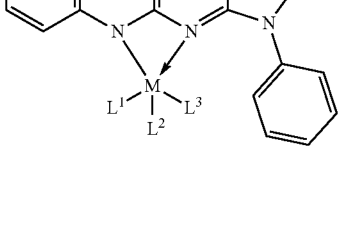

,

-continued
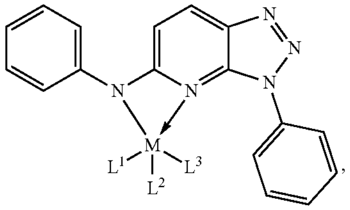
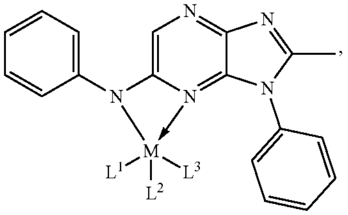
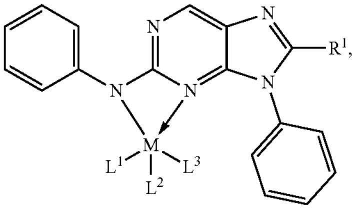
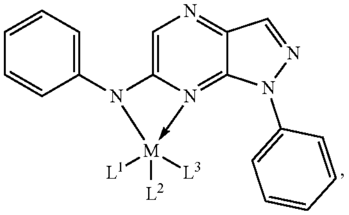
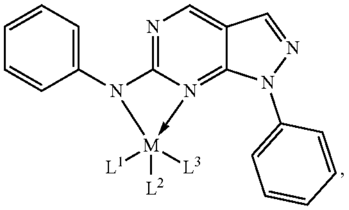
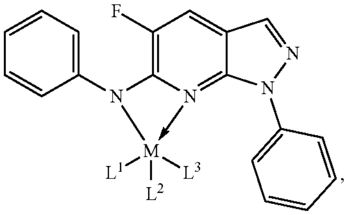
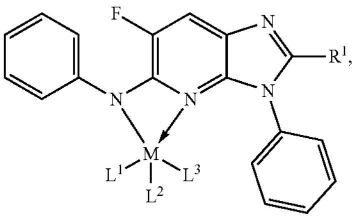
-continued
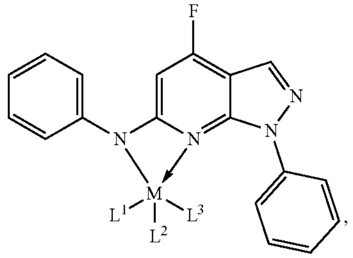
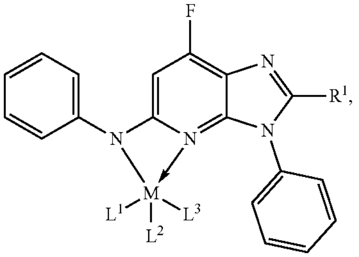
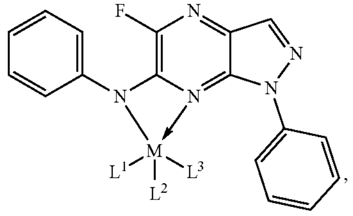
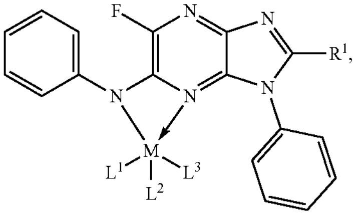
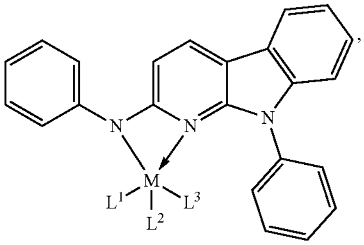
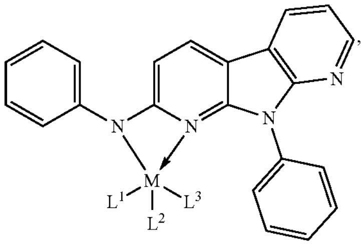
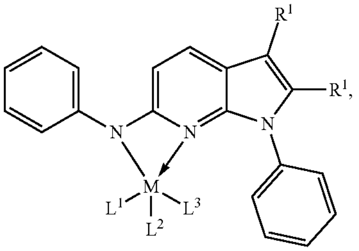

-continued
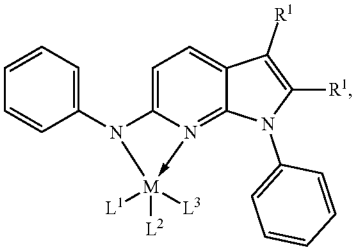
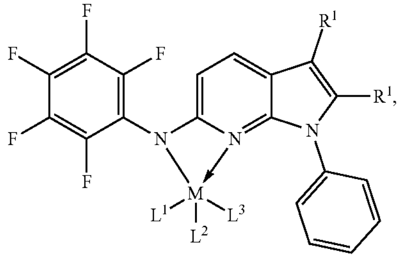
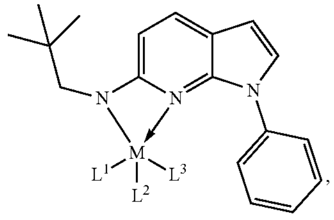
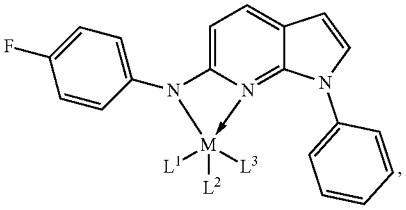
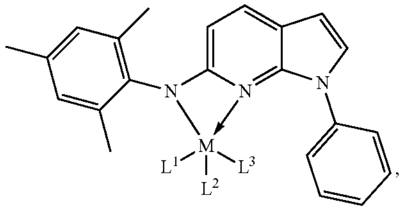
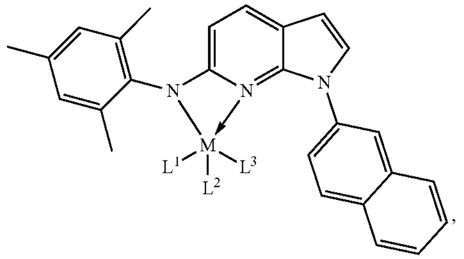
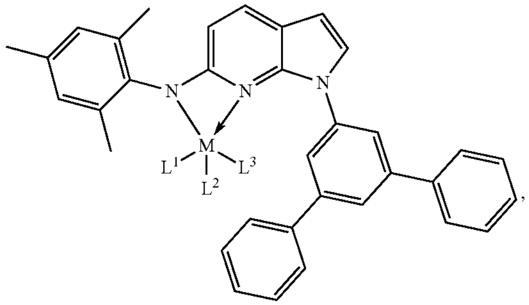
-continued
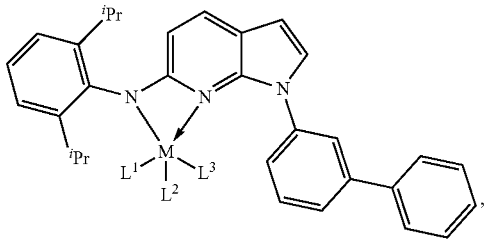
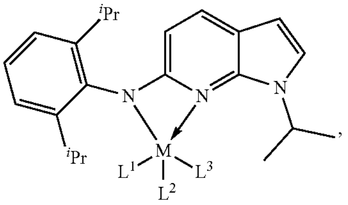
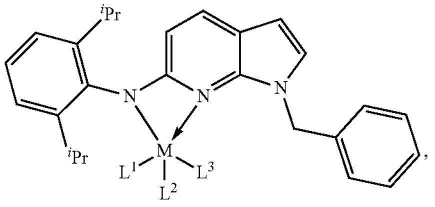
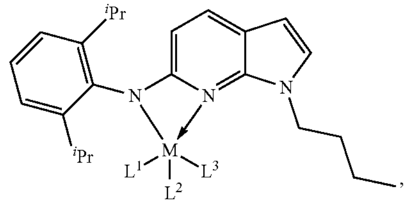
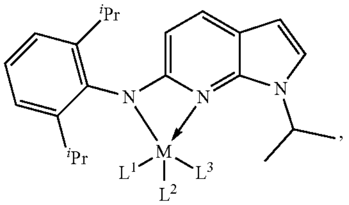
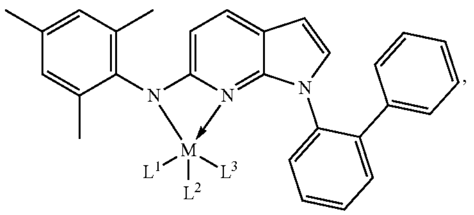
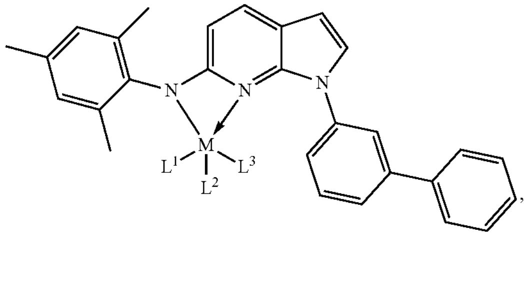

-continued

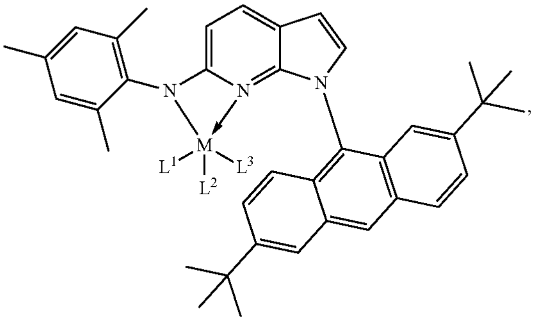

, and

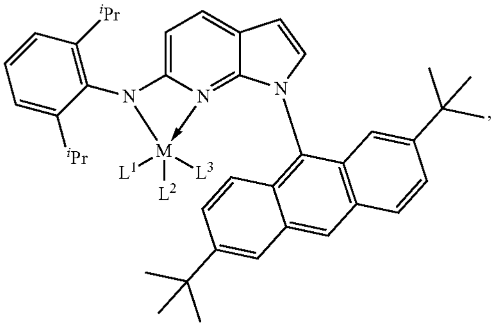

, in which $L^1$, $L^2$, $L^3$, and $R^1$ are as defined in formula (I).

7. The metal-ligand complex of claim 1, wherein L' is selected from the group consisting of:

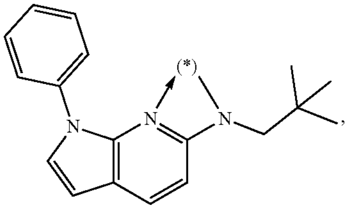

,

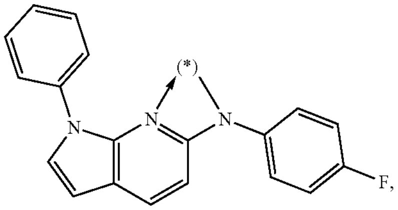

,

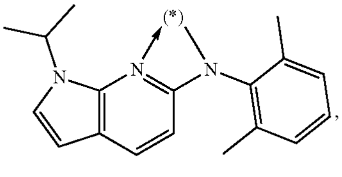

,

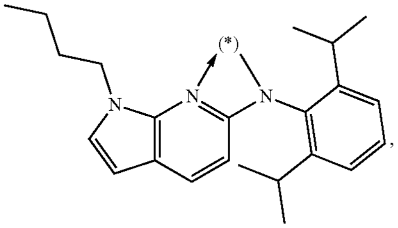

,

-continued

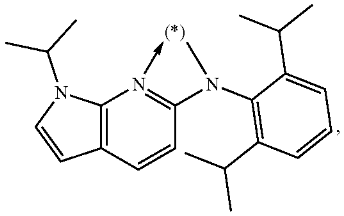

, and

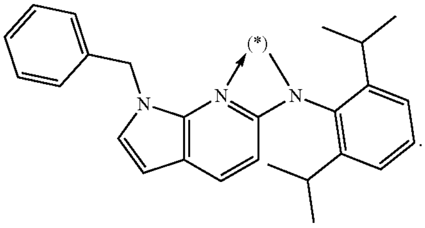

.

8. The metal-ligand complex of claim 1, wherein $L^2$ and $L^3$ are methyl.

9. The metal-ligand complex of claim 1, wherein $L^1$, $L^2$, and $L^3$ are methyl.

10. The metal-ligand complex of claim 1, wherein $L^2$ and $L^3$ are benzyl.

11. The metal-ligand complex of claim 1, wherein $L^1$, $L^2$, and $L^3$ are benzyl.

12. The metal-ligand complex of claim 1, selected from the group consisting of:

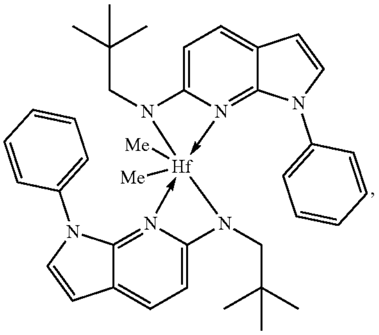

,

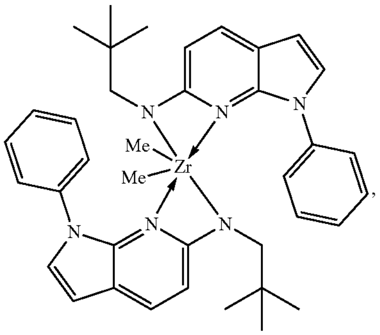

,

-continued
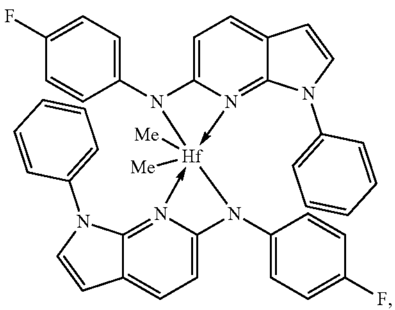
,
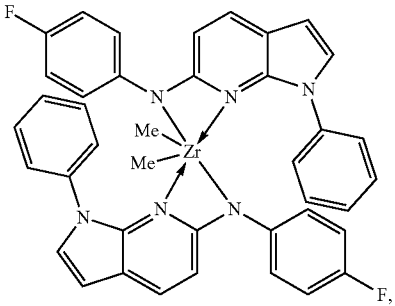
,
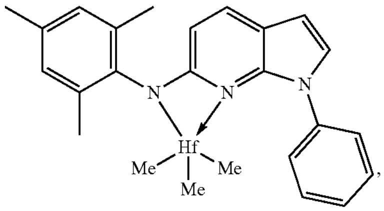
,
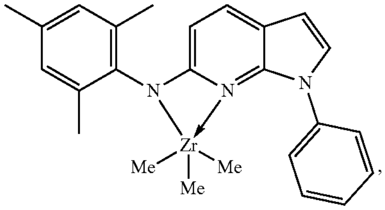
,
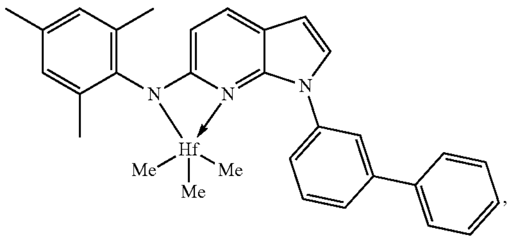
,
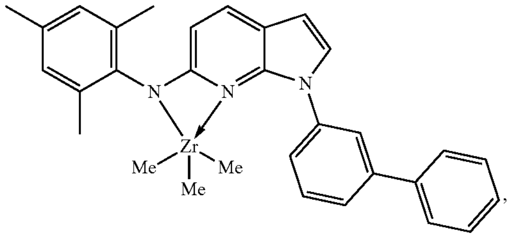
,
-continued
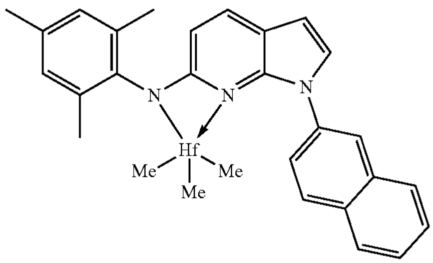
,
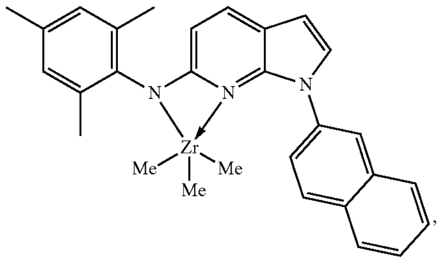
,
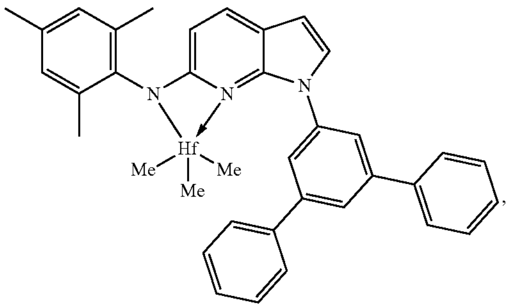
,
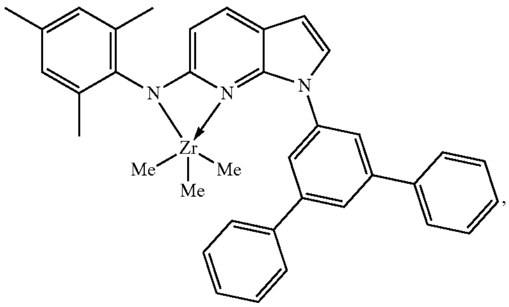
,
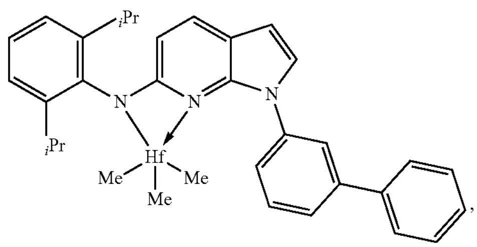
,
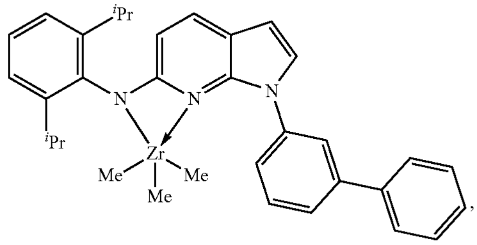
, -continued
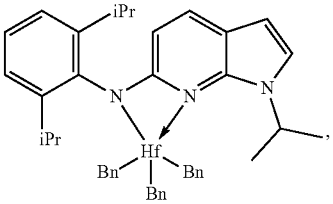,
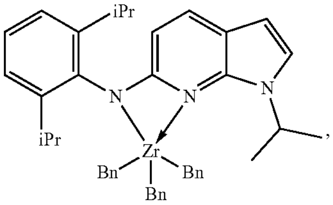,
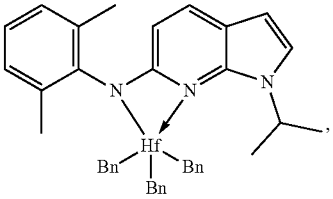,
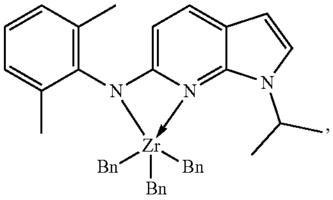,
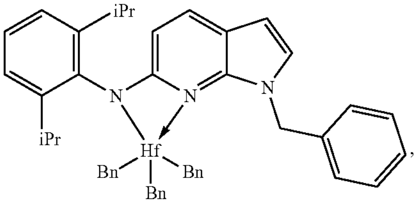,
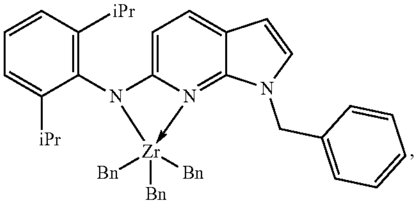,
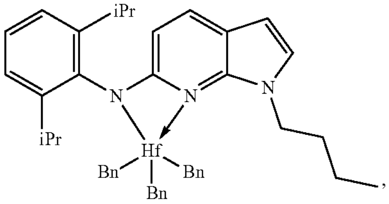,
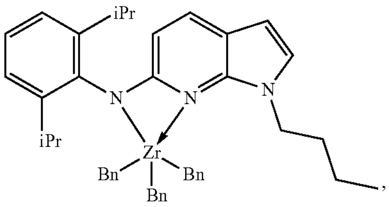,
-continued
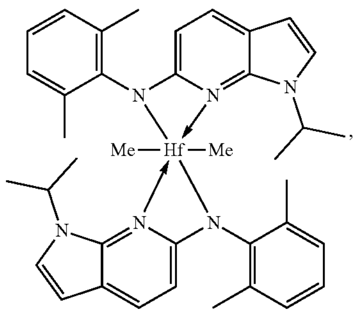,
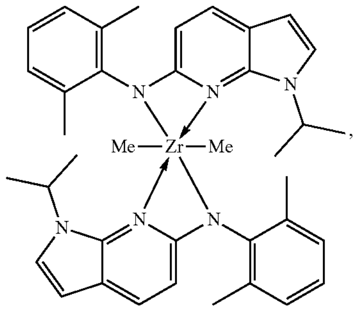,
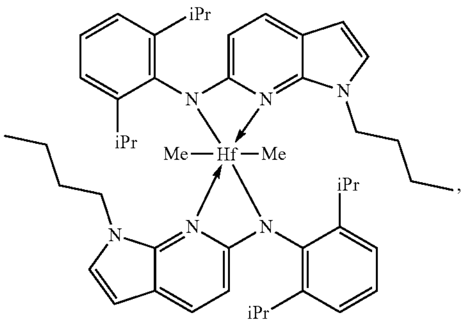,
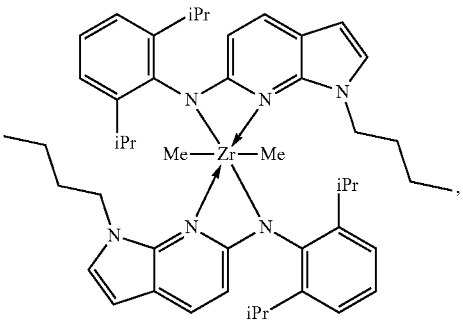,
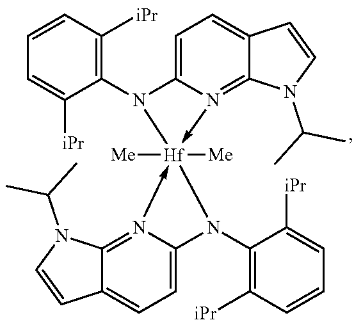, -continued
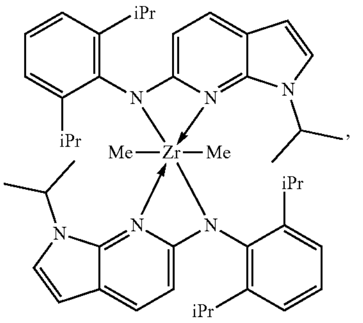
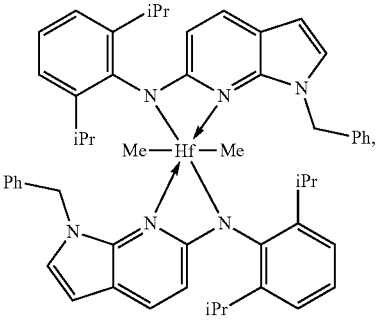
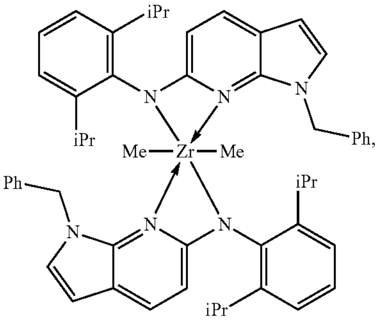
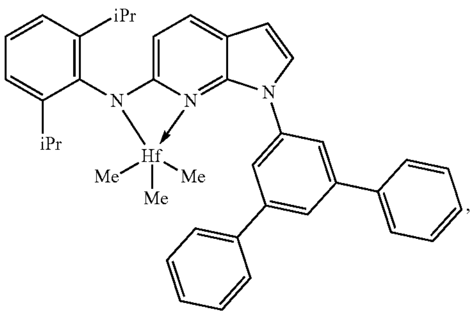
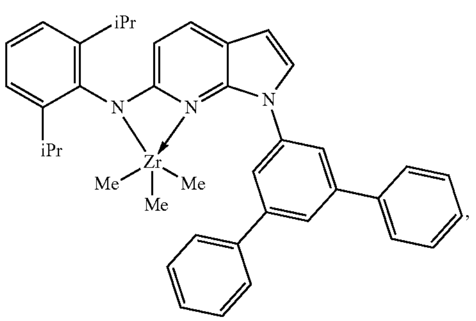
-continued
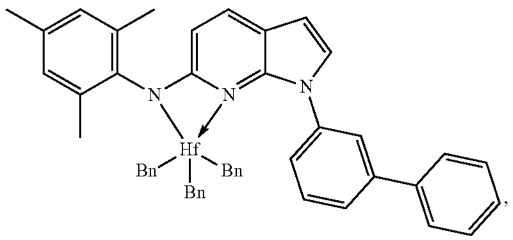
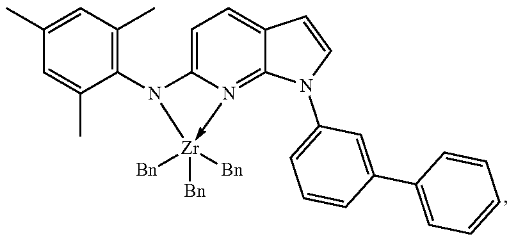
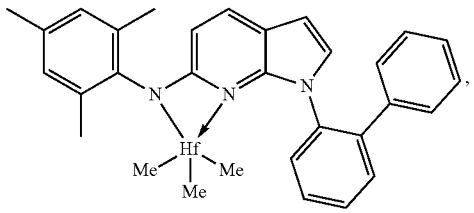
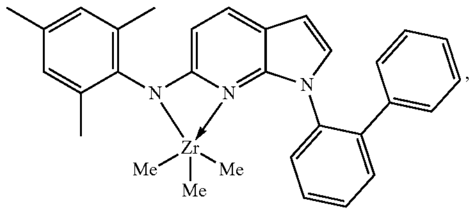
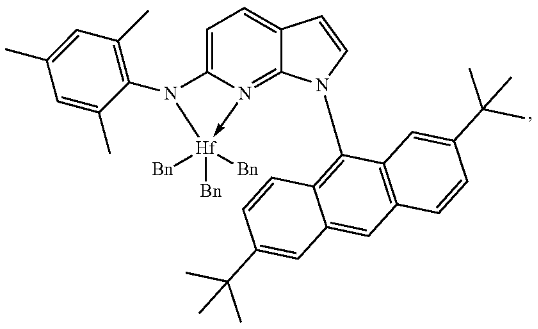
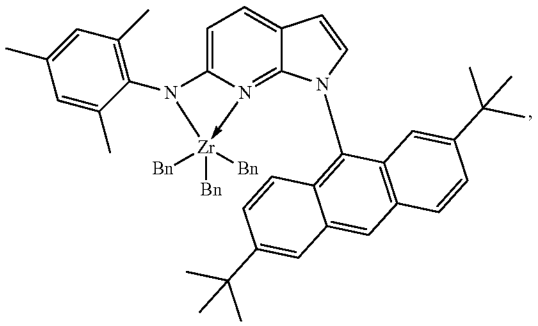

-continued
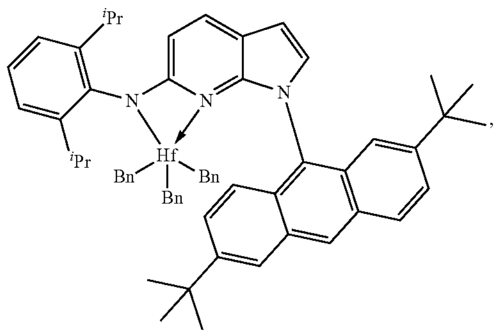
, and
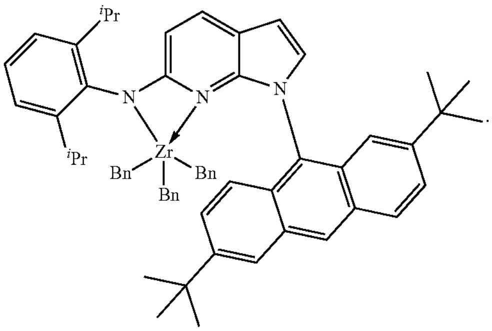
.
13. The metal-ligand complex of claim 1, selected from the group consisting of:
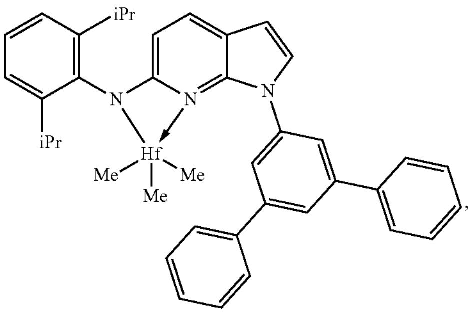
,
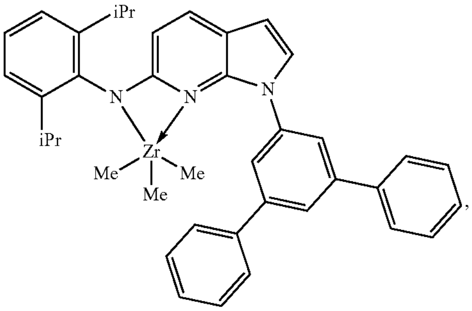
,
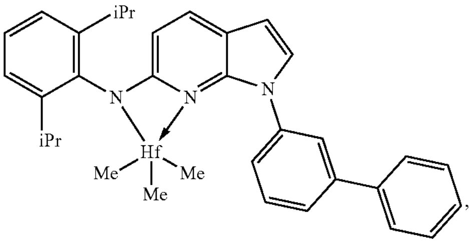
,
-continued
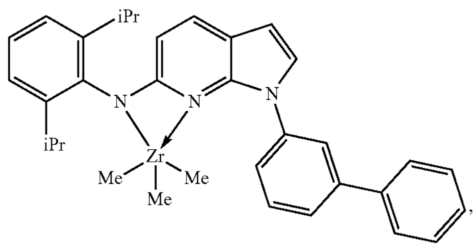
,
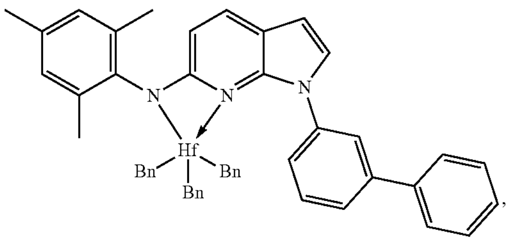
,
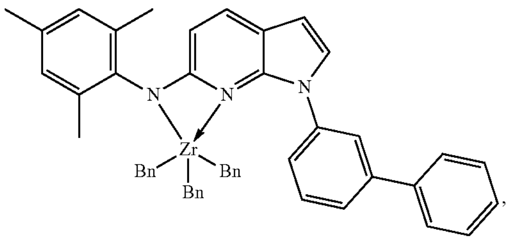
,
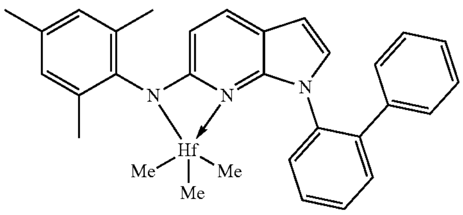
,
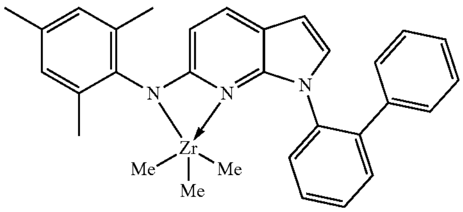
,
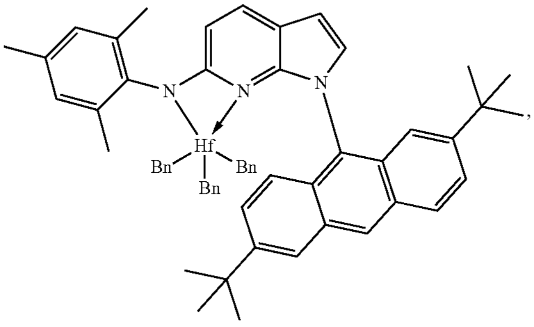
, -continued

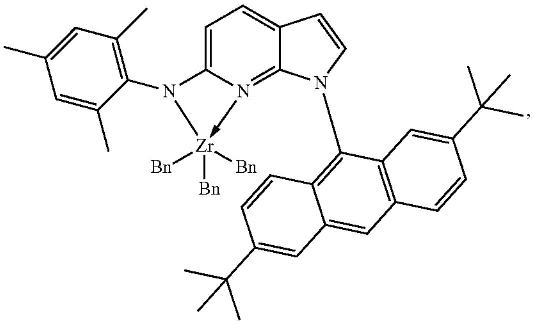
,

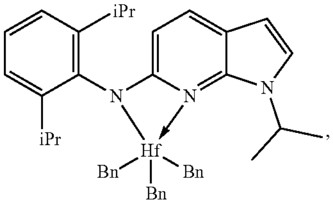
,

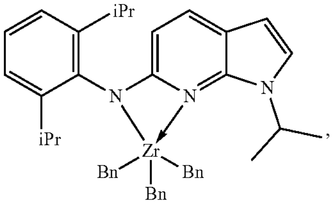
,

-continued

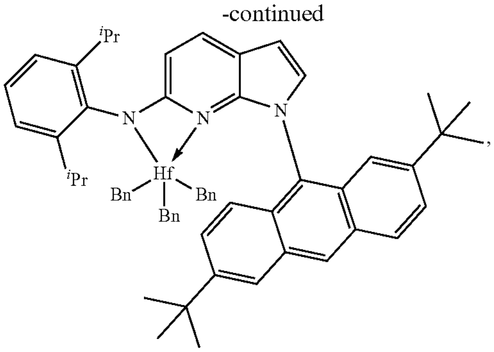
, and

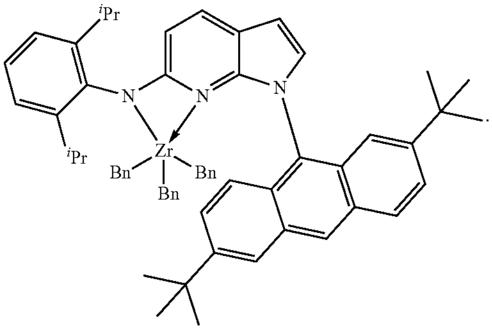
.

14. A polymerization process comprising: polymerizing at least one olefin in the presence of a catalyst system to produce an olefinic polymer, the catalyst system comprising the metal-ligand complex of claim 1 and at least one activator.

15. The polymerization process of claim 14, wherein the at least one olefin comprises a mixture of ethylene and at least one of 1-hexene and 1-octene.

* * * * *